US010883264B1

(12) United States Patent
Wee

(10) Patent No.: US 10,883,264 B1
(45) Date of Patent: Jan. 5, 2021

(54) MOLDED MULTI-PART POLYMER STRUCTURAL PLASTIC BUILDING ASSEMBLY SYSTEM FOR LAND AND WATER

(71) Applicant: Charles I. Wee, Glendale, CA (US)

(72) Inventor: Charles I. Wee, Glendale, CA (US)

( * ) Notice: Subject to any disclaimer, the term of this patent is extended or adjusted under 35 U.S.C. 154(b) by 0 days.

(21) Appl. No.: 16/550,123

(22) Filed: Aug. 23, 2019

(51) Int. Cl.
| | |
|---|---|
| *E04B 1/34* | (2006.01) |
| *E04B 1/348* | (2006.01) |
| *E04B 1/76* | (2006.01) |
| *E04C 2/296* | (2006.01) |
| *E04H 1/12* | (2006.01) |
| *E04B 1/41* | (2006.01) |
| *E04B 1/94* | (2006.01) |

(52) U.S. Cl.
CPC ........ *E04B 1/34846* (2013.01); *E04B 1/7604* (2013.01); *E04C 2/296* (2013.01); *E04H 1/1205* (2013.01); *E04B 1/40* (2013.01); *E04B 1/947* (2013.01); *E04B 2001/34876* (2013.01); *E04B 2103/04* (2013.01)

(58) Field of Classification Search
CPC ............... E04B 1/34846; E04B 1/7604; E04B 2001/34876; E04B 2103/04; E04B 1/40; E04B 1/947; E04C 2/296; E04H 1/1205
See application file for complete search history.

(56) References Cited

U.S. PATENT DOCUMENTS

| | | | | |
|---|---|---|---|---|
| 3,755,976 A | * | 9/1973 | Dolhaine | .................. E04B 1/24 52/93.1 |
| 6,195,950 B1 | * | 3/2001 | Harris | ...................... E04B 1/10 52/264 |
| 6,659,020 B1 | * | 12/2003 | Ball | ...................... B29C 53/22 108/57.28 |
| 8,499,504 B1 | * | 8/2013 | Sherbakov | ............ E04B 1/3483 52/79.9 |
| 8,650,807 B2 | * | 2/2014 | McKimmy | .......... E04B 1/34321 52/79.9 |
| 10,179,630 B2 | * | 1/2019 | Wee | ........................ B63B 35/38 |
| D853,585 S | * | 7/2019 | Wee | ................................ D25/4 |
| 10,464,636 B2 | * | 11/2019 | Wee | ........................ E04H 9/145 |
| 2006/0065993 A1 | | 3/2006 | Stucky et al. | |
| 2009/0313925 A1 | * | 12/2009 | Lyons | ................... E04H 1/1205 52/274 |

FOREIGN PATENT DOCUMENTS

| | | | | |
|---|---|---|---|---|
| CA | 2864597 A1 | * | 8/2013 | ........... B65D 88/005 |
| EP | 2960391 A1 | * | 12/2015 | ......... E04B 1/34838 |
| GB | 2491144 A | * | 11/2012 | ......... E04B 1/34823 |
| GB | 2512581 A | * | 10/2014 | ......... E04B 1/34815 |
| WO | WO 2017/147268 A1 | | 8/2017 | |

* cited by examiner

*Primary Examiner* — Adriana Figueroa
(74) *Attorney, Agent, or Firm* — Intellectual Property Law Group LLP

(57) ABSTRACT

A building assembly system that comprises thermoformed high density polyethylene molded components filled with high density polyurethane foam. The molded components are configured in a cube or triangle form and secured against a steel frame to provide a habitable constructed unit. The composition of the high density polyethylene molded components filled with high density polyurethane foam in combination with its connection with a steel frame meets standards for the American Society for Testing and Materials for a habitable structure used by humans. The habitable structure can be used on land or water.

9 Claims, 51 Drawing Sheets

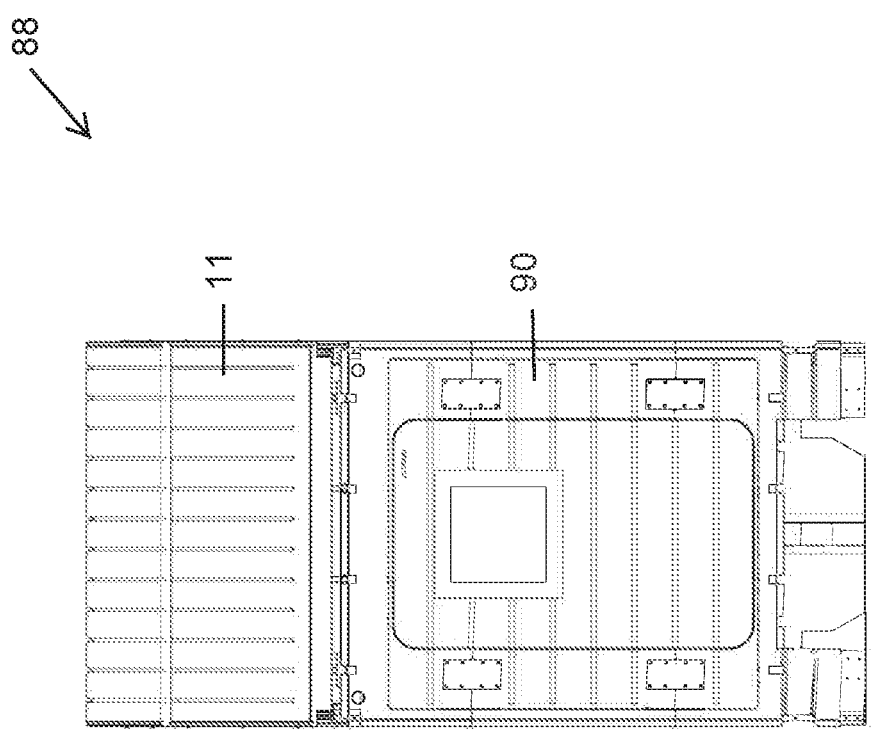

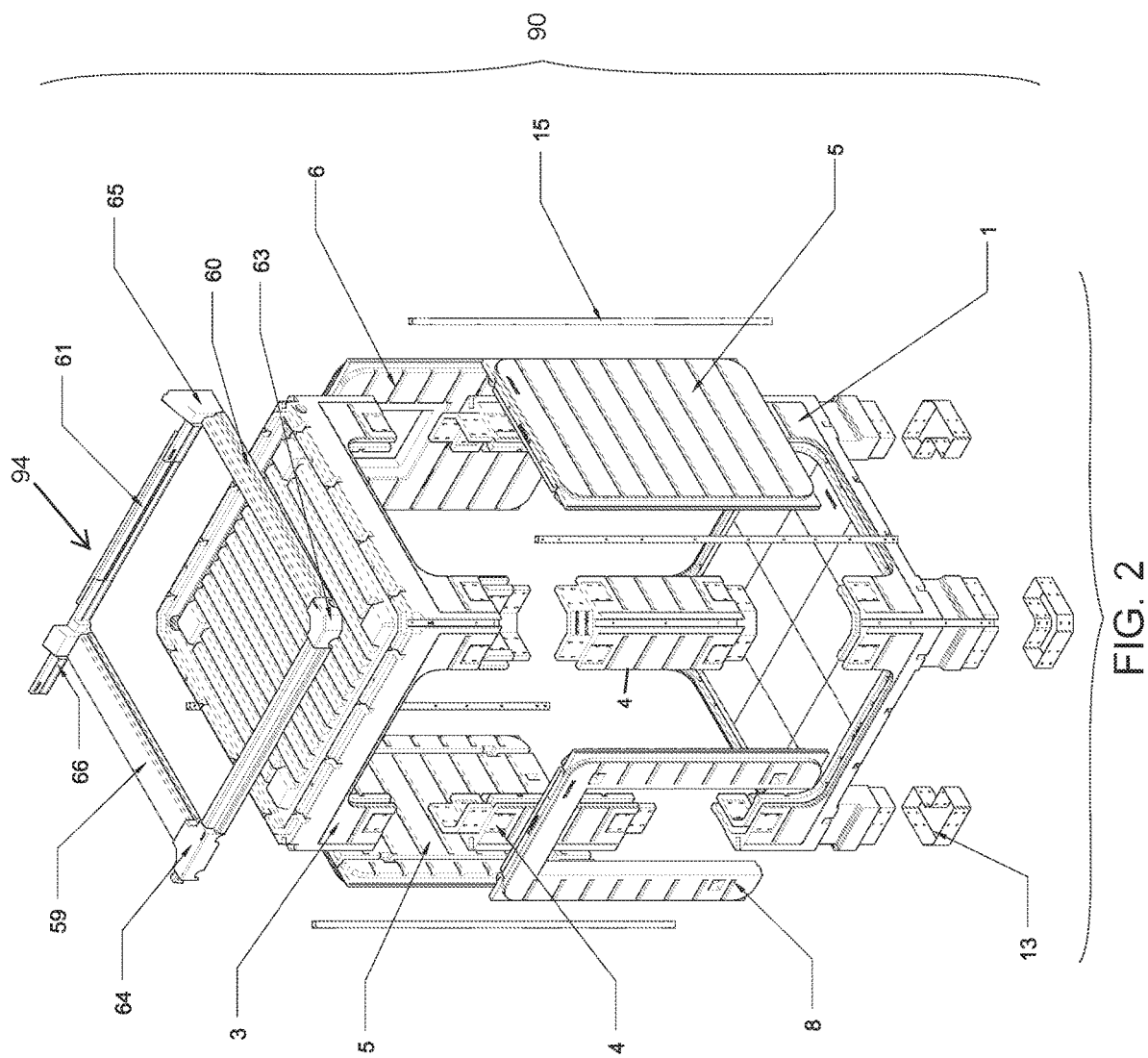

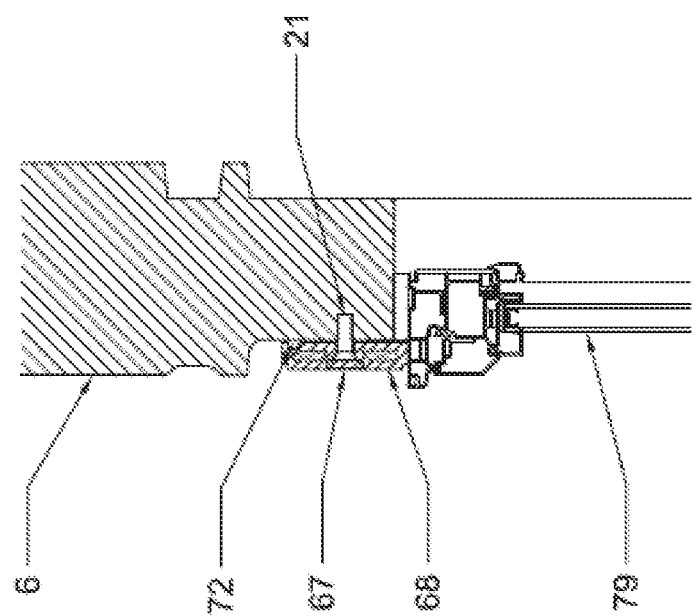

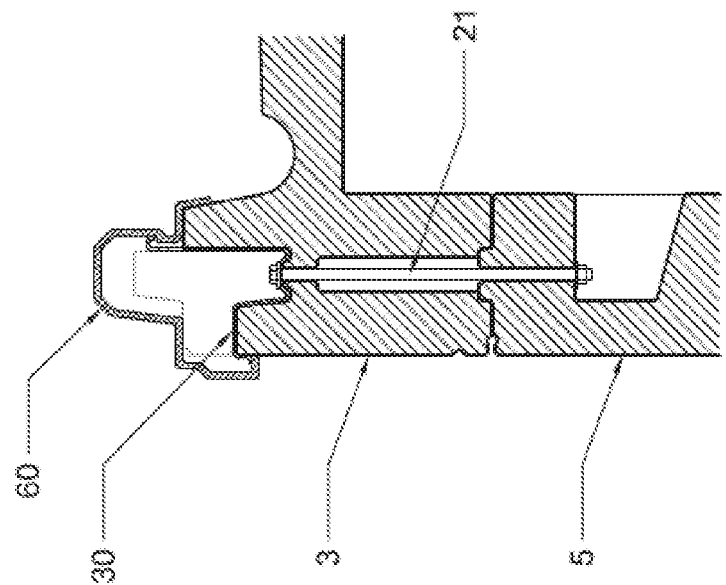

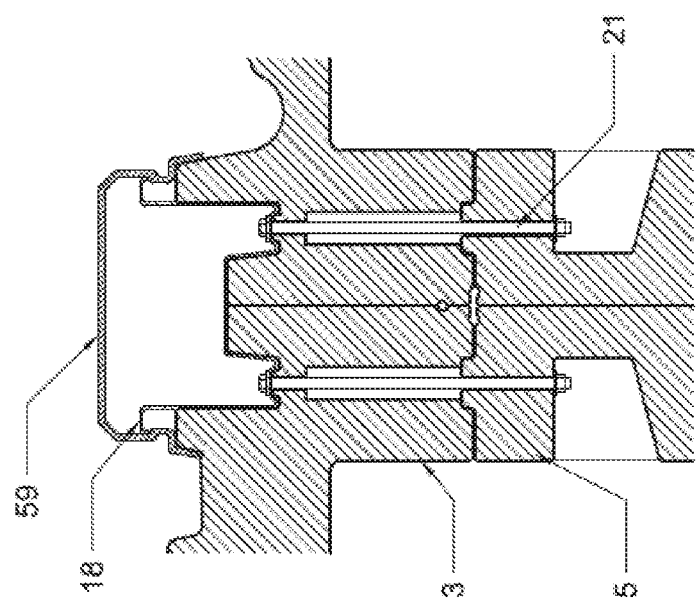

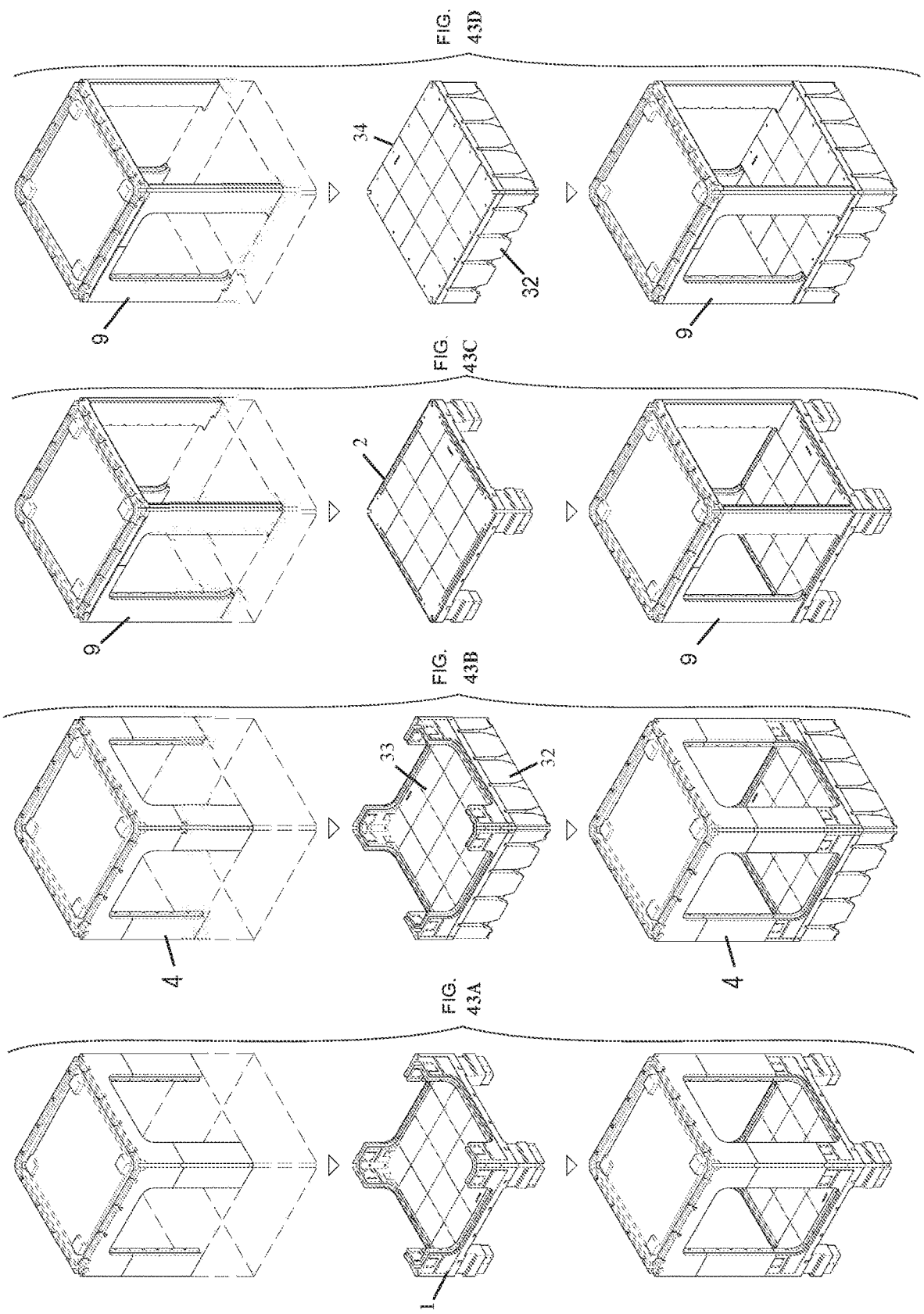

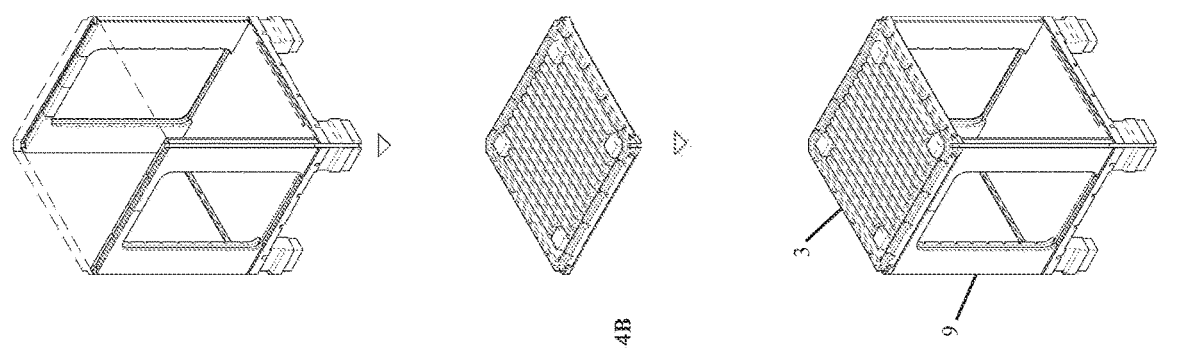
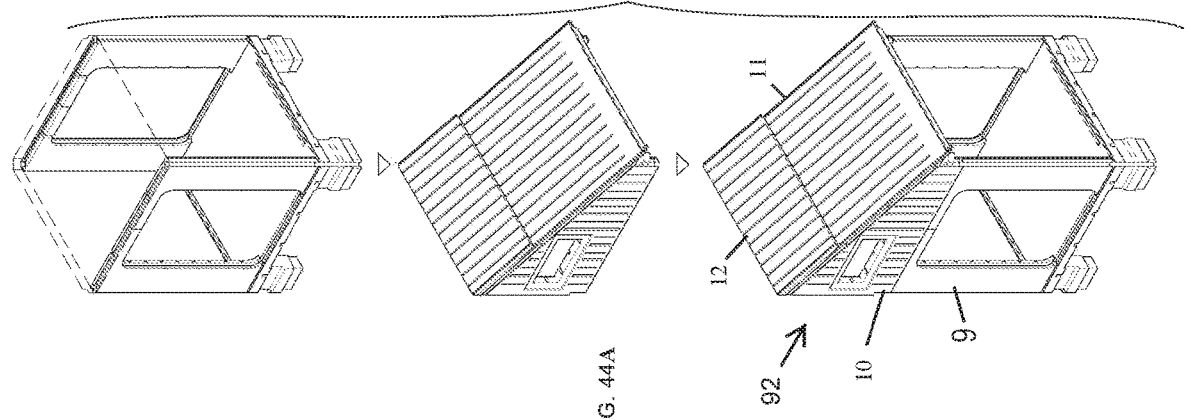
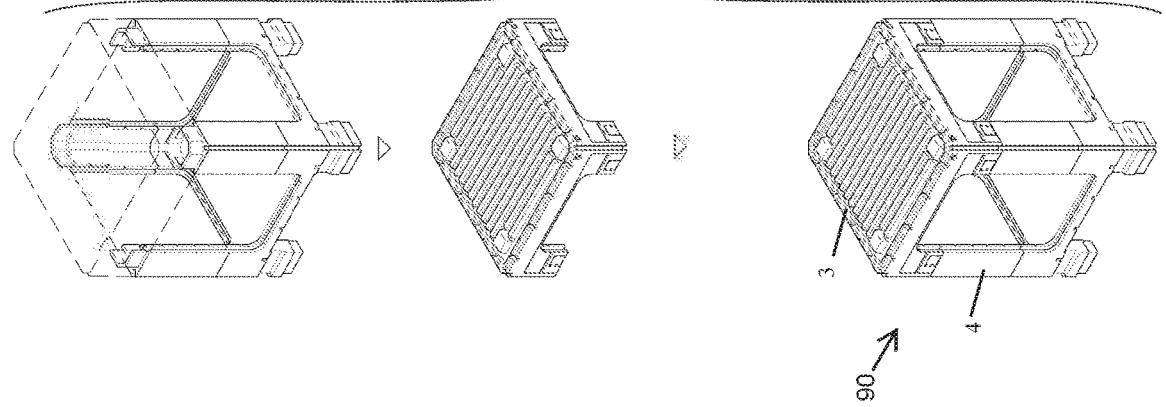

MOLDED MULTI-PART POLYMER STRUCTURAL PLASTIC BUILDING ASSEMBLY SYSTEM FOR LAND AND WATER

BACKGROUND OF THE INVENTION

1. Field of the Invention

The present invention relates to a building assembly system for land and water. More particularly, the present invention relates to connections made between the components and the formulation used for the molded multi-part polymer.

2. Background

Many families throughout the world live without access to clean water, power, waste management, sanitation and safe, sustainable homes. Poorly constructed communities with little to no infrastructure lock countless families into a cycle of poverty, generation after generation. To put this into perspective, around 1.1 billion people globally have no access to improved water supplies and 2.6 billion people lack proper sanitation. More than 2.2 million people in these developing countries die from preventable diseases associated with lack of access to clean water and sanitation.

Refugee camps designed as temporary shelters are housing families for upwards of 30 years. Without proper support, these refugee communities scrape by in very poor conditions, unable to thrive. Two-thirds of the global refugee populations—over 10 million refugees live in protracted refugee situations in thirty countries around the world.

Further, high density polyethylene (HDPE) injected with high density polyurethane (HDPU) foam, is not commonly thought of as a material of use for entire building structures. Rather, it has been known not to use high density polyethylene as sub-components of buildings because the inherent nature of plastic and foam was thought to be highly flammable and not structurally sound. However, high density polyethylene (HDPE) is environmentally stable and does not give off any harmful elements into the environment. Products made from recycled high density polyethylene (HDPE) are considered eco-friendly because they are recyclable at the end of its useful life. High density polyethylene (HDPE) does not contain bisphenol A, phthalates, heavy metals or allergens.

To manufacture high density polyethylene (HDPE) requires only a fraction of the energy required to produce steel from iron ore and the carbon footprint of high density polyethylene (HDPE) production is five times lower than aluminum. High density polyethylene (HDPE) has a large strength-to-density ratio and its viscous and elastic characteristic prevents it from deformation and forming cracks. It also offers zero corrosion and zero maintenance. High density polyethylene (HDPE) solid plastics are a naturally germ resistant material and can be easily cleaned since its paint-free surface will not be harmed by cleaning chemicals. High density polyethylene (HDPE) is 100% recyclable and accepted at most recycling centers in the world because it is one of the easiest plastic polymers to recycle.

As such, there is a need for a molded three dimensional sandwich panel made from a thermoformed material, which meets ASTM standards. There is a need for the molded three dimensional sandwich panels to be assembled into a self supporting habitable structure. There is a need for a fire retardant skin composition and a fire retardant foam composition. There is also a need for a method of manufacturing the molded three dimensional sandwich panels filled with foam.

SUMMARY

According to the embodiments of the present invention there is a molded component building assembly system comprising: a cube module comprising a plurality of thermoformed high density polyethylene cube module molded components, a triangle module comprising a plurality of thermoformed high density polyethylene triangle module molded components, a plurality of steel vertical connectors, and a steel frame, wherein the cube module and the triangle module are connected by straps to form a habitable constructed unit. Each cube module molded component and each triangle module molded component is filled with high density polyurethane foam, wherein the cube module molded components and the triangle module molded components are at least sufficient to meet a minimum ASTM standard of one or more of the following: first ends ASTM D695-15, ASTM D638-14, ASTM D732-17, ASTM C518-17, ASTM D4976-12a, ASTM E72-15, ASTM E108-16, ASTM D4819-13, ASTM D570-98, ASTM D6341-16, ASTM D2990-17, ASTM D2990-17, ASTM E2322-03, ASTM E2126-11, ASTM D1435-13, ASTM G154-12a, ASTM D7989-15, NFPA 286-15, and UL 790-2014.

According to embodiments, the plurality of cube module molded components comprise: a floor having an upper side and a lower side; a plurality of columns, each column having a first end and a second end; a module roof having a top side and a bottom side; a first set of interchangeable bulkhead panels; wherein the upper side of the floor is connected to the first ends of the plurality of columns; the bottom side of the module roof is connected to the second ends of the plurality of columns; the first set of interchangeable bulkhead panels connected between the bottom side of the module roof and the upper side of the floor, and the first set of interchangeable bulkhead panels connected laterally to the plurality of columns. The plurality of steel vertical connectors are secured in slots located on exterior surfaces of the floor, of the plurality of columns, and of the module roof. The plurality of triangle module molded components comprise: a triangular roof module, a second set of interchangeable bulkhead panels; two end wall frames, each end wall frame having a top side, a bottom side; a deck having an upper side and a lower side; wherein the upper side of the deck is connected to the bottom sides of the two end wall frames and to the second set of interchangeable bulkhead panels; and the top sides of the two end wall frames are connected to a different set of interchangeable bulkhead panels. The steel frame connects the plurality of triangle module molded components by fasteners. The steel frame comprises at least two trusses, each truss having a top, a bottom, an inner facing side and an outer facing side and two vertical connectors extending from the bottom of each truss of the at least two trusses; and a beam connecting the at least two trusses at substantially a highest point on the inner facing side. According to embodiments, each bulkhead panel within the first and second sets of interchangeable bulkhead panels are interchangeable with each other.

According to another embodiment of the present invention, there is molded component made from thermoformed material for a building assembly, the molded component is at least sufficient to meet a minimum ASTM standard of one or more of the following: cube module ASTM D695-15, ASTM D638-14, ASTM D732-17, ASTM C518-17, ASTM D4976-12a, ASTM E72-15, ASTM E108-16, ASTM D4819-13, ASTM D570-98, ASTM D6341-16, ASTM D2990-17, ASTM D2990-17, ASTM E2322-03, ASTM E2126-11, ASTM D1435-13, ASTM G154-12a, ASTM D7989-15, NFPA 286-15, and UL 790-2014. The molded component comprises: a foam composition comprising approximately 56 weight percent of diphenylmethane diisocyanate and approximately 44 weight percent of 4, 4'-Methylenediphenyl diisocyanate; and a skin composition surrounding the foam composition. The skin composition comprises an intumescent flame retardant mixed with a high density polyethylene, wherein the high density polyethylene comprises approximately 70 weight percent of the skin composition and the intumescent flame retardant comprises approximately 30 weight percent of the skin composition; and the intumescent flame retardant comprises melamine polyphosphate and polyethylene.

According to yet another embodiment of the present invention, there is a method of manufacturing molded components from thermoformed material, the molded components are at least sufficient to meet a minimum ASTM standard of one or more of the following: ASTM D695-15, ASTM D638-14, ASTM D732-17, ASTM C518-17, ASTM D4976-12a, ASTM E72-15, ASTM E108-16, ASTM D4819-13, ASTM D570-98, ASTM D6341-16, ASTM D2990-17, ASTM D2990-17, ASTM E2322-03, ASTM E2126-11, ASTM D1435-13, ASTM G154-12a, ASTM D7989-15, NFPA 286-15, and UL 790-2014. The method comprises: (a) molding hollow components using a thermoformed process comprising a fabricated cast aluminum master mold rotated bi-axially and causing a melted polymer to disperse and stick to walls of the fabricated cast aluminum master mold, and (b) injecting hollow components with a foam using a foaming process, wherein the hollow components are assembled to form a molded component building assembly system.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 1E is a left side elevational view, of an assembled, constructed unit comprising two cube modules and two triangle modules, according to an embodiment of the present invention.

FIG. 2 is an exploded perspective view of a cube module, according to an embodiment of the present invention.

FIG. 27 illustrates a sectional view along line A-A' in FIG. 26, according to an embodiment of the present invention.

FIG. 29 illustrates a sectional view along line A-A' in FIG. 28A, according to an embodiment of the present invention.

FIG. 30 illustrates a sectional view along line B-B' in FIG. 28A, according to an embodiment of the present invention.

FIGS. 43A-43D illustrates the interchangeable bottom modules, according to an embodiment of the present invention.

FIG. 44A-44C illustrates the interchangeable roofs, according to an embodiment of the present invention.

DETAILED DESCRIPTION OF SPECIFIC EMBODIMENTS

Figure 1A:
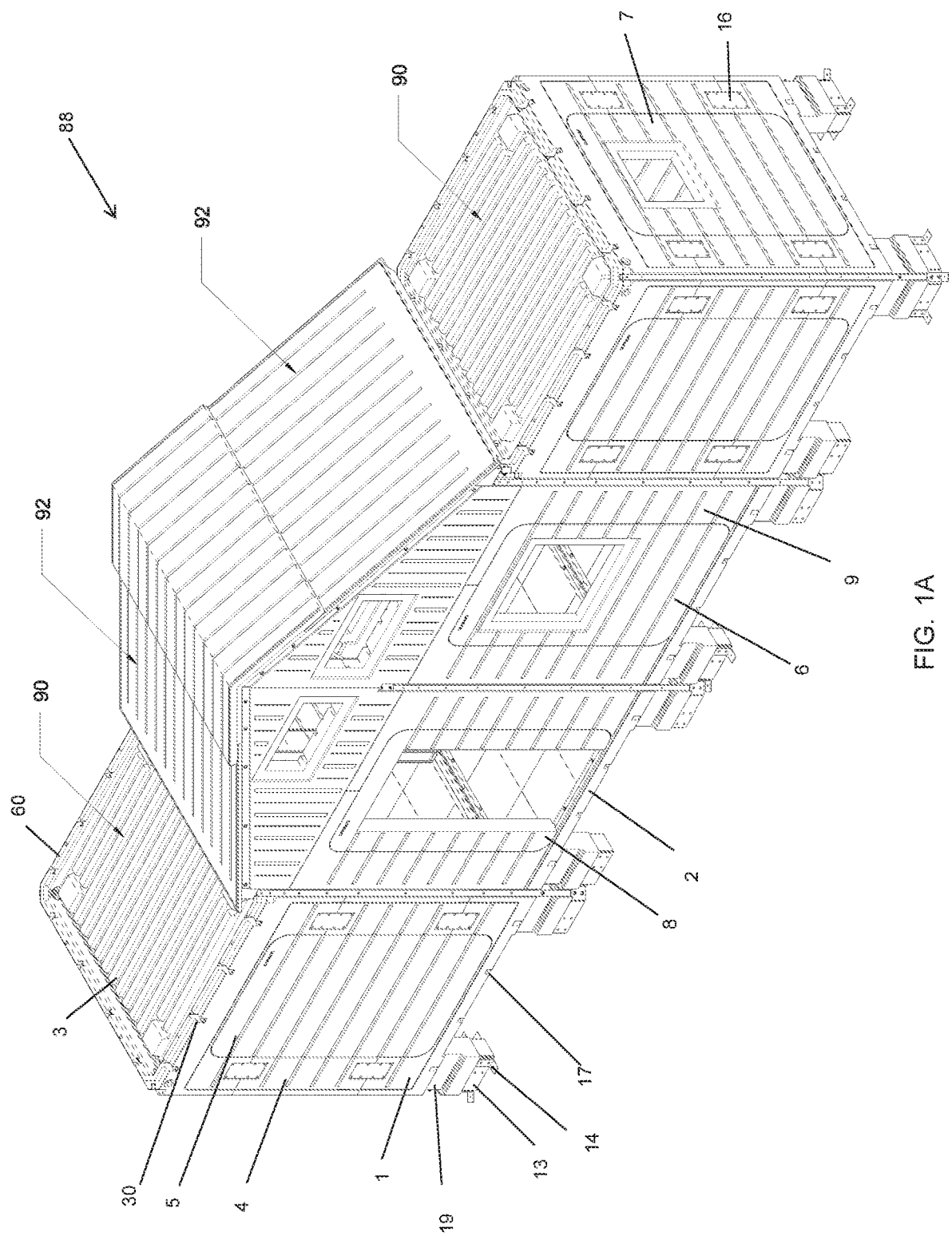
FIG. 1A is a front perspective view of an assembled, constructed unit comprising two cube modules and two triangle modules, according to an embodiment of the present invention.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The design of the disclosed embodiments also allows prefabricated buildings to be quickly deployed, relocated and reassembled as needed. The parts for the modules except for the steel structure, bolt, and washer nut can be made from various types of polymers. Examples of polymers can be high density polyethylene (HDPE), high density polyurethane (HDPU), low density polyethylene (LDPE), linear low density polyethylene (LLDPE). Of course other types of materials can be contemplated. The components of the modules can be made from various molding processes. Example of molding process can be rotational molding (rotomolding), blow molding, injection molding, compression molding, extrusion molding, or thermoform molding. Of course other types of molding processes can be contemplated.

For example, according to an embodiment of the present invention, a rotomolding process to produce high density polyethylene (HDPE) filled with high density polyurethane (HDPU) foam as building components/panels (walls, roof, and floors) of the modules can be implemented. This process creates strong structures having thermal performance and the high density polyethylene (HDPE) with molded air cavity and injected high density polyurethane (HDPU) foam provides structural integrity and optimal thermal values. The thermal resistance properties of the components/panels due to its polyurethane core creates high thermal resistance with a temperature differential from exterior to interior. For example, when the exterior temperature is about 42° C. (107° F.), the interior of the cube module 90, 100 and the triangle module 92, 102 can be about 26° C. (78° F.). On the other hand, when the exterior temperature is about −6° C. (21° F.), the interior of the cube module 90, 100 and the triangle module 92, 102 can be about 20° C. (68° F.).

For the process of roto molding, the high density polyethylene injected with high density polyurethane (HDPU) foam is fabricated into three dimensional shapes. The structural rigidity and strength in both the X and Y direction is created by a combination of a corner design using a single "L" shaped column system interlocked with a tongue and groove system of the base, roof, and bulkhead modules and secured using bolts. Rotationally molded plastic polymer parts are assembled together with steel framing to form a homogeneous load bearing building structure for a variety of building configurations. The molded plastic polymer parts can also be referred to as components. The high density polyethylene material is rotationally molded in a custom fabricated cast aluminum master mold by a thermo-form process to create hollow plastic polymer parts.

Rotational molding comprises a heated hollow mold which is filled with a charge or shot weight of material. It is then slowly rotated bi-axially (two perpendicular axes), causing the melted HDPE to disperse and stick to the walls of the mold creating the final form.

These rotationally molded hollow polymer components are then filled with a two-step foaming process in which equipment dispenses chemical at low pressure of about 240 psi to 250 psi. This process is nitrogen driven with impingement mix at the head with the option to dispense static mix through a mix tube on the end of the unit. The output of the gun is about 60 pounds per minute. The temperatures at which this step is performed is about 27-35° C. (80-95° F.) for the chemical temperature, about 27-43° C. (80-110° F.) for the substrate temp and about 37-49° C. (100° F.-120° F.) for the mold/fixture temperature. The resultant foam filled plastic polymer parts are then assembled together to create a module unit which are then connected to form a constructed unit 88 of an infinite number of floor plan types.

One example of a formulation used to manufacture polymer components of the modules comprises intumescent flame retardant mixed with a resin. An example of a resin can be a high density polyethylene (HDPE) resin. The formulation comprises about 30 weight percent of an intumescent flame retardant compound and about 70 weight percent of high density polyethylene resin. The intumescent flame retardant can be suitable for polyolefin and thermoplastic elastomers such as polypropylene or polyethylene resin. The intumescent flame retardant can be not only molded by injection or extrusion directly mixing with resins but also granulated with resin and other additives by twin screw extruder.

The intumescent flame retardant compound comprises about a 72 to 78 weight percent of a flame retardant, such as melamine polyphosphate, and about a 22 to 28 weight percent polyethylene. Preferably, the intumescent flame retardant compound comprises about 75 weight percent of a flame retardant and preferably about 25 weight percent of polyethylene. The resin can be high density polyethylene resin, which comprises about a 99 to about 100 weight percent polyethylene hexene copolymer. The mixture of the high density polyethylene resin (HDPE) is compounded using a high-speed twin screw compounding machine.

An example of a compound used to manufacture the foam found inside the hollow polymer components is high density polyurethane (HDPU) foam. The high density polyurethane (HDPU) foam is comprised of at least two components. The first component comprises about a 100 weight percent of diphenylmethane diisocyanate, isomers and homologues and about a 40 to about 50 weight percent of 4, 4'-Methylenediphenyl diisocyanate. The second component comprises about a 4 to 12 weight percent of a blowing agent, about less than a 4 weight percent of a catalyst, about less than a 5 percent of a flame retardant and a polyol blend. The compound comprises about 56 weight percent of the first component and about 44 weight percent of the second component.

The structurally strong and fire retardant nature of the building structure is a result of combining the buoyant nature of plastic foam, having a proper balance of fire retardant additive and creating a configuration geometry. The fire retardant nature of the material can slow or reduce the intensity of the combustion process. High density polyethylene (HDPE) is an environmentally stable plastic, giving off no harmful fumes into the environment. It also does not contain bisphenol A (BPA), heavy metals or allergens, is a naturally germ-resistant material and offers almost no corrosion and low maintenance is required. High density polyethylene's viscous and elastic characteristic prevents deformation and formation of cracks. It is also 100% recyclable and easy to recycle.

Another process that can be used to make the components for the module is blow molding. There are several types of blow molding processes, which are extrusion blow molding, injection blow molding, and injection stretch blow molding. In general, blow molding begins with melting the plastic of choice and forming the melted plastic into a parison or a preform. In the case of a parison, there is a hole in one end through which compressed air can pass. The parison is clamped into a mold and compressed air is blown into the parison. The compressed air pushes the plastic out to match the mold. When the plastic cools and hardens, the mold is open and the component part is ejected.

In the example process of compression molding, the molding polymer is placed in a preheated, open mold cavity. The mold is closed with a top force or plug member and then pressure is applied to force the polymer into contact with the mold surface. While the pressure is applied heat and pressure are maintained until the molding polymer has cured. Compression molding uses thermosetting resins in a partially cured stage.

In the example of extrusion molding, the plastic for the components of the modules is melted into a liquid which is forced through a die, forming a long tube like shape. The extrusion is cooled and forms into a solid shape. Shapes that can be formed from extrusion molding can be T-sections, U-sections, square shaped sections, I-sections, L-sections or circular sections. The extrusion molding process is used to create components of the modules with a fixed cross-sectional profile.

In the example process of injection molding for making the components for the module, the polymer is placed into a heated barrel, mixed using a helical shaped screw and injected into a mold cavity. In the mold cavity, the polymer cools and hardens to the configuration of the cavity. Materials such as polyethylene, polypropylene, thermoplastic and thermosetting polymers. Polyethylene in different densities such as high density polyethylene (HPDE), low density polyethylene (LDPE), linear low density polyethylene (LLDPE) can be used. The higher the density of the polyethylene used, the stronger, more rigid the structure. The effect of fire or heat resistance on the structure is dependent on the fire retardant additives. The benefits of using HDPE is that it has high levels of ductility, has tensile strength, its resistance to impact and moisture absorption and it is recyclable.

In the example process of thermoform molding for making component parts for the module, the polymer sheets are heated to a pliable forming temperature and then formed to a specific shape in a mold. When the polymer sheet is molded, the polymer sheet is trimmed to create the component part of the module. There are different types of thermoform molding processes. One type is pressure forming where high pressure is applied to the back side of the polymer sheet during the molding process. There is also twin sheet thermoforming. In this process, hollow parts can be created by combining two polymer sheets during the molding process. Another example of thermoform molding is vacuum thermoforming wherein the polymer is heated until it is formable and then draped over a mold. Once draped over the mold, a vacuum is used to pull the polymer sheet to the mold, thus forming the component part.

The definition of a constructed unit 88 is any combination and configuration of the land cube module 90 and land triangle module 92 or any combination and configuration of the water cube module 100 and water triangle module 102. The constructed unit 88 can comprise of at least one land cube module 90 connected to a land triangle module 92 and together can be used to create a common space. The constructed unit 88 can comprise of at least one water cube module 100 connected to a water triangle module 102 and together can be used to create a common space. The land cube module 90 and the water cube module 100 can function as one independent unit. The land cube module 90 and the water cube module 100, among other functions, can be used as a room, bathroom, small kitchen, or utility room. The land cube module 90, the land triangle module 92, the water cube module 100, and the water triangle module 102 can all be generally referred to as module.

In one embodiment of the present invention, the prefabricated modules can use high density polyethylene (HDPE) enclosure injected with expanding high density polyurethane (HDPU) to form a primary three dimensional assembly structure to configure into various building configurations. The prefabricated modules are complete, self-supporting, certified structures and are fire retardant to pass all regulatory agencies as a habitable structure. The speed at which the constructed unit 88 is assembled requires only one-fourth of the total building time of traditional methods of construction. 80% of unskilled labor and the use of only standard tools contribute to the speed at which the construction system can be assembled.

The land cube module 90, land triangle module 92, water cube module 100, water triangle module 102, and constructed unit 88 are quick to assemble as standard tools and only about one-fourth of the total building time of traditional methods of construction is required. The total power generated is about 21.3 kWh and the daily water supply is about 2,100 liters.

There are various types of assembling and fastening pieces, generally called hardware, which can be used to build the modules. For example, there are trusses, straps, reinforcing posts, compression plates, and steel leg shoes (for foundations). The hardware is made of structural steel and after assembly; the exposed hardware is covered with a galvanized and powder coating. These various assembling and fastening pieces can be integrated with a steel hardware fastening system. There are also integrated bracket systems, also made of structural steel, for hanging cabinets, beds, storage units, and lights. An example is a hanging bracket for the wall or a hanging bracket for the shelf.

FIG. 1A is a perspective view of an assembled constructed unit 88 comprising two land cube modules 90 and two land triangle modules 92, according to an embodiment of the present invention. Components such as the floors, roofs, decks, columns, bulkheads (large/small window bulkheads), and walls of the constructed unit 88 can be made from various molding processes as mentioned above and the hardware is made from structural steel. FIG. 1A illustrates an assembled constructed unit 88 of one module by four modules (1×4) connected to form a single linear constructed unit 88. The 1×4 assembled constructed unit 88 is configured with two land cube modules 90 as bookends to two land triangle modules 92 sandwiched in the middle to form a linear constructed unit 88. The land cube module 90 serves a function of creating private space for the user and the land triangle module 92 serves to create a public space. The constructed unit 88 illustrated in FIG. 1A is an embodiment used on land.

For the embodiment shown in FIG. 1A, the land cube module 90, comprises a module land floor 1 which is connected to the bulkhead small window 7 for at least one side and for at least another side, the module land floor 1 is connected to a bulkhead wall 5. The interchangeable parts system (IPS) allows for the diversity and simplicity of the assembly. For example, if the user wants more privacy, the bulkhead wall 5 can be used throughout the land cube module 90 instead of the bulkhead small window 7. The bulkhead large window 6 is used to provide a large window for light and ventilation as well as a legal means of egress during an emergency. The bulkhead large window 6 can be used instead of the bulkhead wall 5.

The module plate connector 16 is inserted into the module plate connector slot found on the column 4, module land floor 1 and module roof 3. The module plate connector 16 connects the column 4 to the module roof 3 and the module land floor 1 and is secured using carriage bolts 22. The roof strap end 30 is used to fix the module roof 3 and bulkhead wall 5 with bolts and nuts 21 and to fix the roof perimeter cap 60 to the module roof 3. The footing angle plate 14 secures the land base leg shoes 13 to the foundation using an anchor bolt 23. The module strap 17 is made of a metal material such as steel and is used to secure various components. For example, the module strap 17 along with bolts 21 can be used to secure the wall system to the module land deck 2.

Figure 1B:
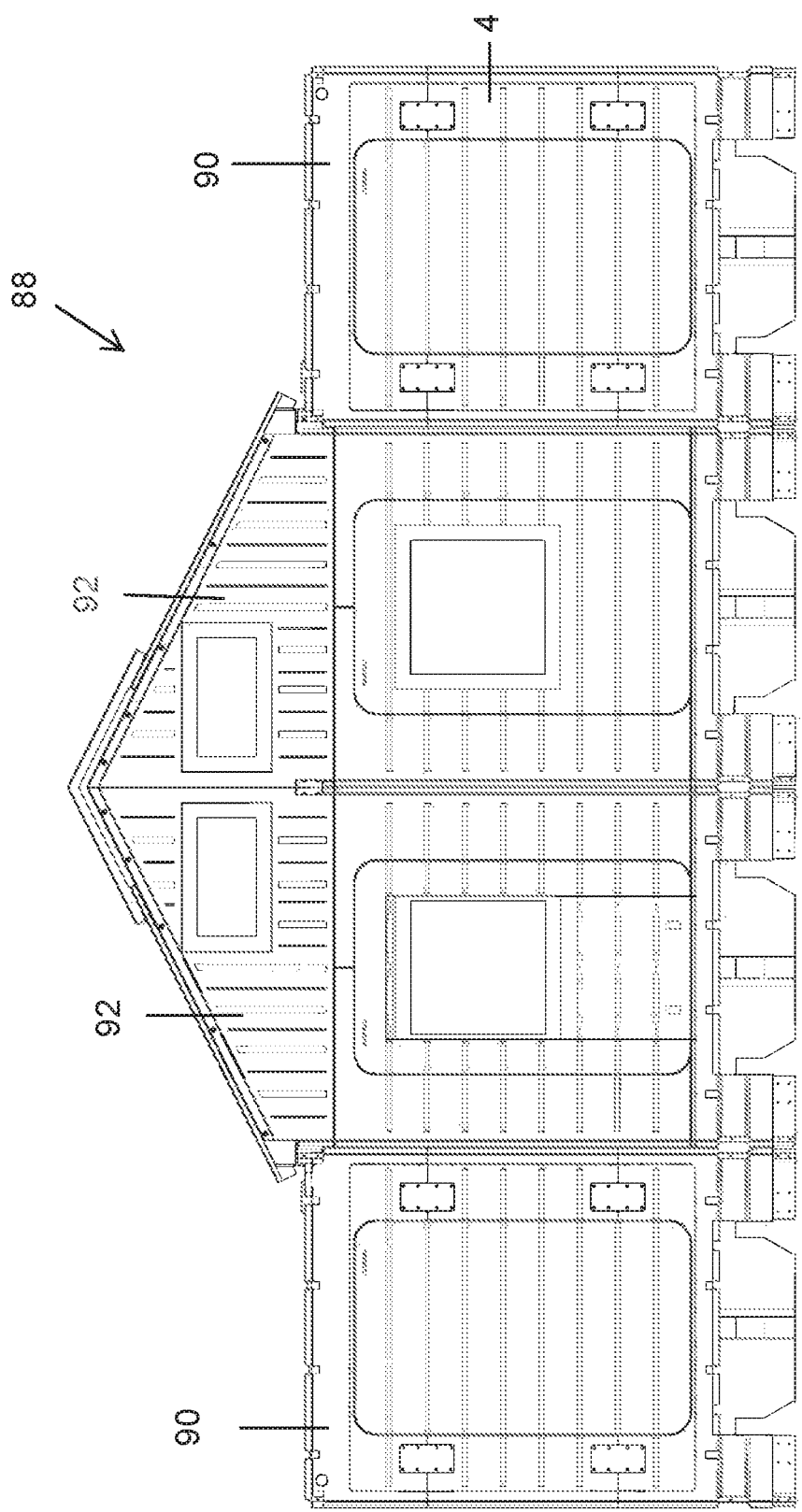
FIG. 1B is a front elevational view, of an assembled, constructed unit comprising two cube modules and two triangle modules, according to an embodiment of the present invention.
Figure 1C:
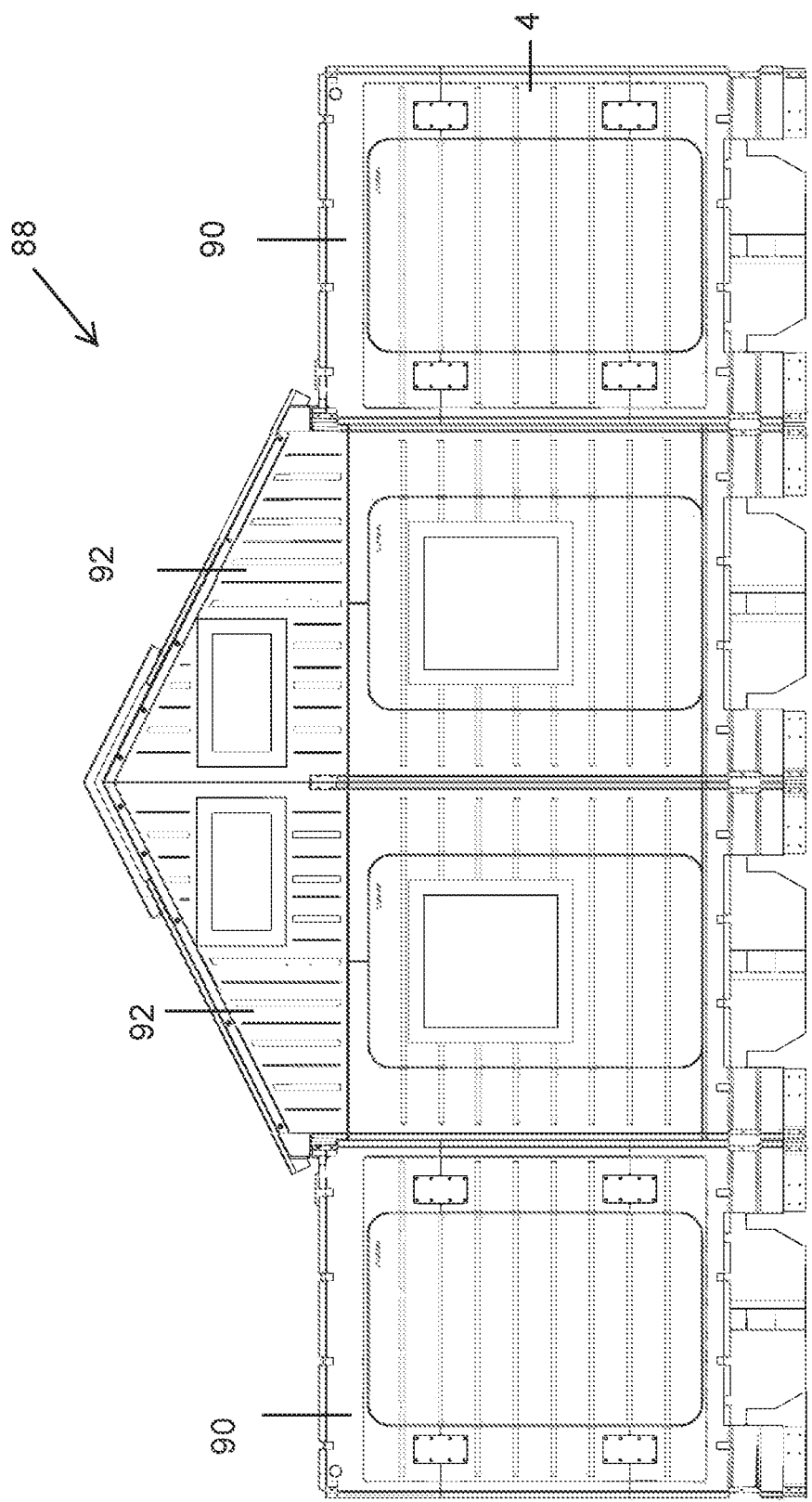
FIG. 1C is a rear elevational view, of an assembled, constructed unit comprising two cube modules and two triangle modules, according to an embodiment of the present invention.
Figure 1D:
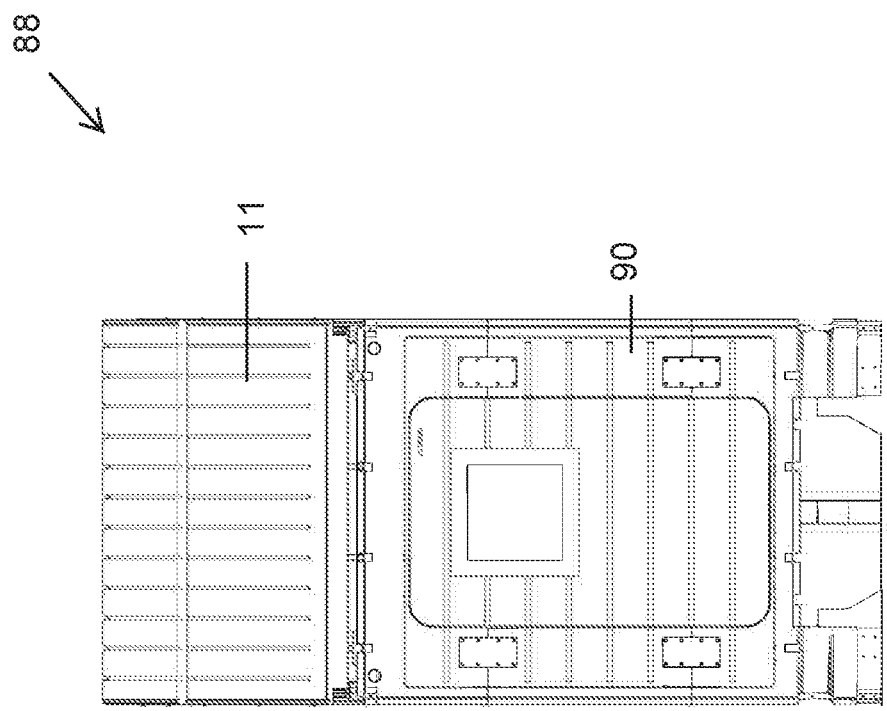
FIG. 1D is a right side elevational view, of an assembled, constructed unit comprising two cube modules and two triangle modules, according to an embodiment of the present invention.
Figure 1F:
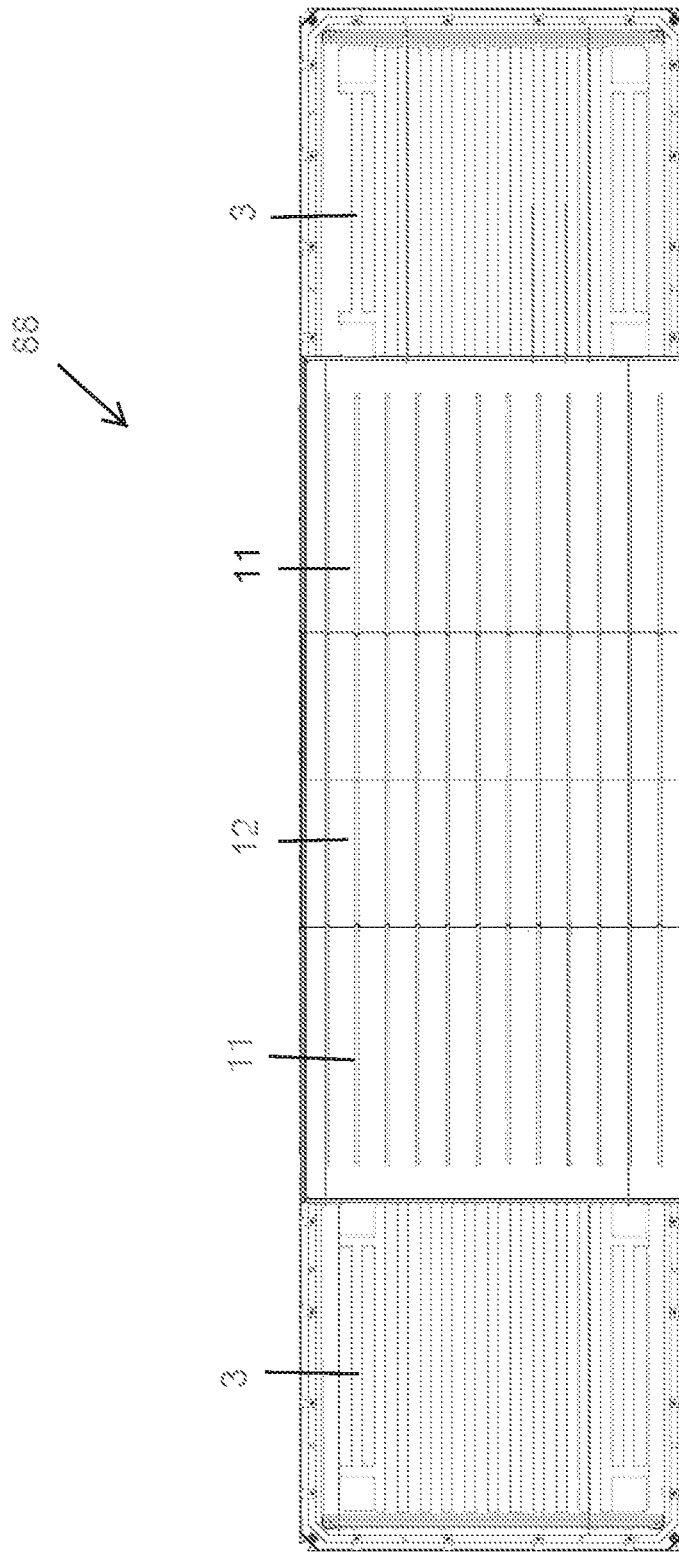
FIG. 1F is a top plan view of an assembled, constructed unit comprising two cube modules and two triangle modules, according to an embodiment of the present invention.
Figure 1G:
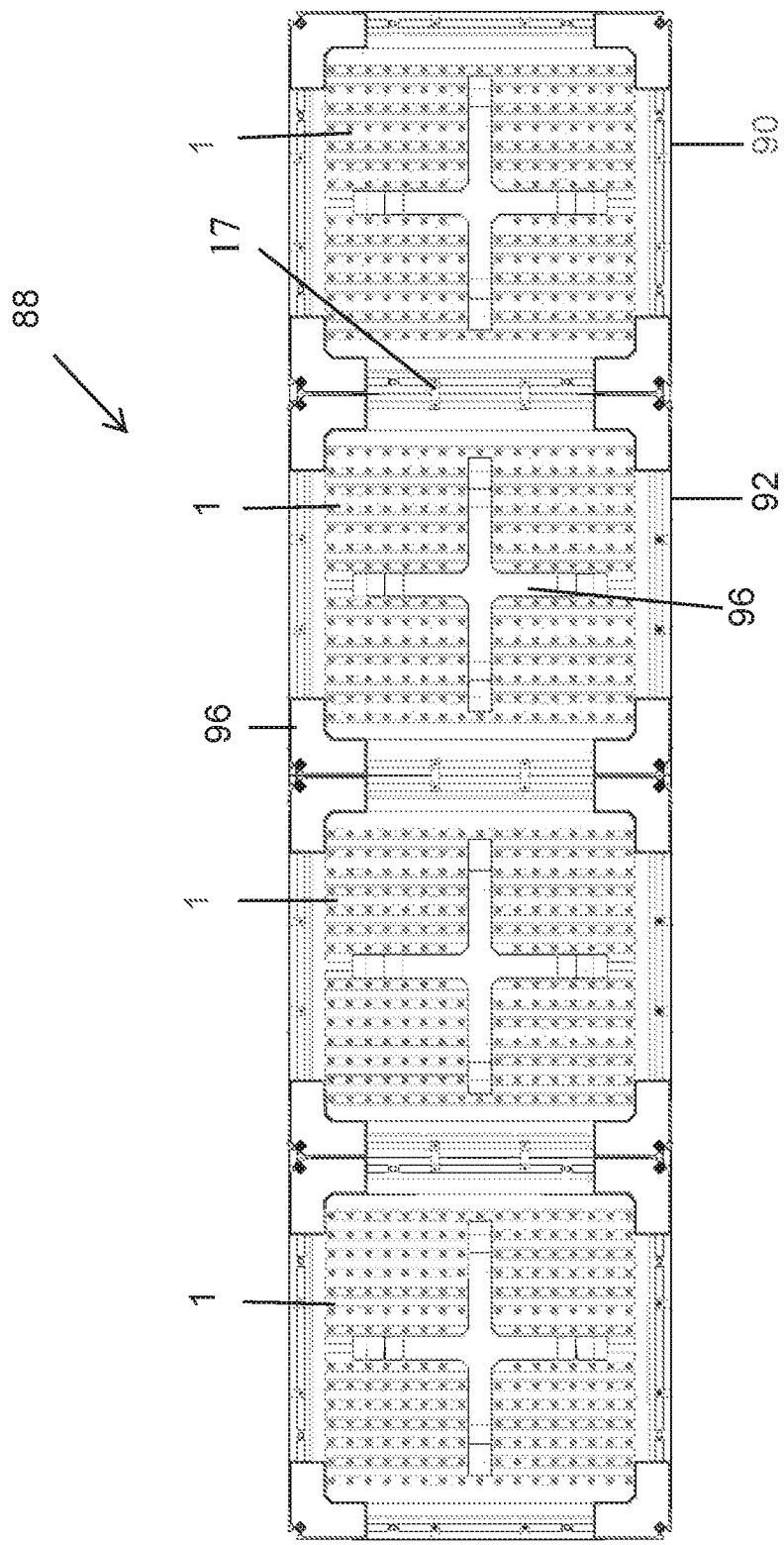
FIG. 1G is a bottom plan view, of an assembled, constructed unit comprising two cube modules and two triangle modules, according to an embodiment of the present invention.

As illustrated in FIG. 1A, the user has the option to combine the end wall frame 9 with the land triangle module 92. The bulkhead large window 6 or the bulkhead door 8 can be connected to the end wall frame 9 to make a side wall for the land triangle module 92. The land triangle module 92, comprises a module land deck 2, which can be used with the module land floor 1. FIG. 1B is a front elevational view of an assembled, constructed unit 88 comprising two land cube modules 90 and two land triangle modules 92, according to an embodiment of the present invention. FIG. 1C is a rear elevational view of an assembled, constructed unit 88 comprising two land cube modules 90 and two land triangle modules 92, according to an embodiment of the present invention. FIG. 1D is a right side elevational view of an assembled constructed unit 88 comprising two land cube modules 90 and two land triangle modules 92, according to an embodiment of the present invention. As shown, the roof-flat 11 of the land triangle module 92 slants upward from the land cube module 90. FIG. 1E is a left side elevational view of an assembled, constructed unit 88 comprising two land cube modules 90 and two land triangle modules 92, according to an embodiment of the present invention. Similarly, the roof-flat 11 of the land triangle module 92 slants upward from the land cube module 90. FIG. 1F is a top plan view of an assembled constructed unit 88 comprising two land cube modules 90 and two land triangle modules 92, according to an embodiment of the present invention. The two land cube modules 90 from both ends of the constructed unit 88 comprise a module-roof 3. The two land triangle modules 92 located in between the land cube module 90 each comprise a roof-flat 11 and a roof-ridge 12 covers a portion of both roof-flats 11. FIG. 1G is a bottom plan view of an assembled, constructed unit 88 comprising two land cube modules 90 and two land triangle modules 92 located between the two land cube modules 90, according to an embodiment of the present invention. The module-land floor 1 is used for both the land cube module 90 and land triangle module 92. A land cube module 90 is connected to a land triangle module 92 using a module strap 17. The leg 96 of the land cube module 90 and land triangle module 92 comprises four corner legs and a middle cross-shaped leg. The leg 96 are connected to the module land floor 1 and module land deck 2.

FIG. 2 is an exploded perspective view of a land cube module 90, according to an embodiment of the present invention. Approximate dimension of the land cube module 90 can be about 2.4 meters length×about 2.4 meters width× about 3.4 meters height. However, other dimensions can be contemplated. The land cube module 90 is comprised of a module roof 3, four columns 4, two bulkhead walls 5, one bulkhead door 8, one bulkhead large window 6, and steel hardware to form a structurally stable land cube module 90. The bulkhead walls 5, bulkhead door 8 and bulkhead large window 6 are interchangeable. For example, instead of having the bulkhead door 8 and bulkhead large window 6, there can be four bulkhead walls 5 (See FIGS. 41A-41D). The bulkhead panels for the cube module comprise the bulkhead wall 5, bulkhead large window 6, bulkhead small window 7, bulkhead door 8, (and later described, bulkhead plumbing wall 87) which are interchangeable with one another and may be designated as a first set of interchangeable bulkhead panels as a group.

According to an embodiment, the bulkhead small window 7, bulkhead wall 5, module land floor 1, bulkhead door 8, bulkhead large window 6 can be made from various types of resins such as high density polyethylene (HDPE). The hollow components, such as the bulkhead wall 5, are injected with various types of foam, such as high density polyurethane (HDPU) foam.

The module roof 3 can be made from various types of resins. For example, the module roof 3 can be made from high density polyethylene (HDPE). The module roof 3 can be injected with various types of foam. For example, it can be injected with high density polyurethane (HDPU) foam. The module roof 3 is connected to the ring 94 which comprises the roof cap 59, roof T cap 64, roof L cap 63, roof perimeter cap 60, slope roof L cap 65, sloped roof flashing 61, and slope roof T cap 66. These components are made of polyvinyl chloride (PVC) and are connected to each other through snap fit action. The module land floor 1 can be made from various types of resins. For example, the module land floor 1 can be made from high density polyethylene (HDPE). The module land floor 1 is connected to the landbase leg shoes 13 using carriage bolts 22 and the vertical connector 15 supports the module roof 3, column 4 and module land floor 1. The vertical connector 15 is connected to the module using carriage bolts 22. The vertical connector 15 is made of galvanized steel. The column 4 can be made from various types of resins. For example, the column 4 can be made from high density polyethylene (HDPE). The column 4 is injected with various types of foam. For example, it can be injected with high density polyurethane (HDPU) foam.

Figure 3:
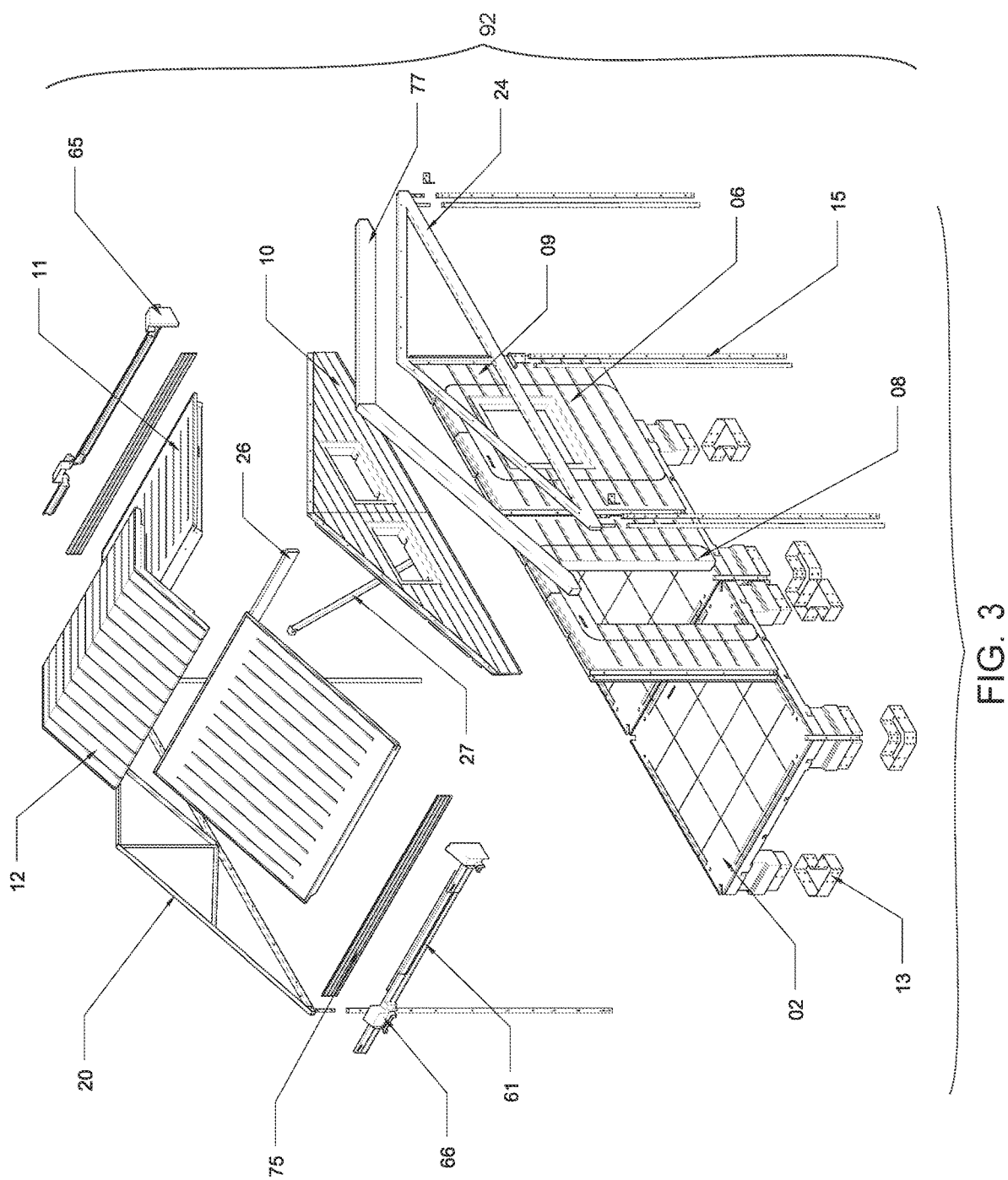
FIG. 3 is an exploded perspective view of two triangle modules, according to an embodiment of the present invention.

FIG. 3 is an exploded perspective view of two land triangle modules 92, according to an embodiment of the present invention. The approximate dimensions of one land triangle module 92 can be about 2.4 meters length×about 2.4 meters width×about 3.4 meters height. 3.4 meters in height is measured from the module land deck 2 to the bottom of the triangle panel 10 and approximately 4.9 meters in height is measured from the module land deck 2 to the highest point on the triangle panel 10. A land triangle module 92 comprises the module land deck 2, bulkhead door 8, bulkhead large window 6, end wall frame 9 which is connected to the bulkhead door 8 or bulkhead large window 6. The triangle panel 10 is connected to the end wall frame 9 by threaded rod and nuts with washer 28. The roof comprises the roof ridge 12, sloped roof flashing 61, and roof flat 11. Additionally, there is an interior facia 75 located on the inside of the land triangle module 92 which serves as an interior finish covering the steel structures. The interior facia 75 is connected to the sloped roof straps 31 by rivets (not shown, see FIG. 32). The landbase leg shoes 13 connects with the module land deck 2 using bolts 21. The bulkhead panels for the triangle module may also comprise the bulkhead wall 5, bulkhead large window 6, bulkhead small window 7, bulkhead door 8, (and later described, bulkhead plumbing wall 87) which are interchangeable with one another and may be designated as a second set of interchangeable bulkhead panels as a group. As the bulkhead panels are interchangeable, each of the first set of interchangeable bulkhead panels as used in the cube module are interchangeable with each of the second set of interchangeable bulkhead panels as used in the triangle module.

The individual parts of the land triangle module 92 shown in FIG. 3 are assembled together using galvanized steel hardware such as the default truss 20, end truss 24, vertical connector 15, kicker 27 and beam 26 to form a structurally stable land triangle module 92 as described throughout the description. The default truss 20 and the end truss 24 are inserted into their end truss legs 25 with the vertical connector 15 and then secured with bolts 21 and nuts. A beam 26 secured with bolts 21 and nuts connects a default truss 20 with an end truss 24 and a kicker 27 is used to connect the end truss 24 and the beam 26. The kicker 27 is connected to the end truss 24 using bolts 21 and nuts. The slope roof T cap 66 and the slope roof L cap 65 are used to waterproof the joints. The roof edge trim 77 is used for waterproofing the front or back of the roof flat 11 and the roof ridge 12. The slope roof T cap 66 and the slope roof L cap 65 are made of MDPE or HDPE, more preferably HDPE. The roof edge trim 77 is made of PVC. The roof flat 11 and the roof ridge 12 are made of MDPE or HDPE, more preferably HDPE.

Figure 4:
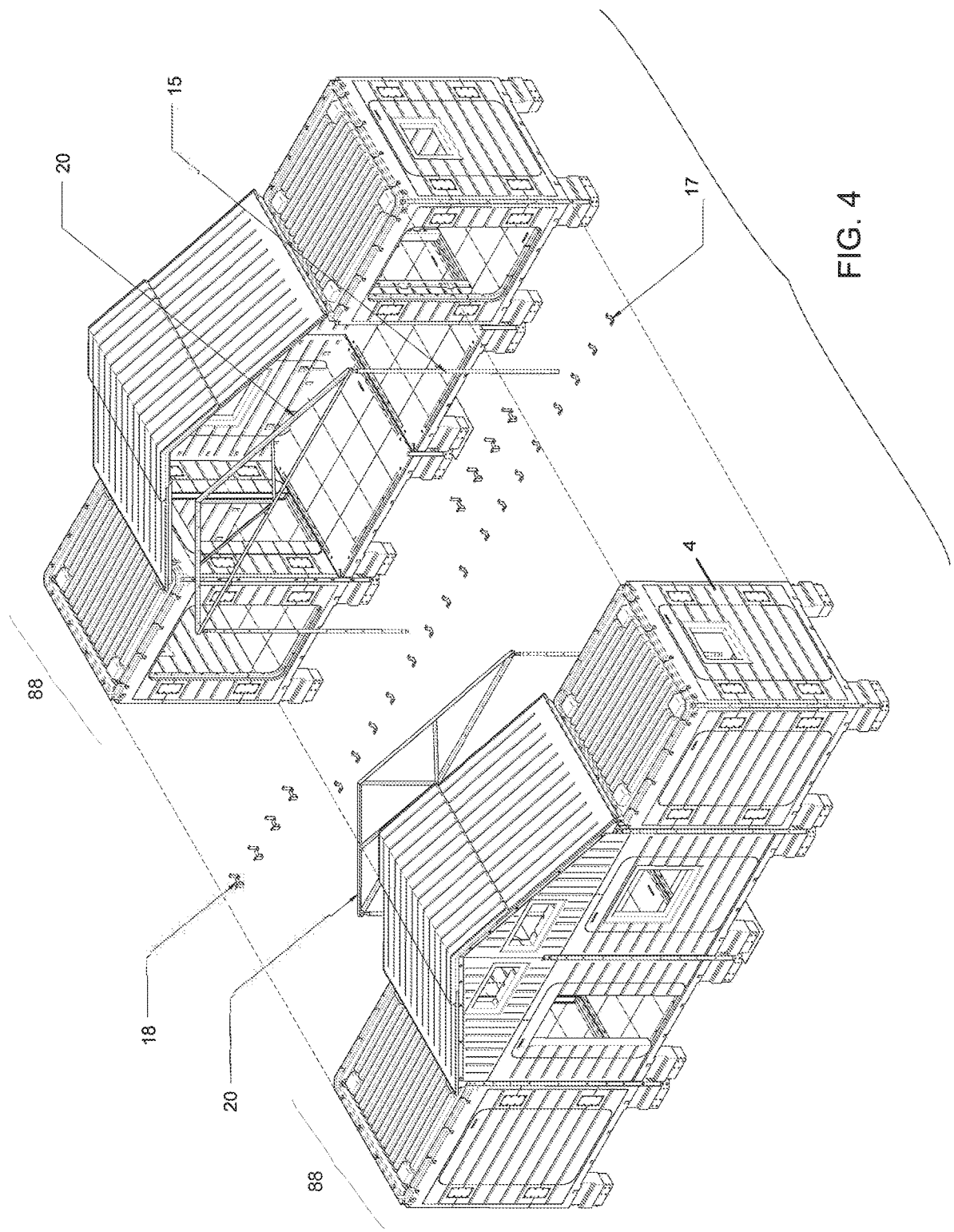
FIG. 4 is an exploded perspective view of the assembly of two 1×4 linear constructed unit, according to an embodiment of the present invention.

FIG. 4 is an exploded perspective view of the assembly of two 1×4 linear constructed unit 88 to form a 2×4 constructed unit 88, according to an embodiment of the present invention. The two linear constructed units 88 are connected to each other using identical parts by various straps such as the module strap 17 and the roof strap whole 18 to create the 2×4 constructed unit 88. The module strap 17 and the roof strap whole 18 are made of galvanized steel. The module strap 17 and the roof strap whole 18 are used in conjunction with bolts to secure objects. The role of the roof strap whole 18, which can be a steel structural part, can also be used to fix the module roof 3. The default truss 20 and vertical connector 15 assist in assembling the land triangle module 92. Between two default trusses 20, rubber spacers 57, such as neoprene, are inserted to prevent shock or vibration (not shown, see FIG. 24 and FIG. 25). Of course, other configurations of the land cube module 90 and land triangle module 92 can be contemplated.

The module strap 17 is inserted from the underside of the module land deck 2 and module land floor 1 once the module land deck 2 and module land floor 1 are adjacent to each other and bolts 21 are then inserted through the holes to secure the two components. In order to connect the module land floor 1 to the bulkhead wall 5, a longer bolt, such as a carriage bolt 22 is used instead.

Figure 5:
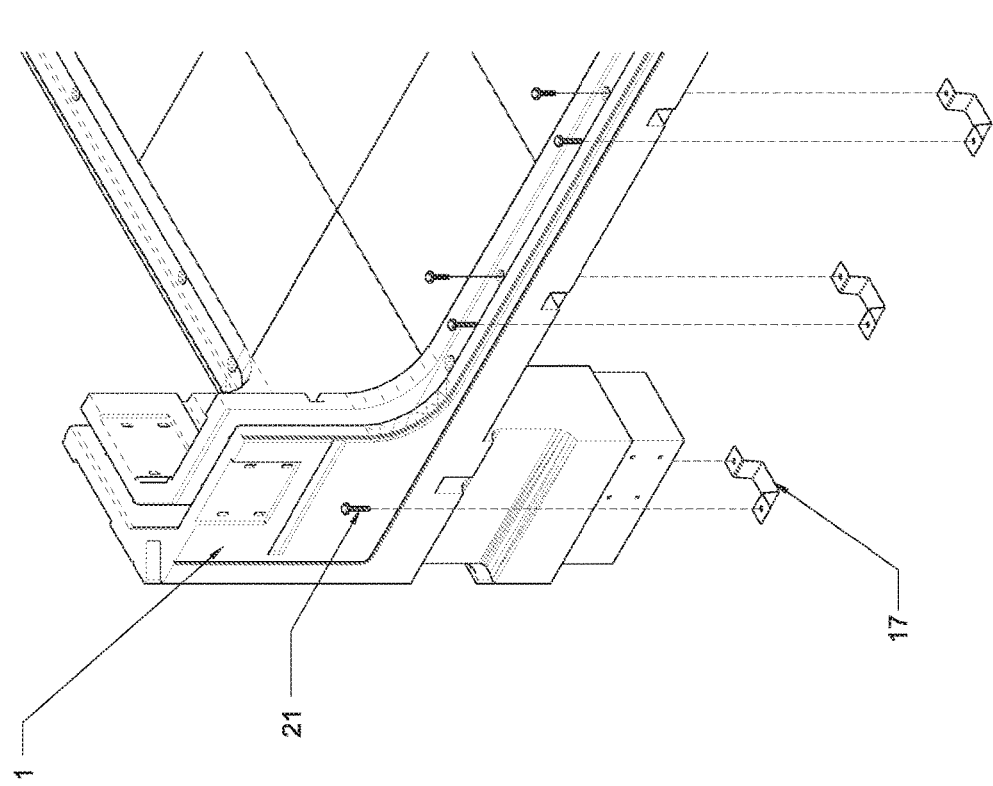
FIG. 5 illustrates a detailed view of a module land floor showing module straps inserted into a bolt to form a connection with the adjacent module and floor, according to an embodiment of the present invention.

FIG. 5 illustrates a detailed view of a corner of the module land floor 1 showing module straps 17 inserted into a bolt 21 to form a connection with the adjacent module land floor 1, according to an embodiment of the present invention. When two module land floors 1 are positioned adjacent to each other, the module strap 17 is inserted into its mating groove on each adjacent module land floor 1 and then a bolt 21 is inserted through a hole on the module strap 17. The module land floor 1 is used in the land cube module 90.

Figure 6:
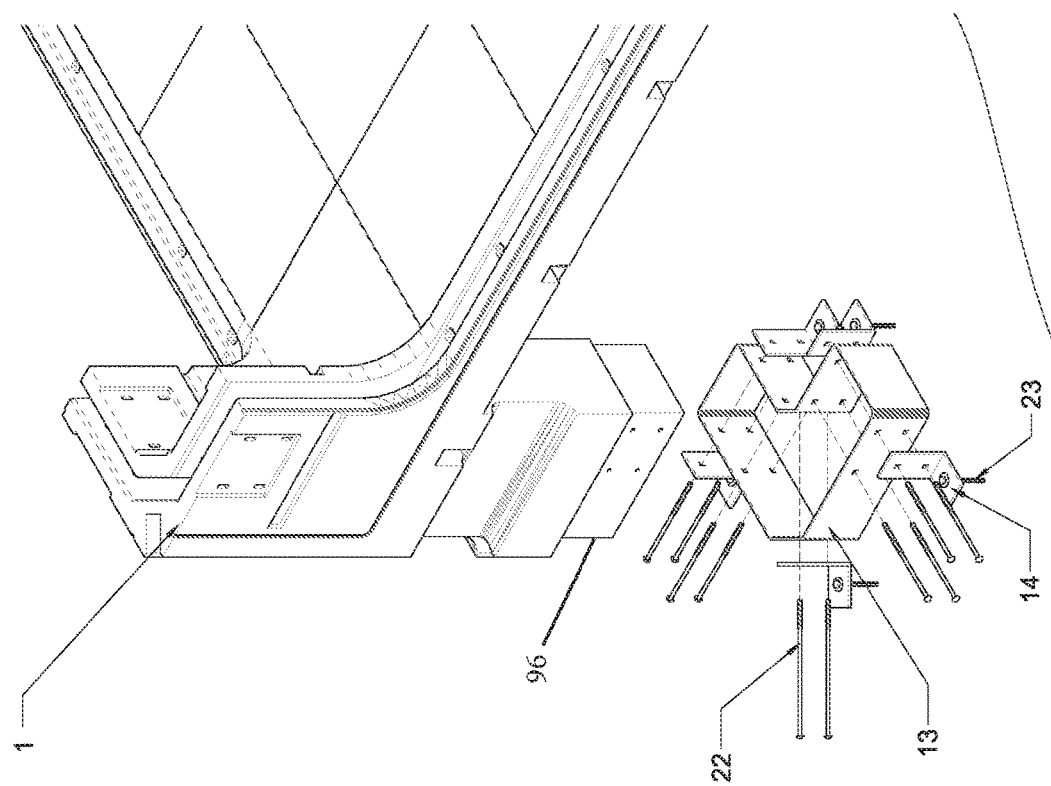
FIG. 6 illustrates a detailed view of the steel land base leg shoe wrapped around the leg of the module land floor using a footing angle plate which connects to the concrete foundation, according to an embodiment of the present invention.

FIG. 6 illustrates the leg 96 of the module land floor 1 inserted into the pre-molded slot of the steel land base leg shoes 13. The steel land base leg shoe 13 is wrapped around the leg 96 of the module land floor 1 using a footing angle plate 14 secured by carriage bolts 22. The footing angle 14 secures to the concrete foundation using an anchor bolt 23.

Figure 7:
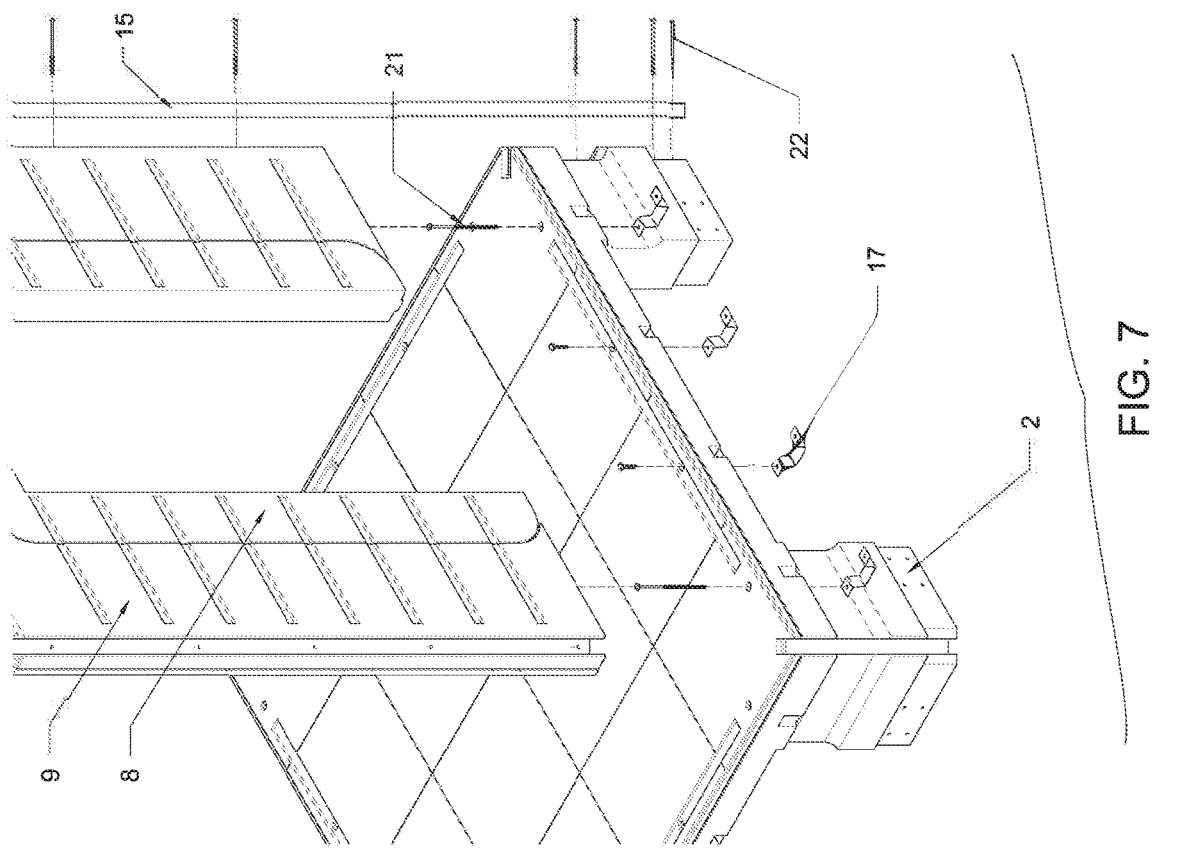
FIG. 7 illustrates an exploded view of a module and deck, end wall frame and bulkhead door assembly, according to an embodiment of the present invention.

FIG. 7 illustrates a detailed view of a module land deck 2, end wall frame 9 and bulkhead door 8 assembly, according to an embodiment of the present invention. The end wall frame 9 and bulkhead door 8 are connected to each other by a tongue a groove mechanism. The assembly of the end wall frame to the bulkhead door 8 is then fastened to the module land deck 2 using four steel module straps 17 and four bolts 21 to secure the wall system to the land deck. The wall system 98 comprises the bulkhead door 8 and end wall frame 9. The assembled land deck 2 and wall system 98 is then further secured by the steel tube vertical connector 15 which is secured into the corner slots and carriage bolts 22. The module land deck 2 is used with the land triangle module 92.

Figure 8:
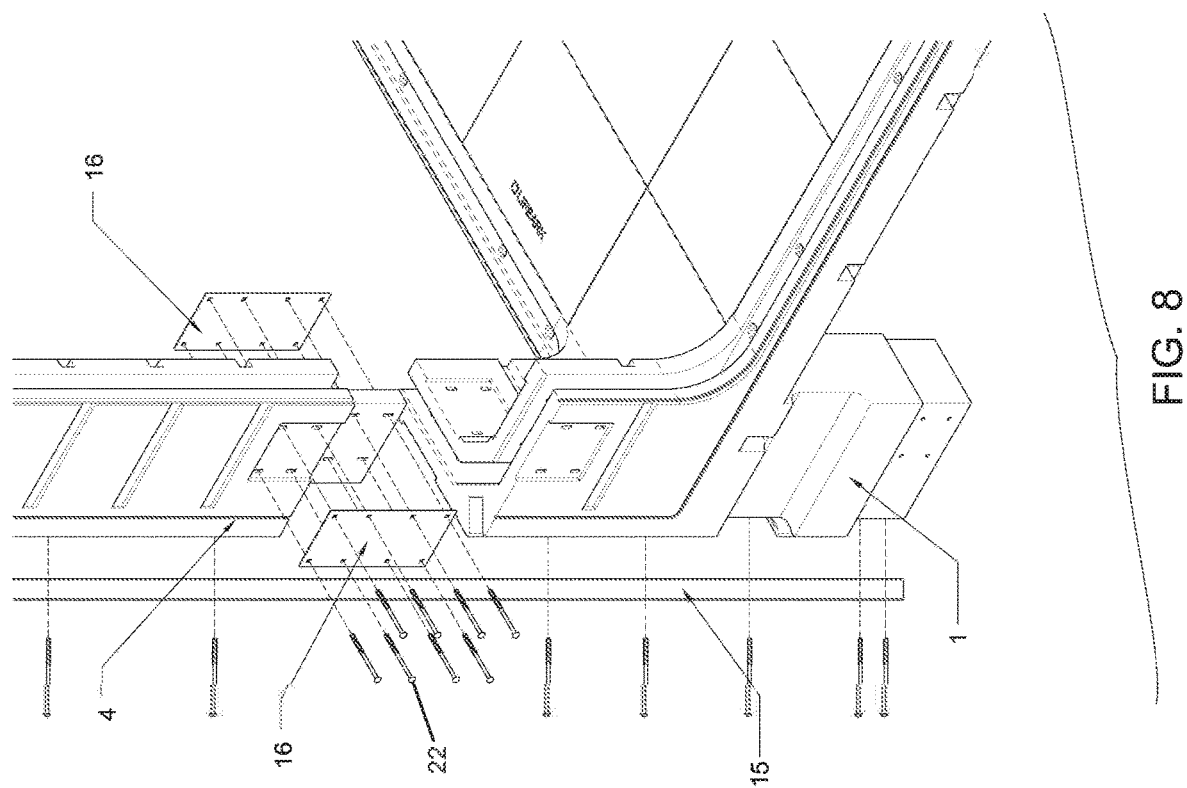
FIG. 8 illustrates an exploded view of the assembled module land floor using a tongue and groove system, two module plate connectors and steel vertical connectors, according to an embodiment of the present invention.

FIG. 8 illustrates an exploded view of the module land floor 1 assembled using a tongue and groove system and two module plate connectors 16 and steel vertical connectors 15, according to an embodiment of the present invention. Module land floor 1 and corner column 4 are assembled by a tongue and groove system which is further fastened to each other with steel plates 16 from both sides which overlaps the module land floor 1 and column 4. The steel plates 16 are connected to the steel plate slots using carriage bolts 22 from outside to inside providing a sandwiching of the tongue and groove parts of the module land floor 1 and column 4. The assembled modular land floor 1 and corner column 4 are then further secured by steel tube vertical connector 15 which is secured into the corner slots and bolted using the carriage bolt 22. The module land floor 1 is used with the land cube module 90.

Figure 9:
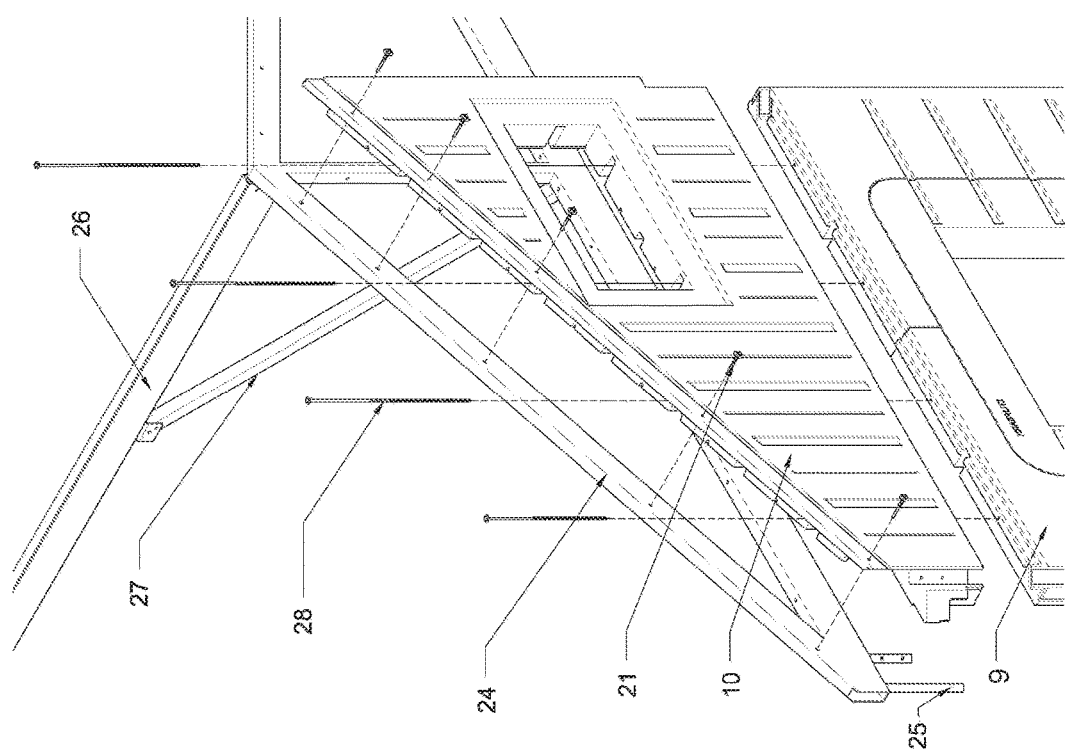
FIG. 9 illustrates an exploded perspective view of an assembly of the end wall frame and triangle comprising a steel end truss, a beam, and a kicker, according to an embodiment of the present invention.

FIG. 9 illustrates an exploded perspective view of an assembly of the end wall frame 9 and triangle panel 10, according to an embodiment of the present invention. The triangle panel 10 with tongue and groove system and the end wall frame 9 are assembled together by inserting the groove portion of the triangle panel 10 into the mating tongue portion of the end wall frame 9. When the triangle panel 10 is connected with the end wall frame 9, the assembled part is then further fastened to the truss structure system. The truss structure system, located at the end of triangle module, comprises a steel end truss 24 connected to at least two end truss leg 25, two vertical connector 15, a beam 26, and a kicker 27, according to an embodiment of the present invention. The bottom and top portion of the kicker 27 is secured with bolts 21 and nuts to the two bolt holes of the kicker 27. The steel end truss 24 is connected to the triangle panel 10 using bolts 21 and the triangle panel 10 is secured to the end wall frame 9 using threaded rods 28. The end truss leg 25 are inserted into the vertical connector 15.

Figure 10:
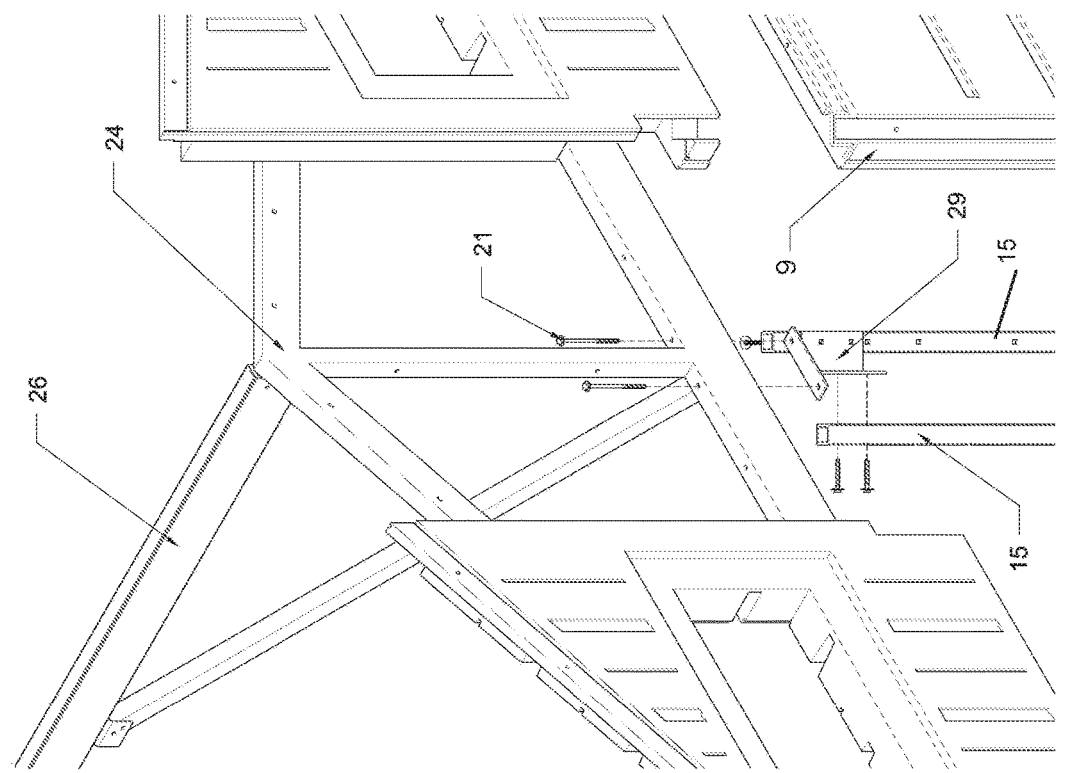
FIG. 10 is an exploded perspective view illustrating the steel end truss and the vertical connector connected to the steel roof tie end, according to an embodiment of the present invention.

FIG. 10 is an exploded perspective view illustrating the steel end truss 24 and the vertical connectors 15 connected to the steel roof tie end 29, according to an embodiment of the present invention. The end truss 24 and the vertical connectors 15 are assembled to the roof tie end 29 by aligning the holes on the vertical connectors 15 and steel roof tie end 29. Once the holes are aligned bolts 21 are inserted through each vertical connector 15 and steel roof tie end 29 and secured. After the two vertical connectors 15 are secured to the steel roof tie end 29, the holes from the upper portion of the steel roof tie end 29 are aligned with the holes of the end truss 24 from below the horizontal bar of the end truss 24. The end truss 24 is secured to the assembled vertical connectors 15 and steel roof tie end 29 by bolts 21 or carriage bolts 22. The beam 26 connects the end truss 24 and default truss 20 to each other. The tongues located on the upper portion of the end wall frame 9 are slid into the grooves located on the bottom portion of the triangle panel 10 to connect the two pieces together to make a wall.

Figure 11:
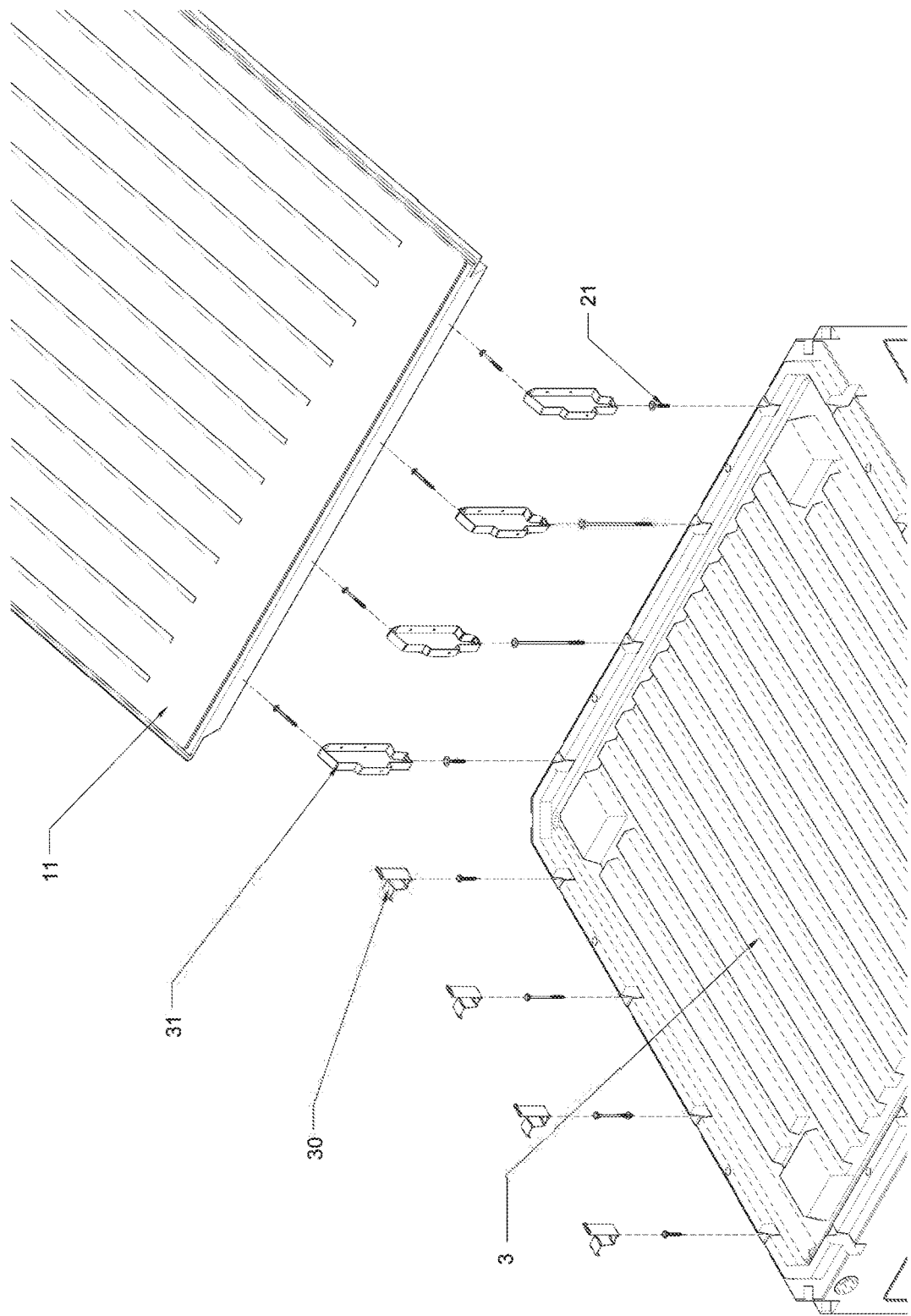
FIG. 11 is an exploded perspective view illustrating the sloped roof strap connecting the sloped roof flat and the flat module roof, according to an embodiment of the present invention.

FIG. 11 is an exploded perspective view illustrating the sloped roof strap 31 connecting the sloping roof flat 11 and the flat module roof 3, according to an embodiment of the present invention. The roof strap end 30 is used to connect the module roof 3 to the bulkhead wall 5 with bolts 21 and nuts. The roof strap end 30 can be used to fit the roof perimeter cap 60 to the module roof 3. The sloping roof flat 11 is connected to the module roof 3 by the steel sloped roof strap 31 using bolts 21. Each steel sloped roof strap 31 is slid into each slot located on the upper exterior portion of the module roof 3. Once each steel sloped roof strap 31 is in place, it is secured to the module roof 3 with bolts 21 on the bottom portion of the steel sloped roof strap 31. On the lateral side of the steel sloped roof strap 31, the sloping roof flat 11 is further fastened to it.

Figure 12:
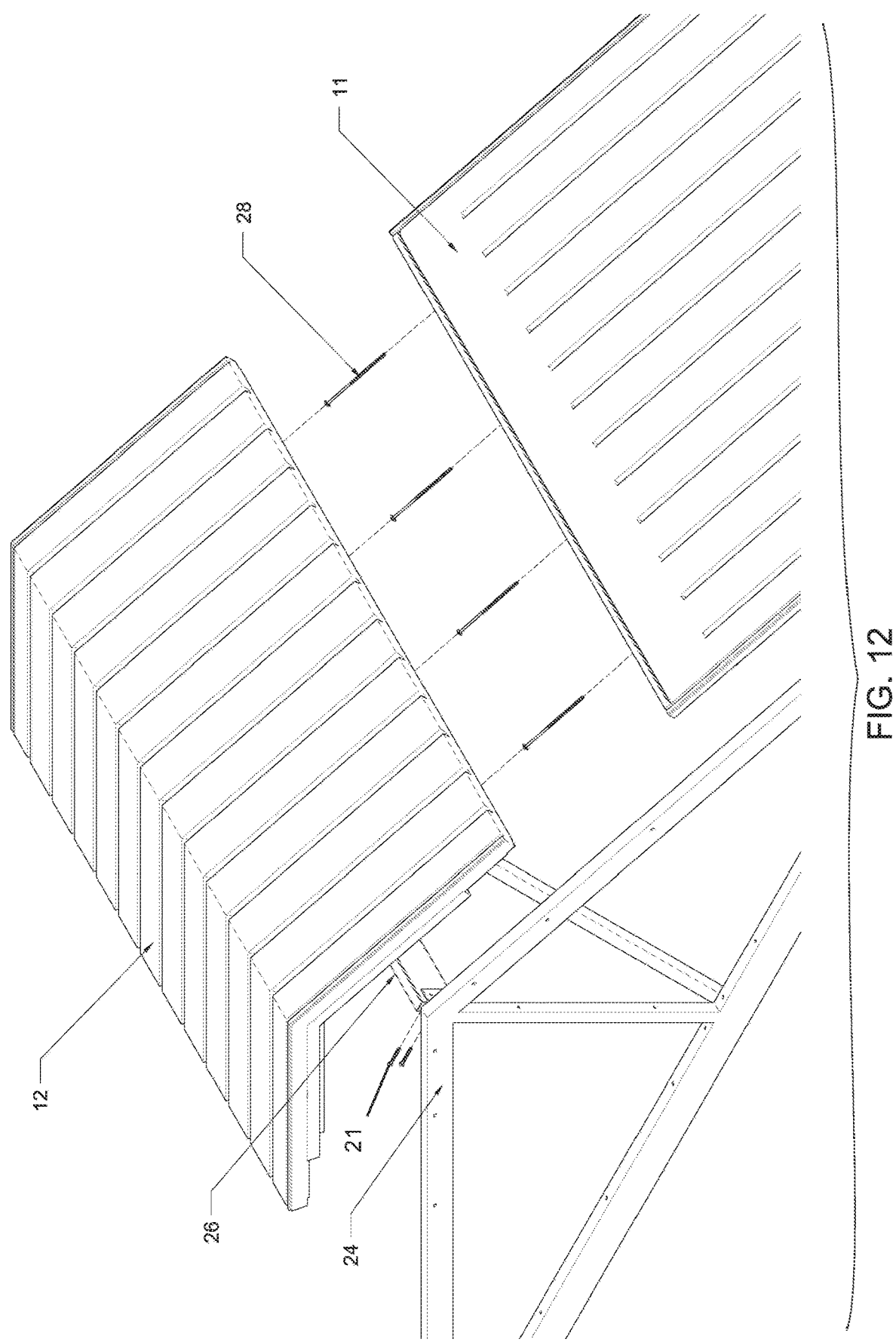
FIG. 12 is an exploded perspective view illustrating the roof ridge and the roof flat connected by threaded rods, according to an embodiment of the present invention.

FIG. 12 is an exploded perspective view illustrating the roof ridge 12 and the roof flat 11 connected by threaded rods 28, according to an embodiment of the present invention. After the steel beam 26 is connected to the steel truss 24 using bolts 21, the roof flat 11 is placed on the steel truss 24 and the groove of the inner central peak of the roof ridge 12 is fitted into the top portion of the beam 26 and secured with threaded rods 28 through the lower bolt slot of the roof flat 11.

Figure 13A:
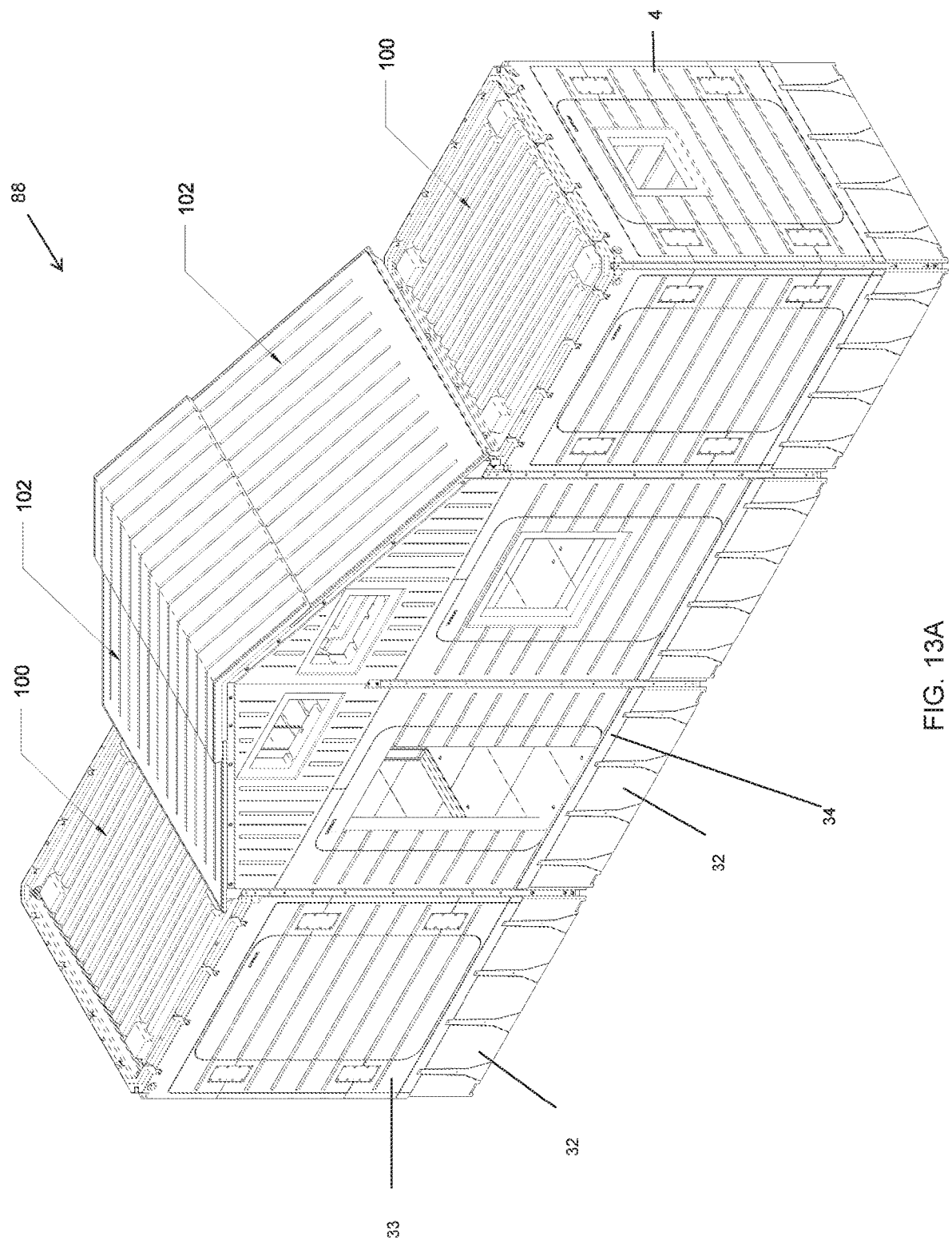
FIG. 13A is a front perspective view of an assembled, constructed unit comprising two water cube modules and two water triangle modules, according to an embodiment of the present invention.

FIG. 13A is a front perspective view of another embodiment of the assembled constructed unit 88 comprising two water cube modules 100 and two water triangle modules 102, according to an embodiment of the present invention. FIG. 13A-13G illustrates an assembled water constructed unit 88 of one module by four modules (1×4) connected to form a single linear constructed unit 88. The 1×4 assembled constructed unit 88 is configured with two water cube modules 100 as bookends to two water triangle modules 102 sandwiched in the middle to form a linear constructed unit 88. The water 1×4 assembled constructed unit 88 is similar to the land 1×4 assembled constructed unit 88 and the material used for the land embodiment are used for the water embodiment. The hull module 32 and the module water floor 33 are used in the water embodiment. The water cube module 100 serves a function of creating private space for the user and the water triangle module 102 serves to create a public space.

The constructed unit 88 illustrated in FIG. 13A is an embodiment used on water. In the water embodiment, the module land floors 1 of the land cube module 90 are replaced with hull modules 32 and module water floors 33. The module land decks 2 of the land triangle modules 92 are replaced with hull modules 32 and module water decks 34 and these components are made of HDPE. The method of connecting the upper structure of the water embodiments is similar to that of the land embodiments, except the replaced hull modules 32 are connected strongly to each other through full hull connectors 36 made of HDPE (not shown, see FIG. 14) so that there is no problem with buoyancy and resilience.

Figure 13B:
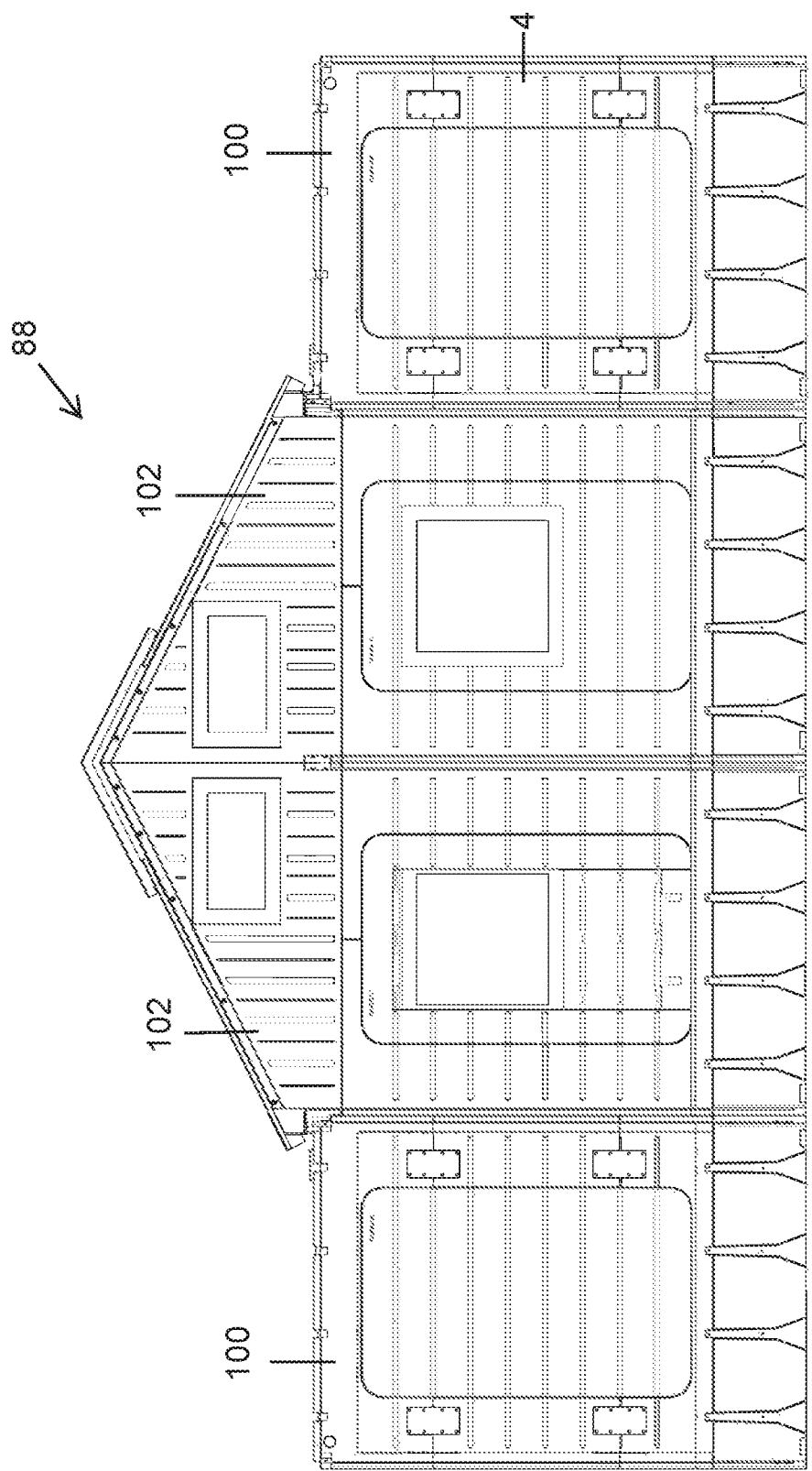
FIG. 13B is a front elevational view of an assembled, constructed unit comprising two water cube modules and two water triangle modules, according to an embodiment of the present invention.
Figure 13C:
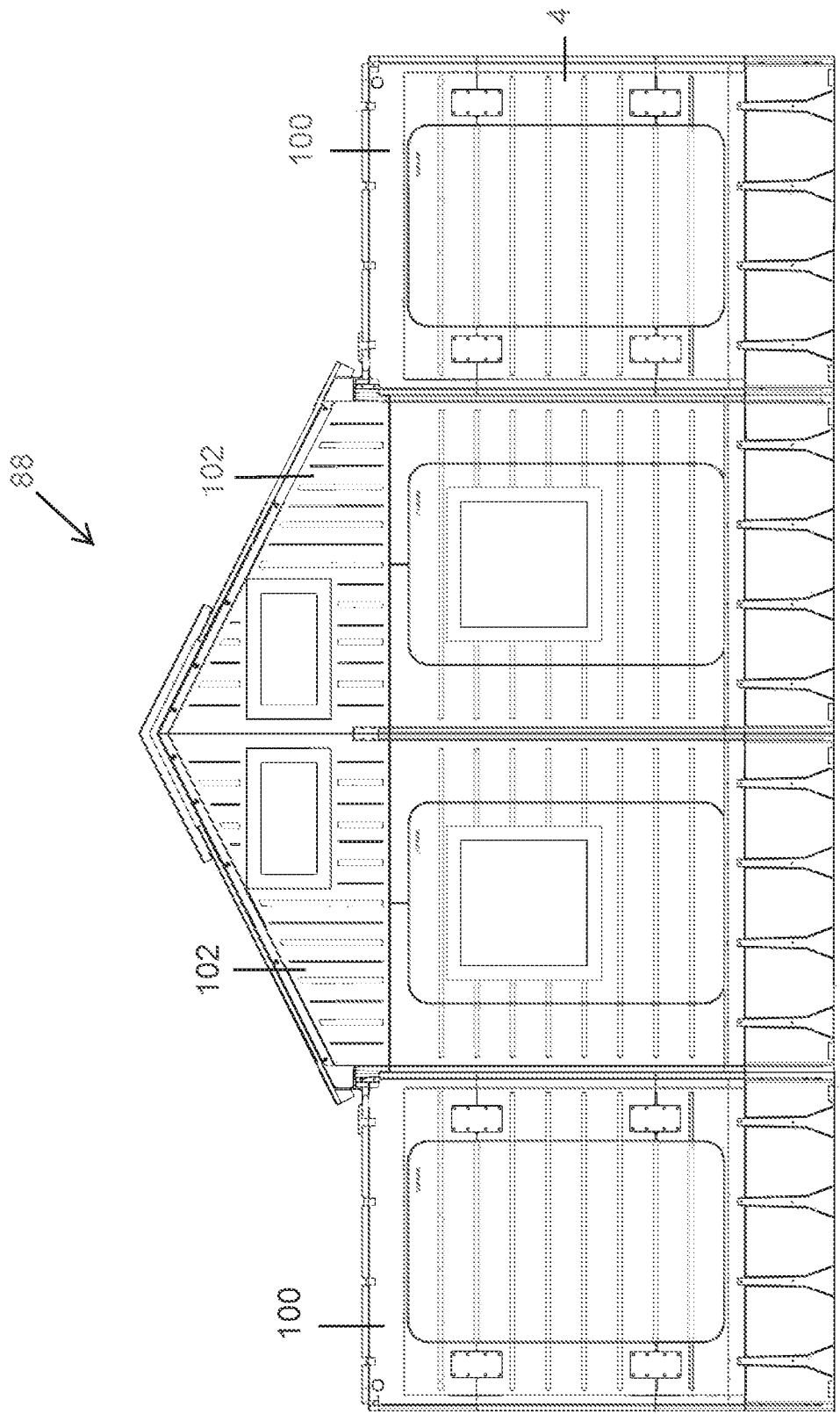
FIG. 13C is a rear elevational view, of an assembled, constructed unit comprising two water cube modules and two water triangle modules, according to an embodiment of the present invention.
Figure 13D:
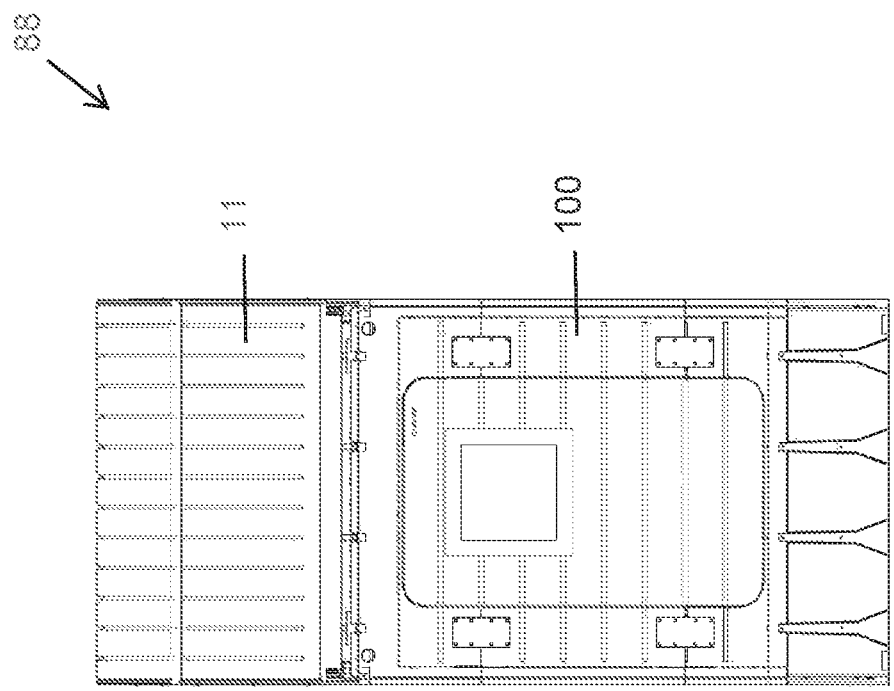
FIG. 13D is a right side elevational view of an assembled, constructed unit comprising two water cube modules and two water triangle modules, according to an embodiment of the present invention.
Figure 13E:
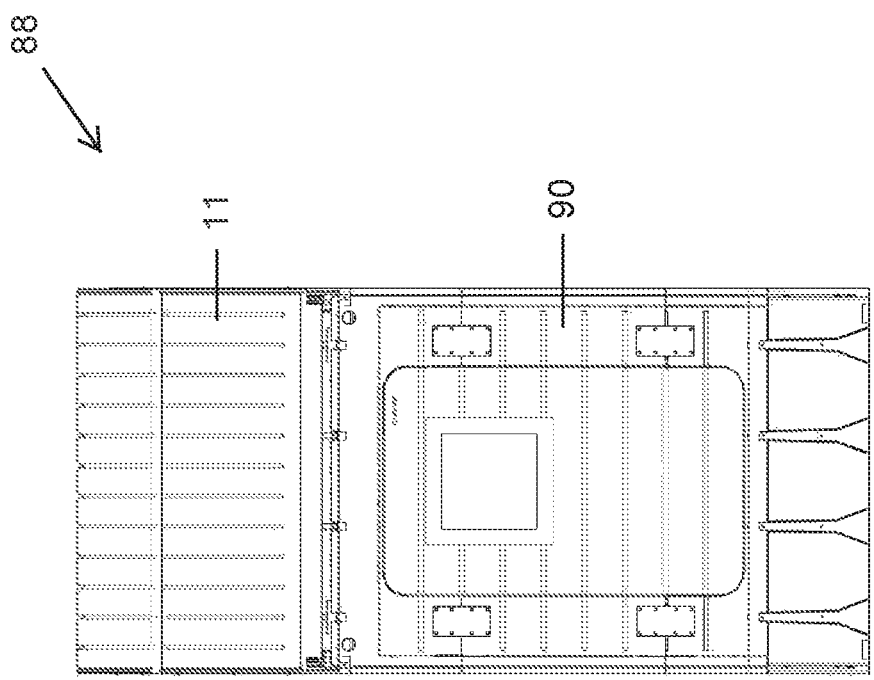
FIG. 13E is a left side elevational view of an assembled, constructed unit comprising two water cube modules and two water triangle modules, according to an embodiment of the present invention.
Figure 13F:
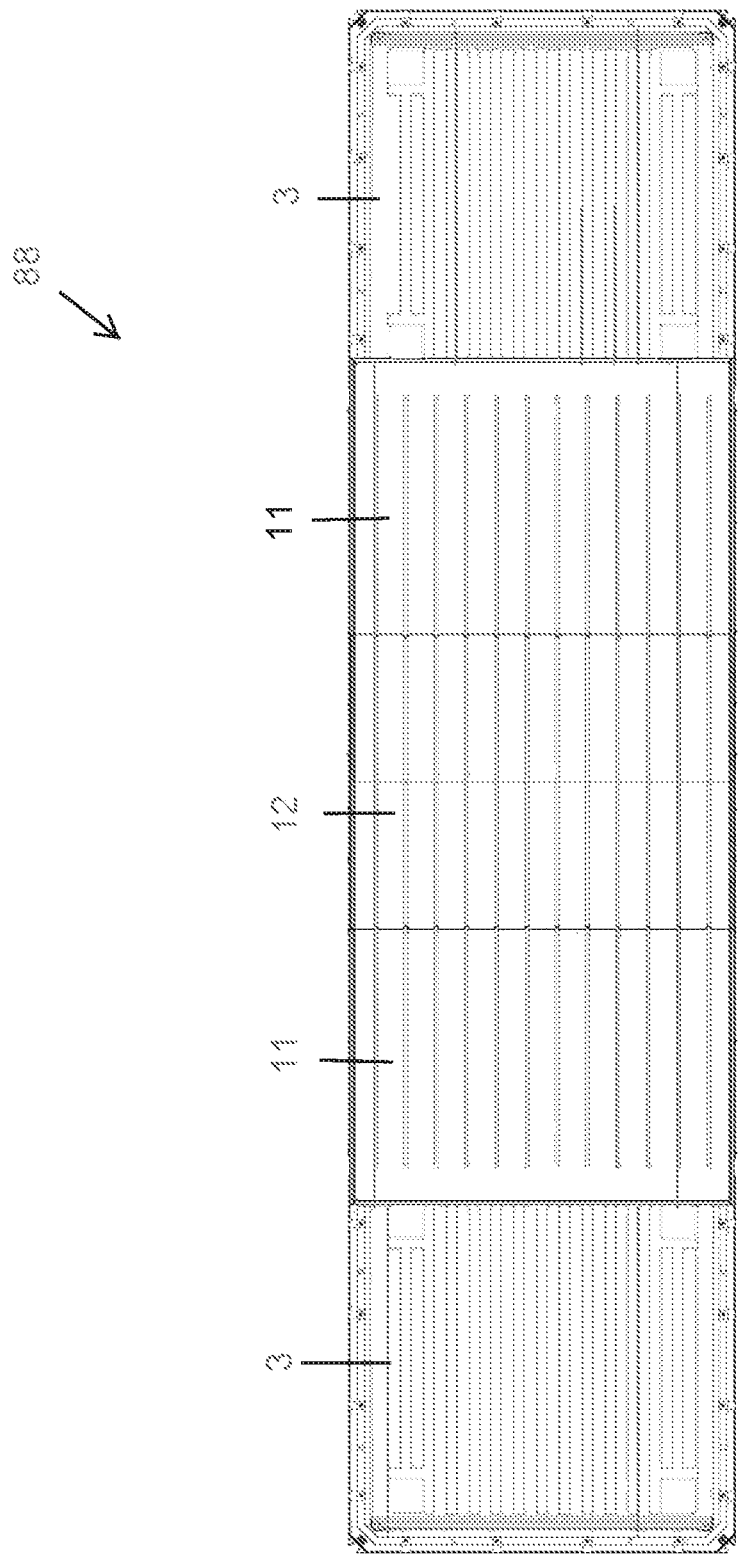
FIG. 13F is a top plan view of an assembled, constructed unit comprising two water cube modules and two water triangle modules, according to an embodiment of the present invention.
Figure 13G:
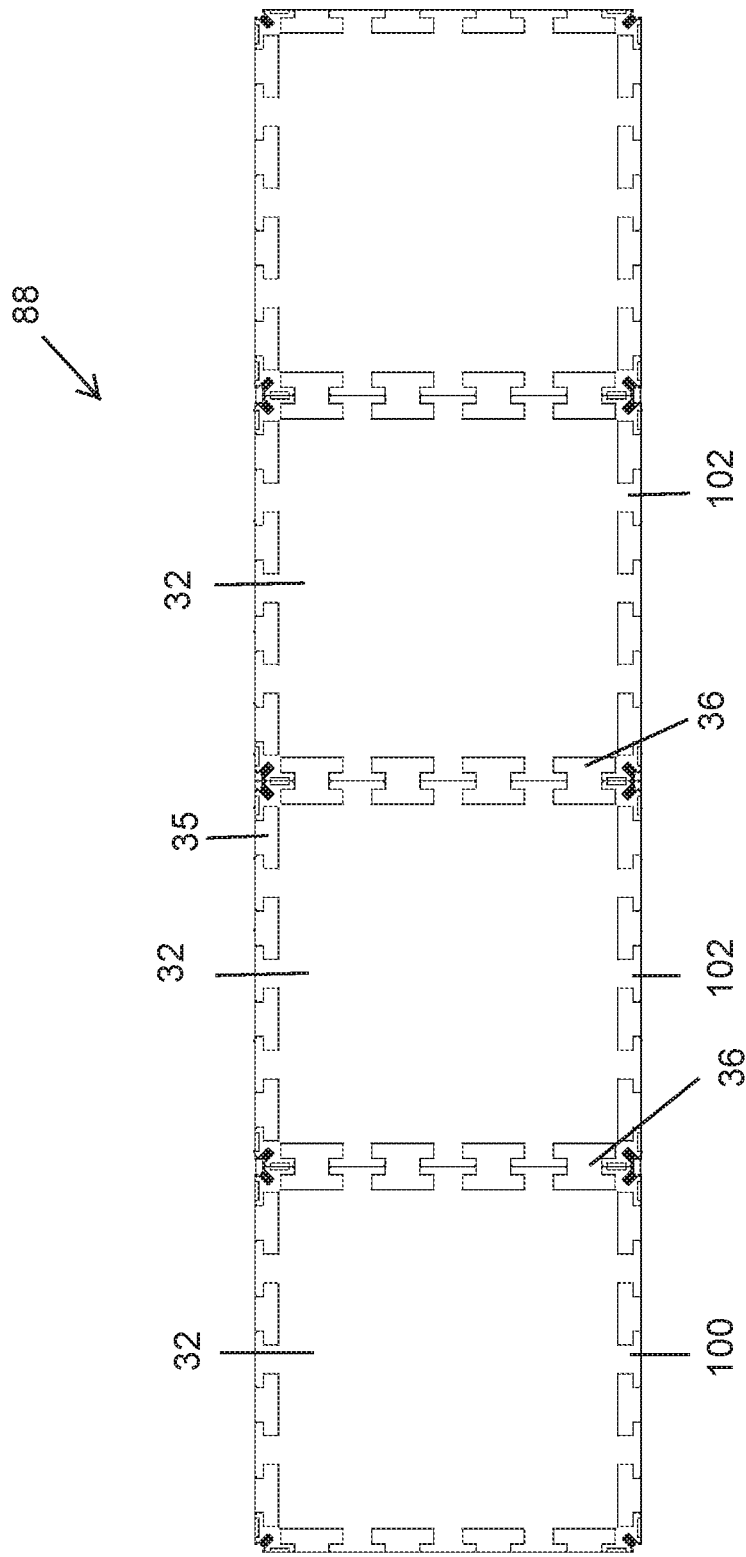
FIG. 13G is a bottom plan view of an assembled, constructed unit comprising two water cube modules and two water triangle modules, according to an embodiment of the present invention.

FIG. 13B is a front elevational view of an assembled, constructed unit 88 comprising two water cube modules 100 and two water triangle modules 102, according to an embodiment of the present invention. FIG. 13C is a rear elevational view of an assembled, constructed unit 88 comprising two water cube modules 100 and two water triangle modules 102, according to an embodiment of the present invention. FIG. 13D is a right side elevational view of an assembled constructed unit 88 comprising two water cube modules 100 and two water triangle modules 102, according to an embodiment of the present invention. As shown, the roof-flat 11 of the water triangle module 102 slants upward from the water cube module 100. FIG. 13E is a left side elevational view of an assembled, constructed unit 88 comprising two water cube modules 100 and two water triangle modules 102, according to an embodiment of the present invention. Similarly, the roof-flat 11 of the water triangle module 102 slants upward from the water cube module 100. FIG. 13F is a top plan view of an assembled constructed unit 88 comprising two water cube modules 100 and two water triangle modules 102, according to an embodiment of the present invention. The two water cube modules 100 from both ends of the constructed unit 88 comprise a module-roof 3. The two water triangle modules 102 located in between the water cube module 100 each comprise a roof-flat 11 and a roof-ridge 12 covers a portion of both roof-flats 11. FIG. 13G is a bottom plan view of an assembled, constructed unit 88 comprising two water cube modules 100 and two water triangle modules 102, according to an embodiment of the present invention. The hull-module 32 is used for both the water cube module 100 and water triangle module 102. The hull module 32 of the water cube module 100 is connected to the hull module 32 of the water triangle module 102 using a full hull connector 36. The hull module 32 of the water triangle module 102 is connected to an adjacent hull module 32 of the water triangle module 102 using a full hull connector 36. The half hull connector 35 is used on the open side of the water cube module 100 and water triangle module 102. The water triangle module 102 sandwiched between the two water cube module 100, the hull-module 32 is connected to the module-water deck 34 using a half hull connector 35.

Figure 14:
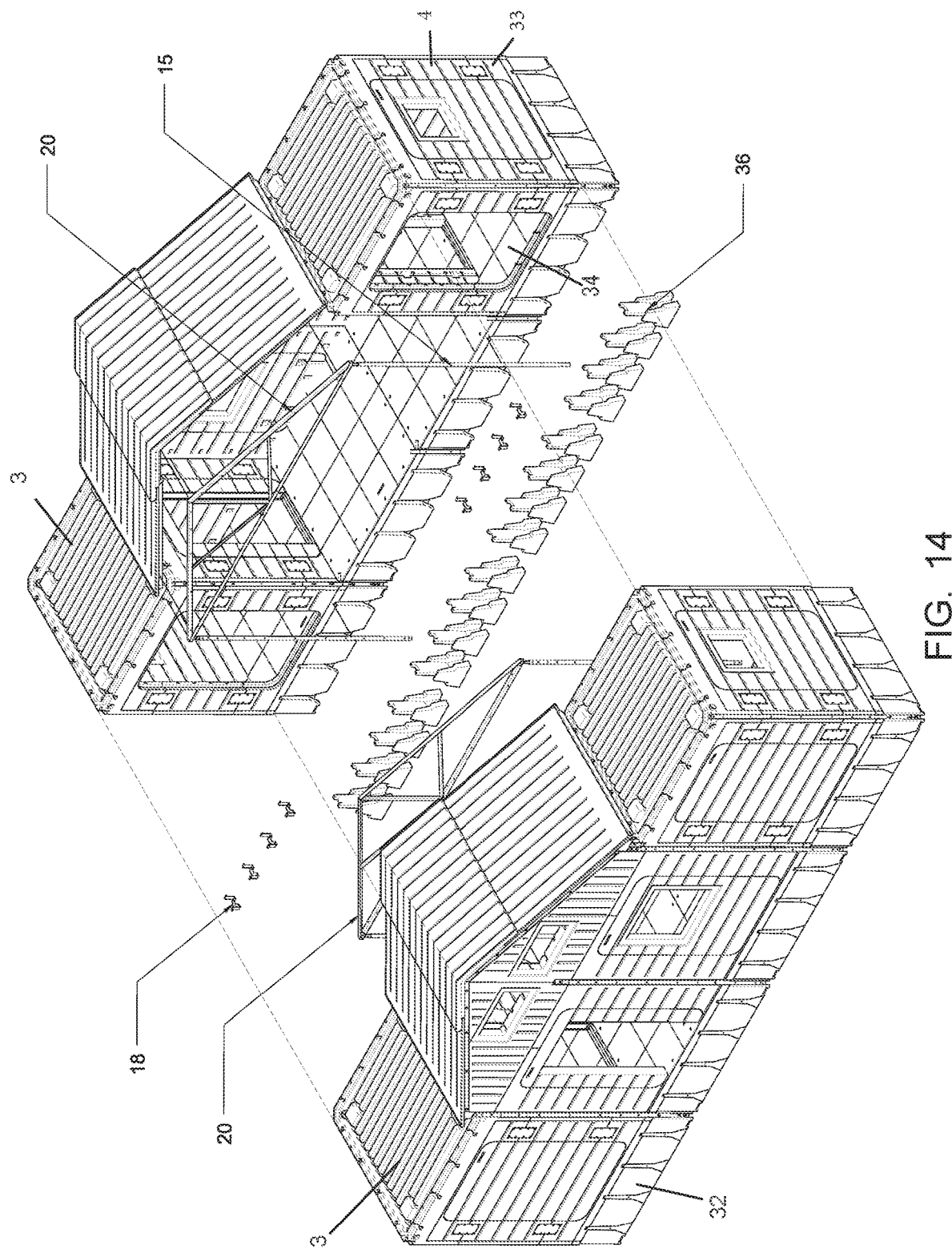
FIG. 14 is an exploded perspective view of the assembly of two 1×4 linear constructed unit, according to an embodiment of the present invention.

FIG. 14 is an exploded perspective view of the assembly of two 1×4 linear constructed units 88, according to an embodiment of the present invention. FIG. 14 shows the assembly of two floating 1×4 linear constructed units 88 for installation on water, having full hull connectors 36, water floors 33, and water decks 34 made from HDPE. The hull module 32 connects to another hull module 32 with full hull connectors 36 instead of module straps 17. The method of fixing the remaining upper part is the same as that of FIG. 4. The default truss 20 and the end truss 24 are inserted into their end truss legs 25 with the vertical connector 15 and then secured with bolts 21 and nuts. Of course, other configurations of the water cube module 100 and water triangle module 102 can be contemplated. For example, the end wall frame 9 can be connected with a bulkhead wall 5, bulkhead large window 6, bulkhead small window 7, or bulkhead plumbing wall 87. The two module roofs 3 from separate adjacent water cube modules 100 are connected using the roof strap whole 18. The roof strap whole 18 fixes onto the roof cap 59.

Figure 15:
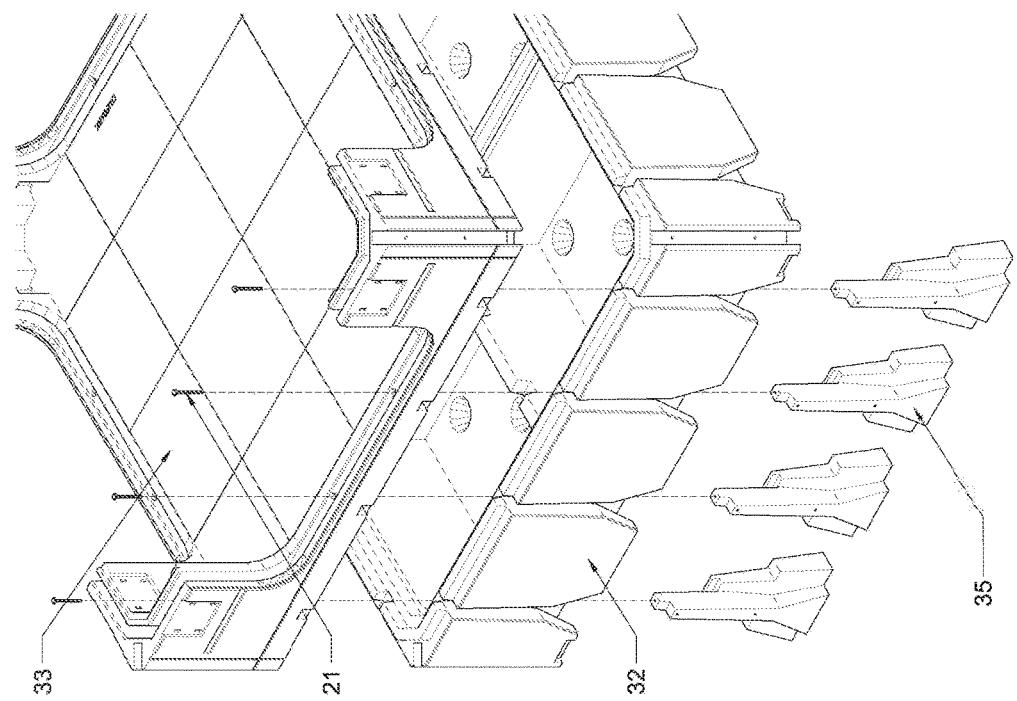
FIG. 15 is an exploded perspective view illustrating the cube module installed on the water, according to an embodiment of the present invention.

FIG. 15 is an exploded perspective view illustrating the bottom portion of the water cube module 100, according to an embodiment of the present invention. To assemble the module water floor 33 with the hull module 32, the groove of the module water floor 33 is inserted into the tongue of the hull module 32. Once the two pieces are joined, each hull connector half 35 is inserted into a groove located on the sides of the hull module 32 until it is substantially flush against the hull module 32. Once the hull connector half 35 is substantially flush against the hull module 32, a bolt is inserted through the top of the module water floor 33 and fastened into a hull connector half 35. The module water floor 33 is used with the water cube module 100.

Figure 16:
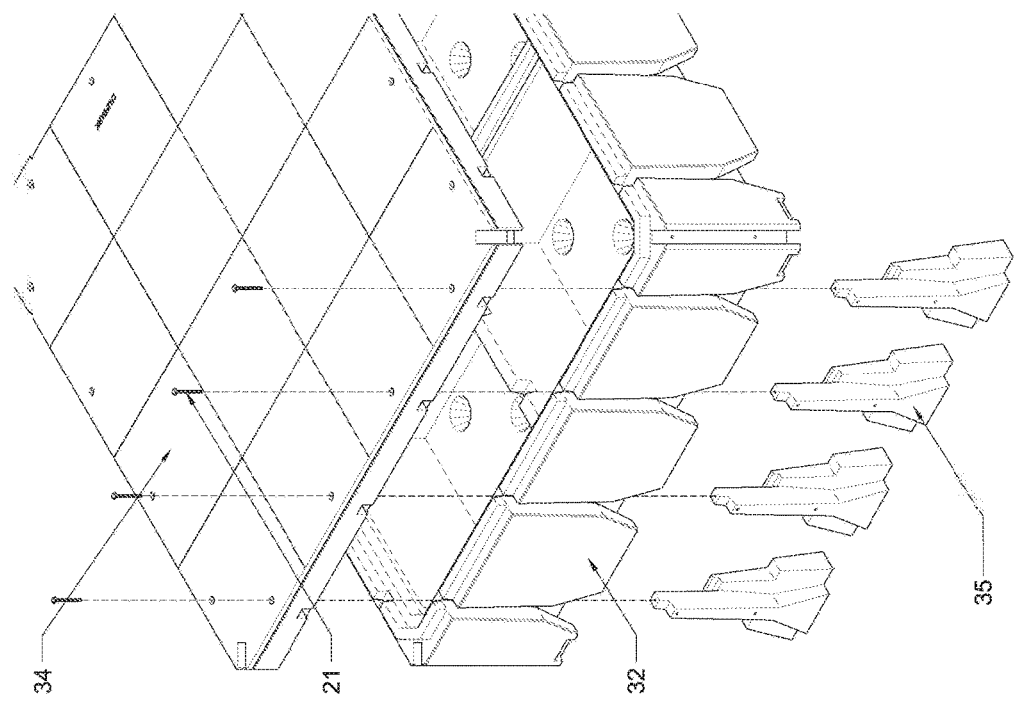
FIG. 16 is an exploded perspective view illustrating the module water deck of the cube module and the hull module connected by the hull connector half and the bolt and washer, according to an embodiment of the present invention.

FIG. 16 is an exploded perspective view illustrating the bottom portion of the water cube module 100, according to an embodiment of the present invention. The bottom portion comprises a module water deck 34 with the hull module 32 connected by the hull connector half 35 and the bolt 21. The module water deck 34 is used with the water triangle module 102. FIG. 16 has a similar assembly method with FIG. 15 in that the groove of the water deck 34 located on the undersurface of the water deck 34 is inserted into the tongue of the hull module 32. Once the two components are connected, the hull connector half 35 is inserted through a groove on the side of the hull module 32 from the underside of the hull module 32 and further fastened once again with bolts 21 inserted from the top of the water deck 34.

Figure 17:
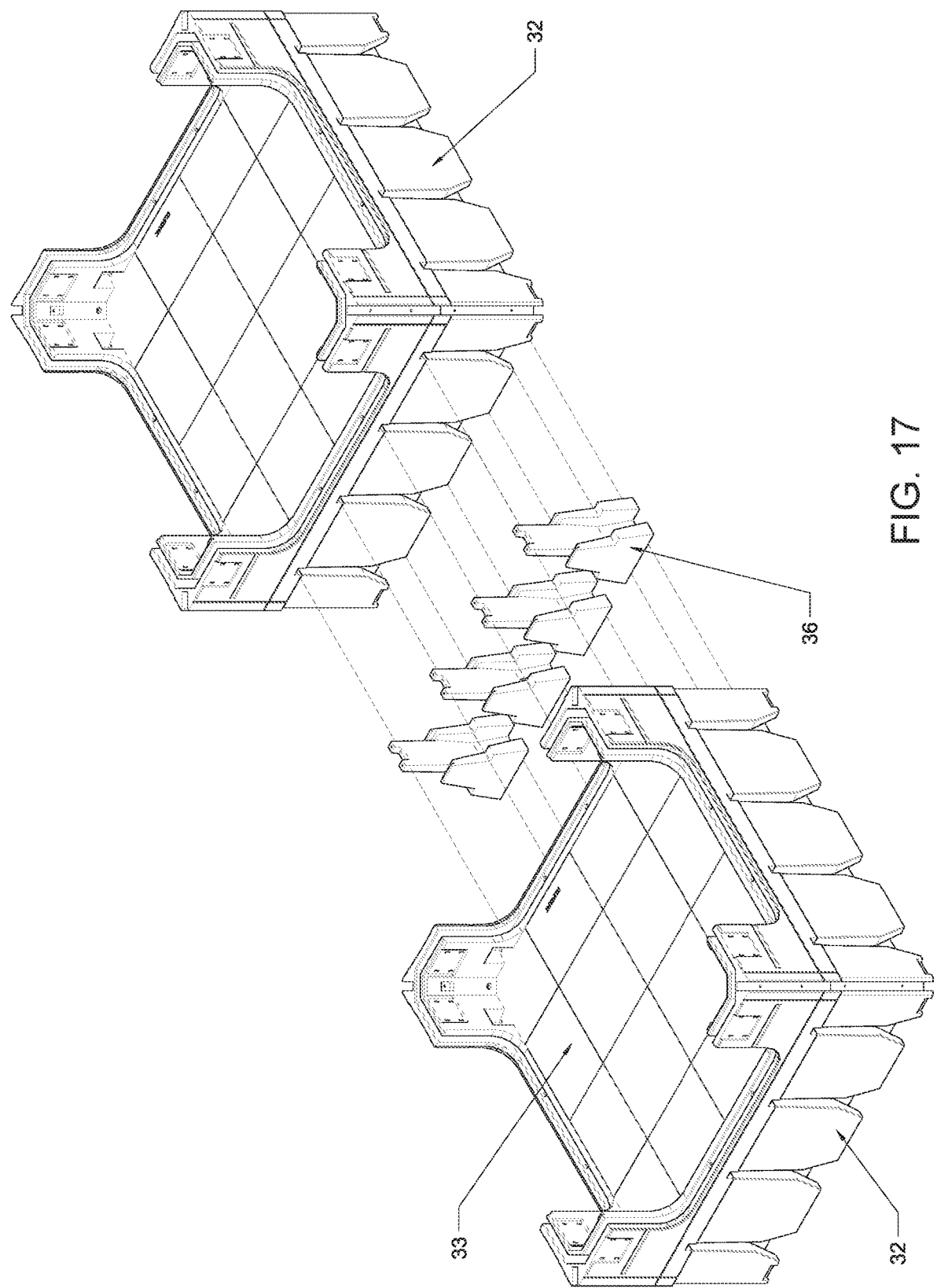
FIG. 17 illustrates two assembled floating cube modules connected by the full hull connectors, according to an embodiment of the present invention.

FIG. 17 illustrates the bottom portion of two water cube modules 100 connected by the hull connector full 36, according to an embodiment of the present invention. Once the hull module 32 and the module water floor 33 are connected, they can be connected to others using the hull connector full 36. Each hull connector full 36 comprises a middle portion and two adjacent portions located on the side of the middle portion. Each of the two adjacent portions are inserted into a groove located on the side of each hull module 32. The type of connection illustrated in FIG. 17 is found when the book ends of a one module by four modules (1×4) is connected to form a two modules by four modules (2×4).

Figure 20:
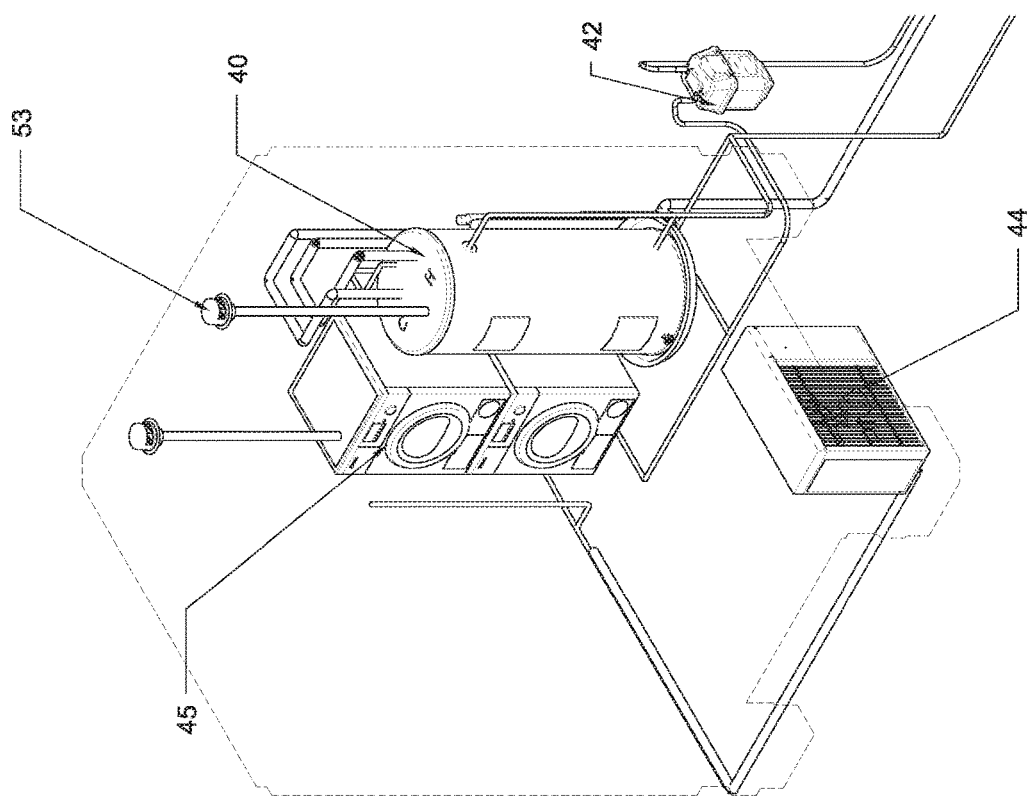
FIG. 20 is a perspective view illustrating the utility module system comprising a washer and dryer, vent caps, gas water heater, condensing unit, and gas meter, according to an embodiment of the present invention.

FIG. 18-FIG. 21 are perspective views illustrating the gas, electric, and mechanical systems for the on-grid or off-grid systems, according to an embodiment of the present invention. Inner space can also be referred to as the living space. The main MEP pipe 56 for gas, fire sprinkler 46, water supply, electricity, etc., is supplied to the inner space of the module through the crawl space. The crawl space is the space under the modular land deck 2 and the module land floor 1. The sewage pipe descends through the vertical piping in the inner space of the bulkhead wall slot and exits through the crawl space to the lower right side. The inner space is the vertical slot for vertical piping in the bulkhead. As illustrated in FIG. 20, gas is first supplied to the water heater 40 through the gas meter 42 and the water heater 40 provides hot and cold water inside. The vent caps 53 assist in keeping the pressure at normal levels. In addition, the W.M/dryer 45 and gas range are branched from the main pipe line and supplied separately. The heating, ventilation, and air conditioning (HVAC) system is supplied using the ductless mini split air conditioner and heat pump system and the heat pump 44 provides heating and cooling to multi zone through the inner high wall unit 43. In places where drinking water is used, a water filtration 41 is installed to supply purified water.

Figure 18:
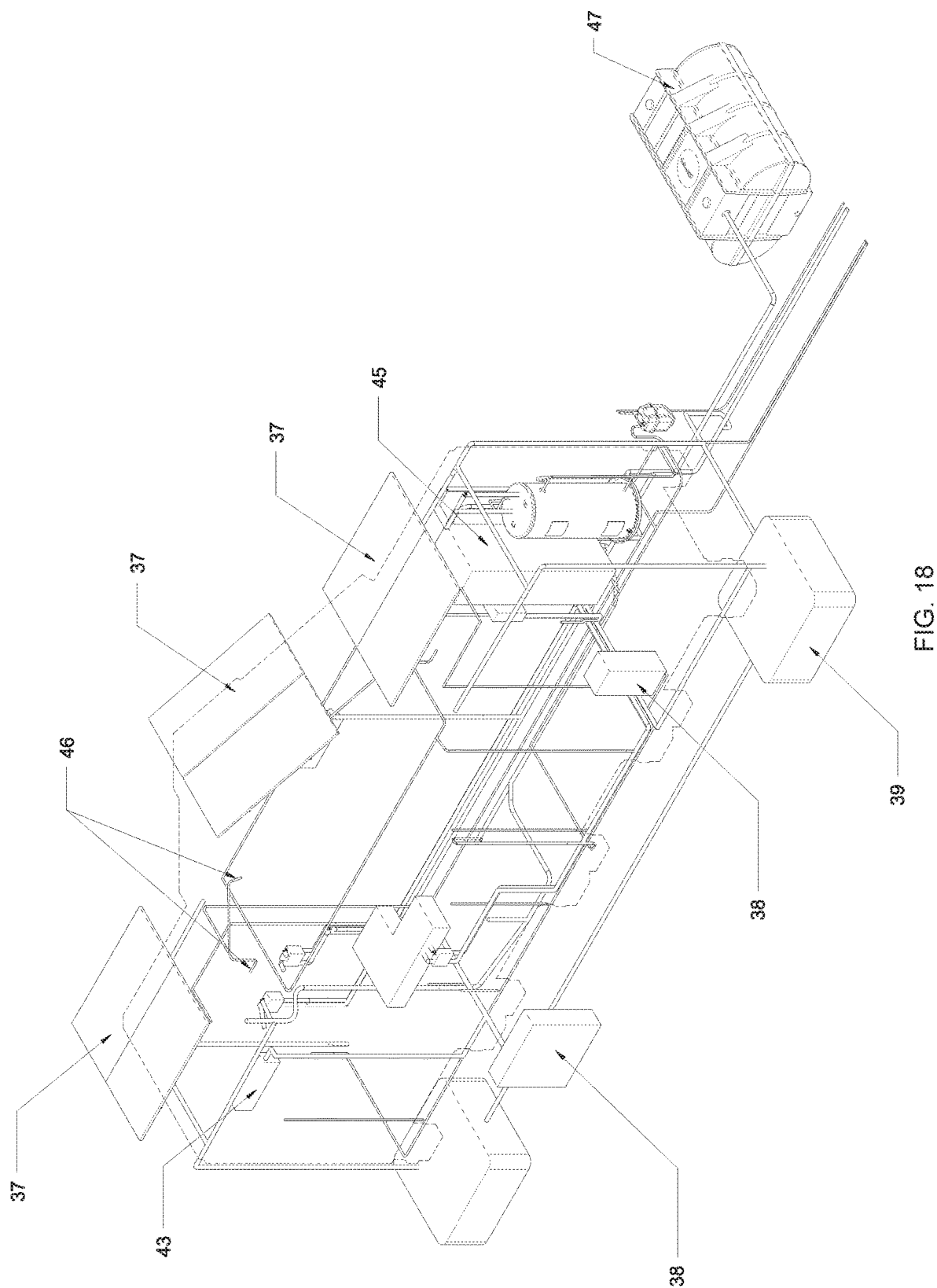
FIG. 18 is a perspective view illustrating the electrical and mechanical systems for on-grid or off-grid systems, according to an embodiment of the present invention.

As illustrated in FIG. 18, in the off-grid case, electricity is generated through the solar PV panel 37 and stored in the battery 38 through the inverter to supply electricity. The drainage system utilizes a septic tank 47 to minimize soil contamination. The rainwater on the roof is collected and stored in the rainwater storage tanks 39 and supplied to the inner space through water pump.

Figure 19:
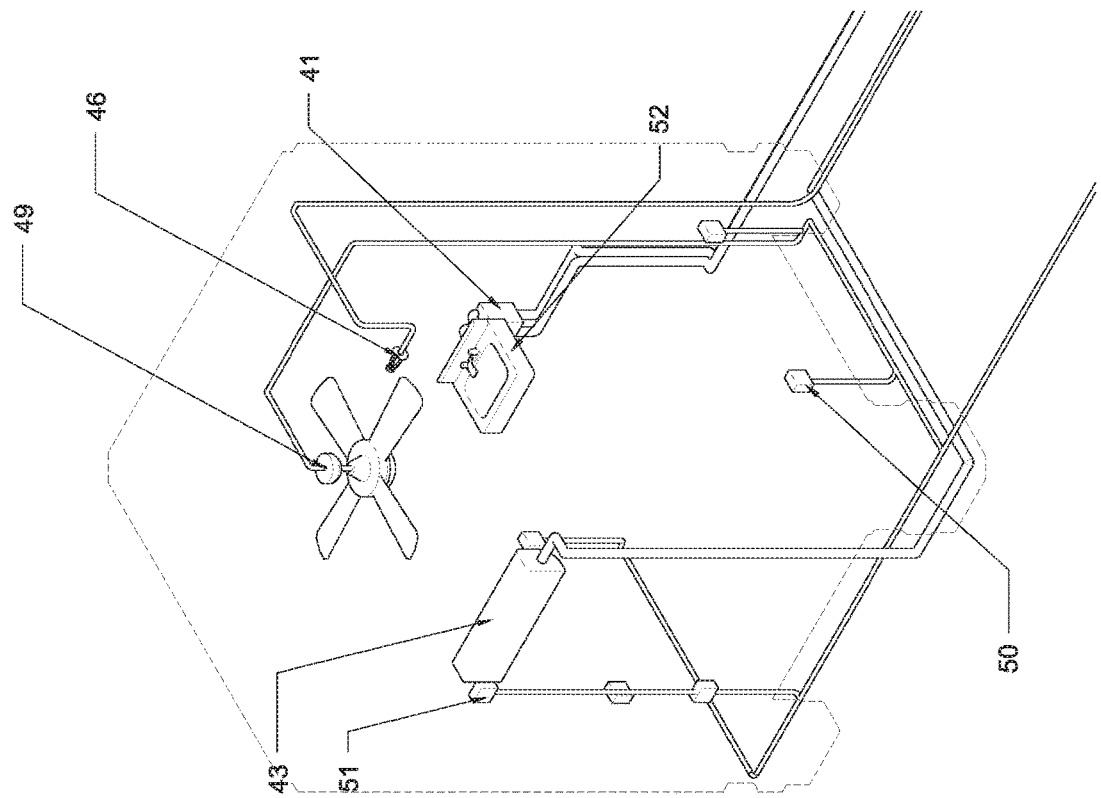
FIG. 19 is a perspective view illustrating a single utility module system comprising a fire sprinkler, water filtration, A/C unit, switch and junction box, and a sink basin, according to an embodiment of the present invention.

FIG. 19 is a perspective view illustrating a land cube module 90 or a water cube module 100 mechanical, electrical, plumbing (MEP) system comprising a ceiling light 49, fire sprinkler 46, water filtration 41, indoor high wall unit (A/C unit) 43, switch 51 and junction box 50, and a sink basin 52, according to an embodiment of the present invention. FIG. 19 also shows horizontal piping using the crawl space and vertical piping using the bulkhead wall slot. As mentioned above, the crawl space is the space under the module land deck 2 and the module land floor 1. FIG. 20 is a perspective view illustrating the utility module system comprising a washing machine (w.m.)/dryer 45, vent caps 53, water heater 40, heat pump unit 44, and gas meter 42, according to an embodiment of the present invention. The heat pump unit 44 moves the heat throughout the module, the gas meter 42 measures the volume of gas, and the water heater 40 heats the water.

Figure 21:
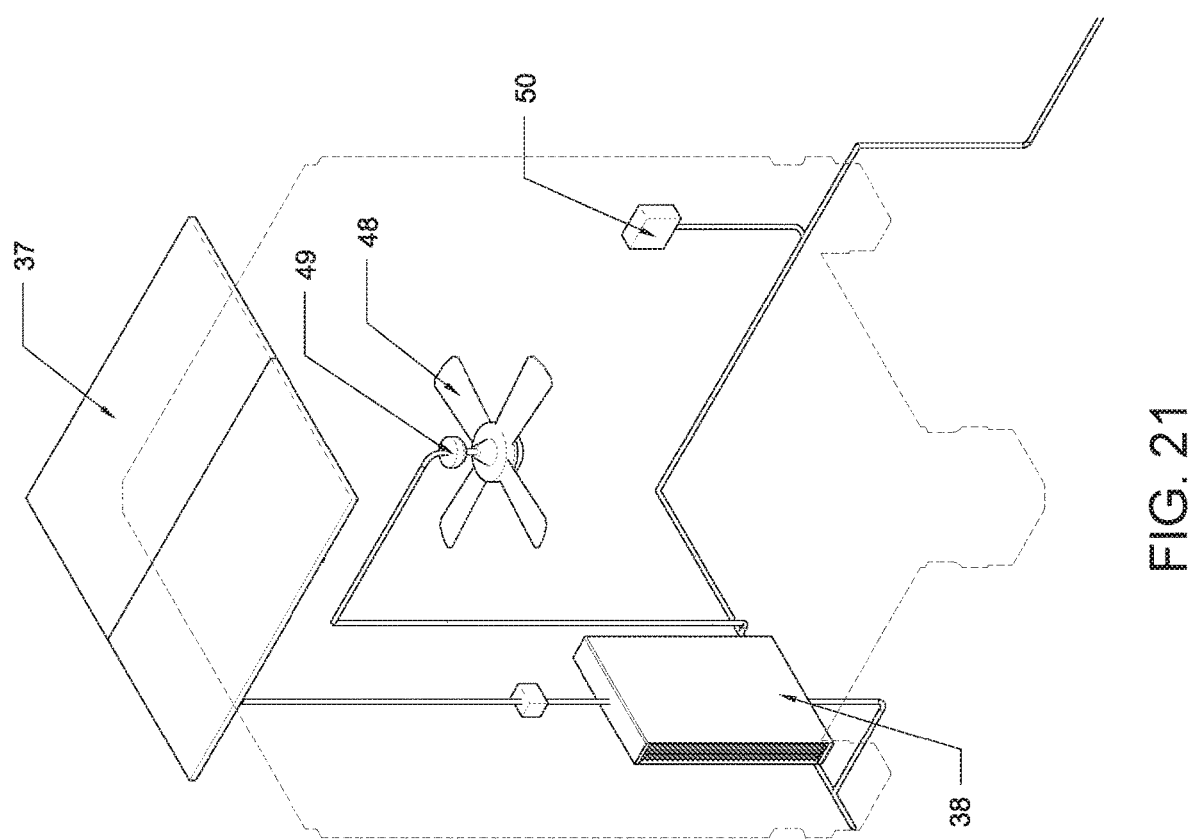
FIG. 21 is a perspective view illustrating a solar powered system that uses solar light to produce electricity through a photovoltaic solar panel, according to an embodiment of the present invention.

FIG. 21 is a perspective view illustrating a solar powered system that uses solar light to produce electricity through a photovoltaic solar panel 37, charging the battery 38 through an inverter and the electricity is supplied to inner ceiling fan 48 with light 49, according to an embodiment of the present invention. There is also a junction box 50 that houses the electrical connections of the module.

Figure 22:
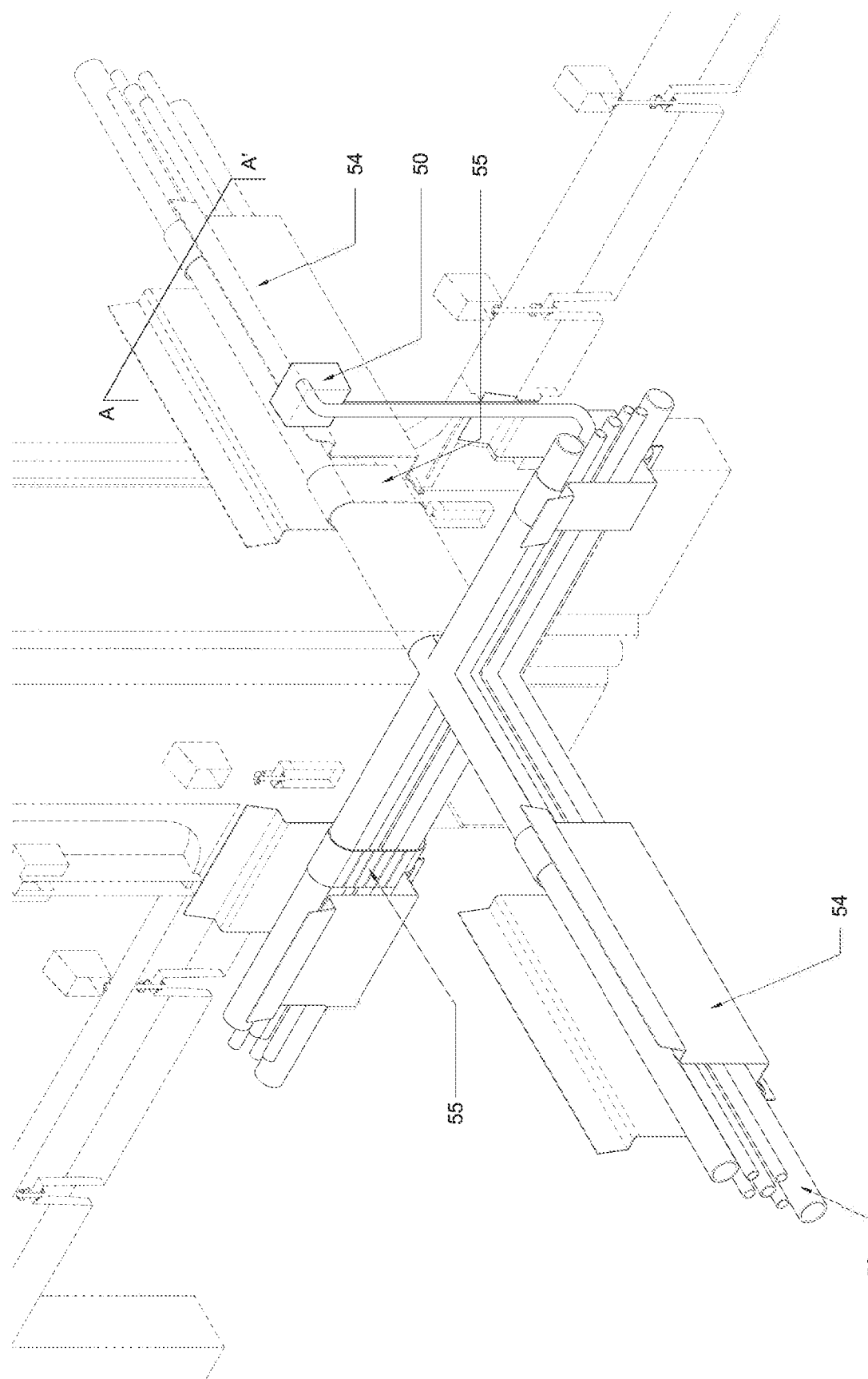
FIG. 22 is an isometric view illustrating the utility pipe chase system that is connected to each module system, according to an embodiment of the present invention.
Figure 23:
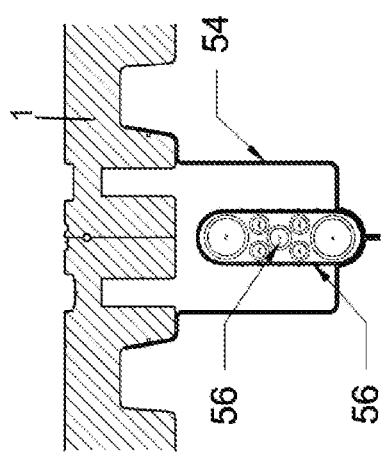
FIG. 23 illustrates a sectional view along line A-A' in FIG. 22, according to an embodiment of the present invention.

FIG. 22 is an isometric view of the utility pipe chase (UPC) 54. UPC's role is to provide an enclosed and protected chase to run various mechanical, plumbing, electrical and MEP pipe 56 under the crawl space of the module land floor 1 which can be encased with foam to provide protection and encapsulation of the utility lines to guard against freezing, vandalizing and damage. In the water embodiment, MEP piping passes through the hull module 32. Lines and pipes running inside UPC 54 are connected vertically through a hole in the module land floor 1 to be brought up to the inner space. Oblong shaped UPC 54 is used to provide four-way intersection where the four modules are connected to provide crossings of the lines in both the X and Y directions. The utility pipe chase tab 55 secures the MEP pipe 56 and the junction box 50 is where the electrical connections are housed. FIG. 23 illustrates a sectional view along line A-A' in FIG. 22, according to an embodiment of the present invention. FIG. 23 illustrates the utility pipe system for wrapping various MEP pipes 56 passing through utility pipe chase 54 and utility pipe chase tab 55 under the module land floor 1 and module land deck 2.

Figure 24:
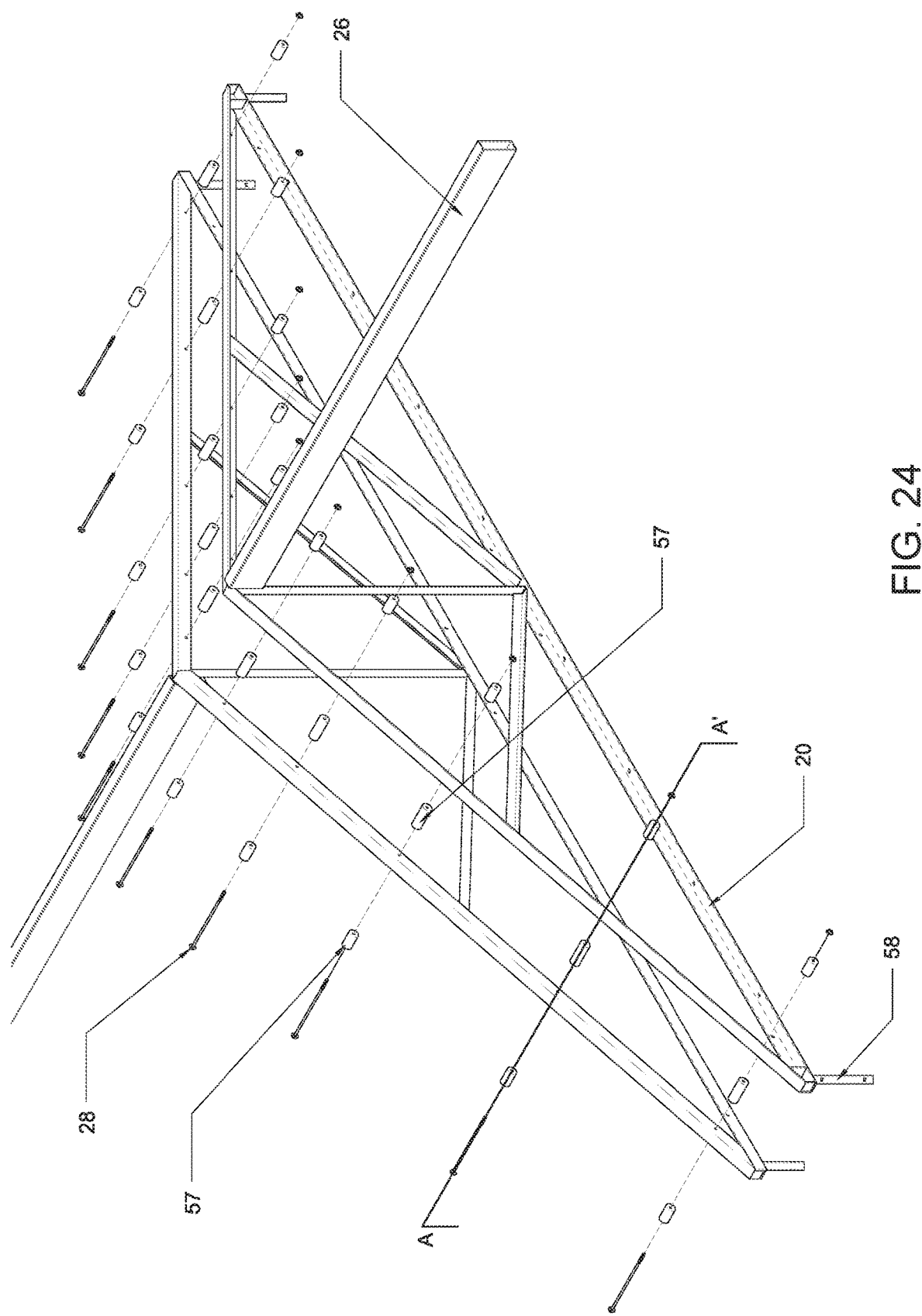
FIG. 24 is an exploded perspective view illustrating rubber spacers between the default trusses, threaded rod, and nuts with a washer, which provides lateral force resistance, according to an embodiment of the present invention.

FIG. 24 is an exploded perspective view illustrating rubber spacers 57 between two default trusses 20, threaded rod and nuts with a washer 28, which provides lateral force resistance, according to an embodiment of the present invention. The two default trusses 20 from separate triangle modules are secured with threaded rods and nuts 28 to hold the lateral and vertical loads. Rubber spacers 57 that can be made out of material such as Neoprene, are inserted between the default trusses 20 to eliminate creaking noise while floating on the water. The beam 26 forms a structurally stable triangle panel 10. The default truss legs 58 can be inserted into the vertical connectors 15 and bolted to secure the connection between the two components.

Figure 25:
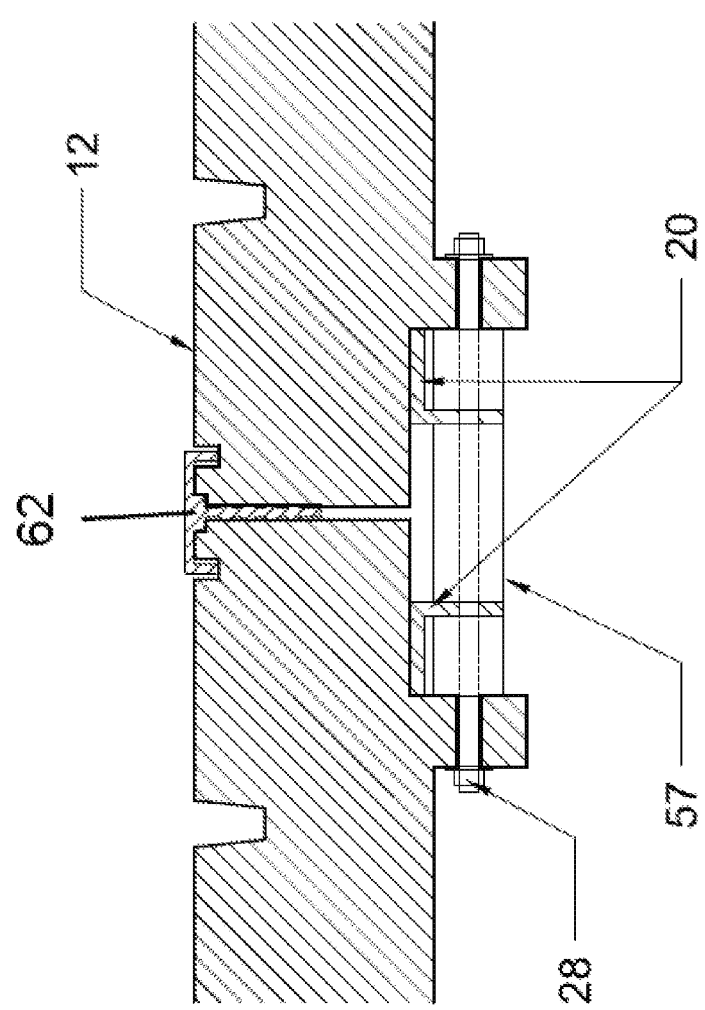
FIG. 25 illustrates a sectional view along line A-A' in FIG. 24, according to an embodiment of the present invention.

FIG. 25 illustrates a sectional view along line A-A' in FIG. 24, according to an embodiment of the present invention. FIG. 25 illustrates a connection fixed with a rubber spacer 57, a threaded rod and nuts and washers 28 where two default trusses 20 from separate modules meet. The two roof ridges 12 are connected using the roof T 62.

Figure 26:
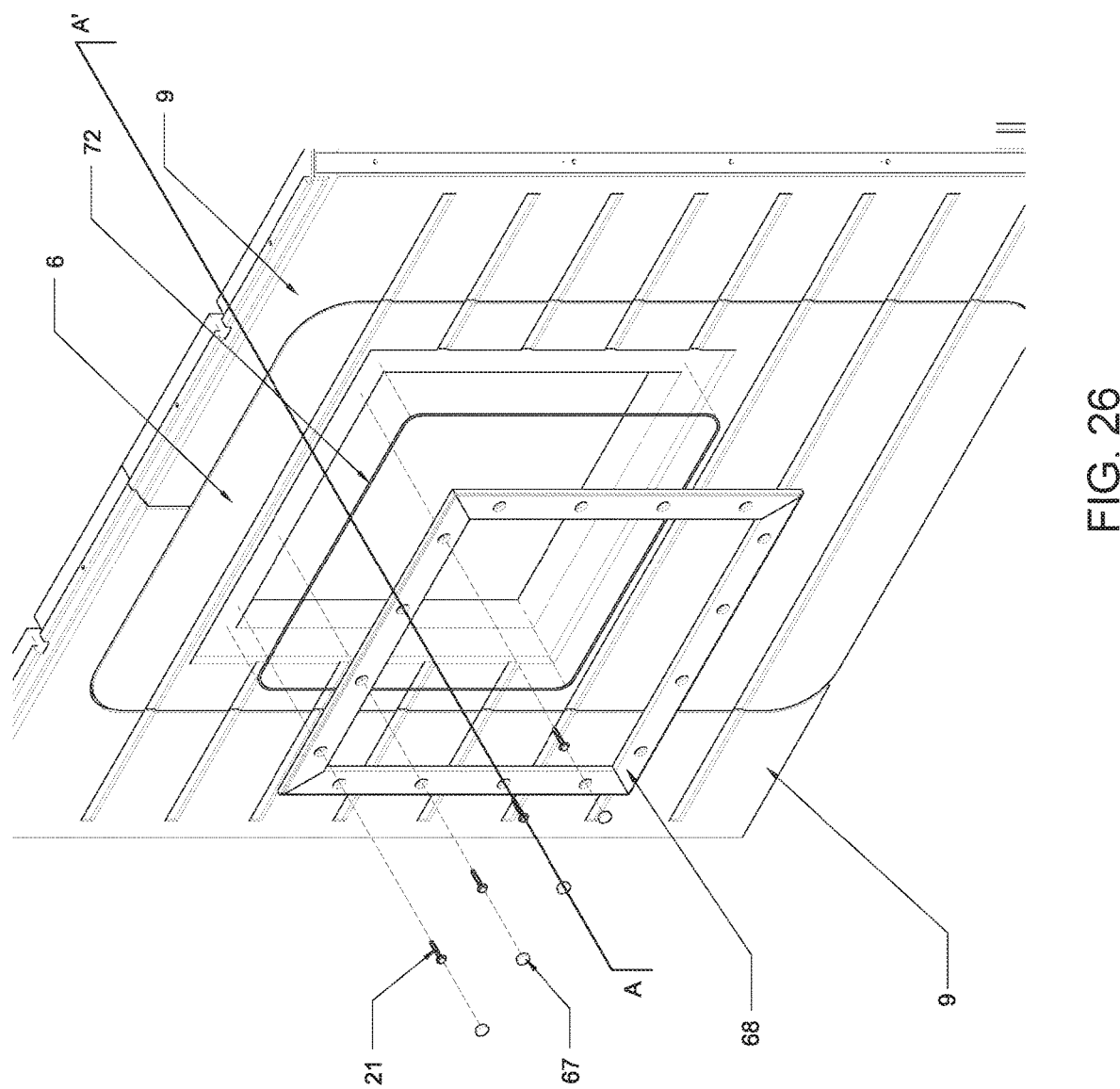
FIG. 26 is an exploded perspective view illustrating the window frame bolted to the bulkhead-large window using the bolt, washer, and bolt-screw slot plug for waterproofing, according to an embodiment of the present invention.

FIG. 26 is an exploded perspective view illustrating the window frame 68 bolted to the bulkhead-large window 6 using the bolt and washer 21, according to an embodiment of the present invention. The window frame 68 is made of PVC, the bulkhead-large window 6 is made of HDPE, and the bolt and washer are made of zinc plated steel. The bolt-screw slot plug 67 is used for waterproofing the bolt and washer 21. The bulkhead large window 6 is bolted to the bolt slot through the PVC window frame 68 with gasket 72. The gasket 72 is used for waterproofing when combined with the end wall frame 9 and is covered with a bolt screw slot plug 67 of the same material as the window frame 68. The end wall frames 9 are attached to both sides of the bulkhead large window 6.

FIG. 27 illustrates a sectional view along line A-A' in FIG. 26, according to an embodiment of the present invention. FIG. 27 shows a sectional view of the bulkhead large window 6, connected to the window frame 68 by a bolt 21. There is a gasket 72 between the window frame 68 and bulkhead large window 6. The bolt screw slot plug 67 is used for waterproofing the bolt 21. The steel pipe pier sleeve 79 houses various pipes.

Figure 28A:
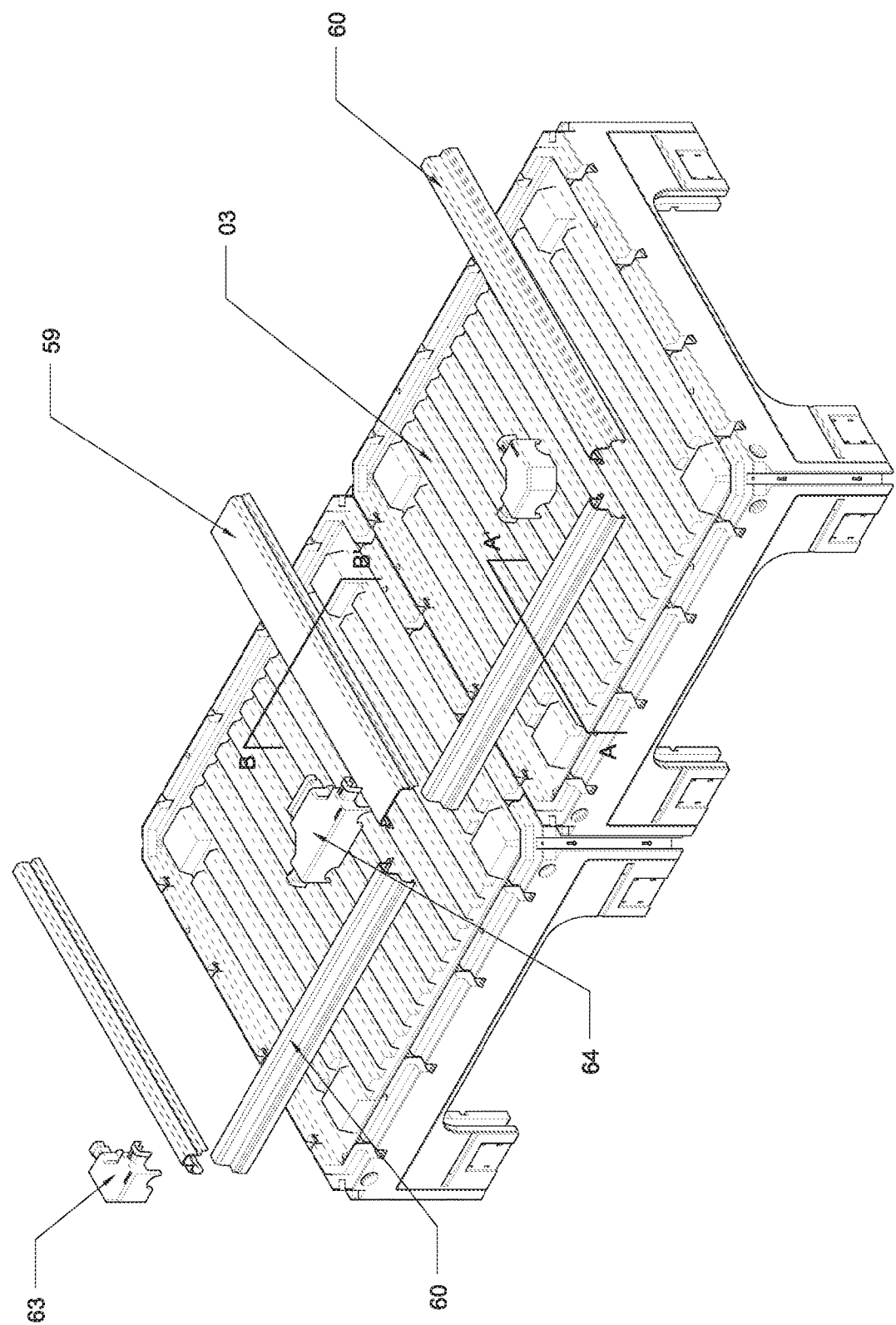
FIG. 28A-28C illustrates the assembly of the module roof, roof cap, and roof perimeter cap, according to an embodiment of the present invention.
Figure 28C:
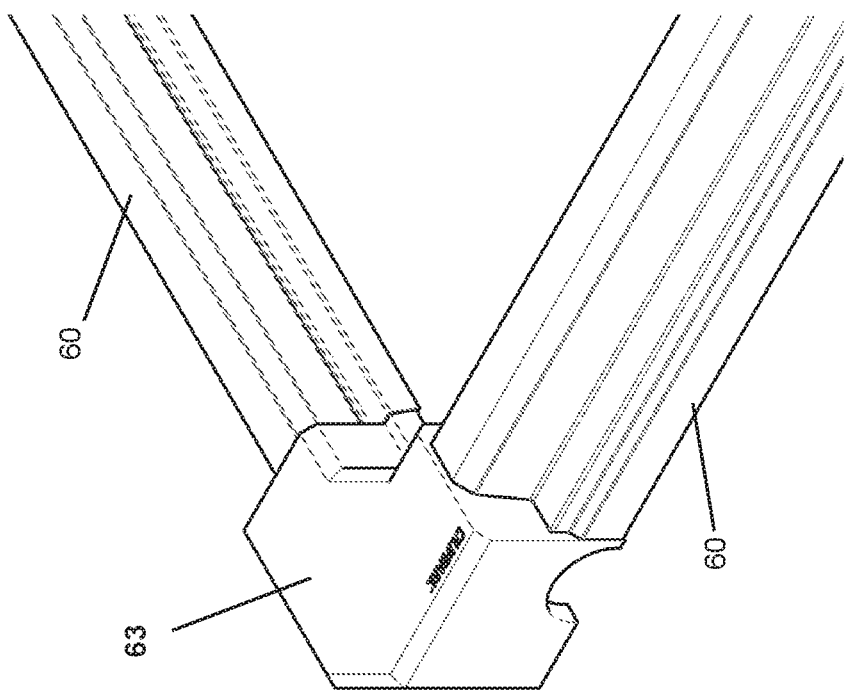
Figure 28B:
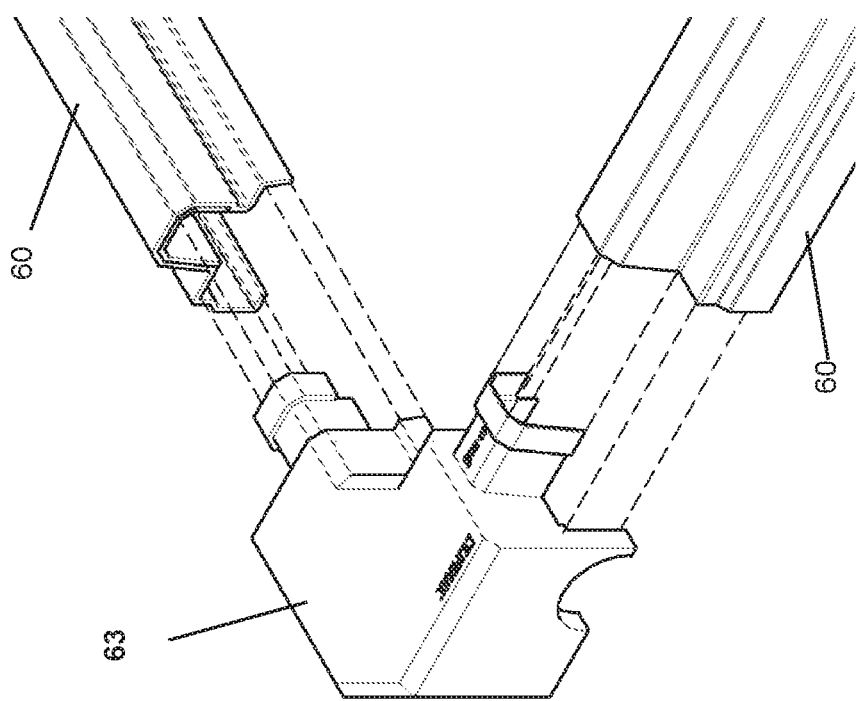

FIG. 28A-28C illustrate the assembly of the module roof 3 and the ring 94, according to an embodiment of the present invention. FIG. 28A shows the roof L cap 63 connecting two roof perimeter caps on one module roof 3. The roof T cap 64 connects two roof perimeter caps 60 together with a roof cap 59 located on two separate module roofs 3. FIG. 28B illustrates an enlarged view of the roof L cap 63 aligned with the roof perimeter caps 60 on both ends of the roof L cap 63. Once the roof perimeter cap 60 is aligned, the roof L cap 63 slides into each end of the roof perimeter cap 60 and secures the roof perimeter caps 60 into place as shown in FIG. 28C.

FIG. 29 illustrates a sectional view along line A-A' in FIG. 28A, according to an embodiment of the present invention. The module roof 3 and the bulkhead-wall 5 are assembled together with bolt 21 and washers. The bolts 21 are inserted from a vertical direction. The roof strap end 30 is secured to the module roof 3 with a bolt 21. Then the roof perimeter cap 60 is connected via snap fit. FIG. 30 illustrates a sectional view along line B-B' in FIG. 28A, according to an embodiment of the present invention. The two module roofs 3 from separate adjacent cube modules are connected using the roof strap whole 18. The roof strap whole 18 is secured to the module roof 3 with a bolt 21, then the roof cap 59 is connected via snap fit. The module roof 3 is connected to the bulkhead wall 5 of each land cube module 90 using a bolt 21.

Figure 31:
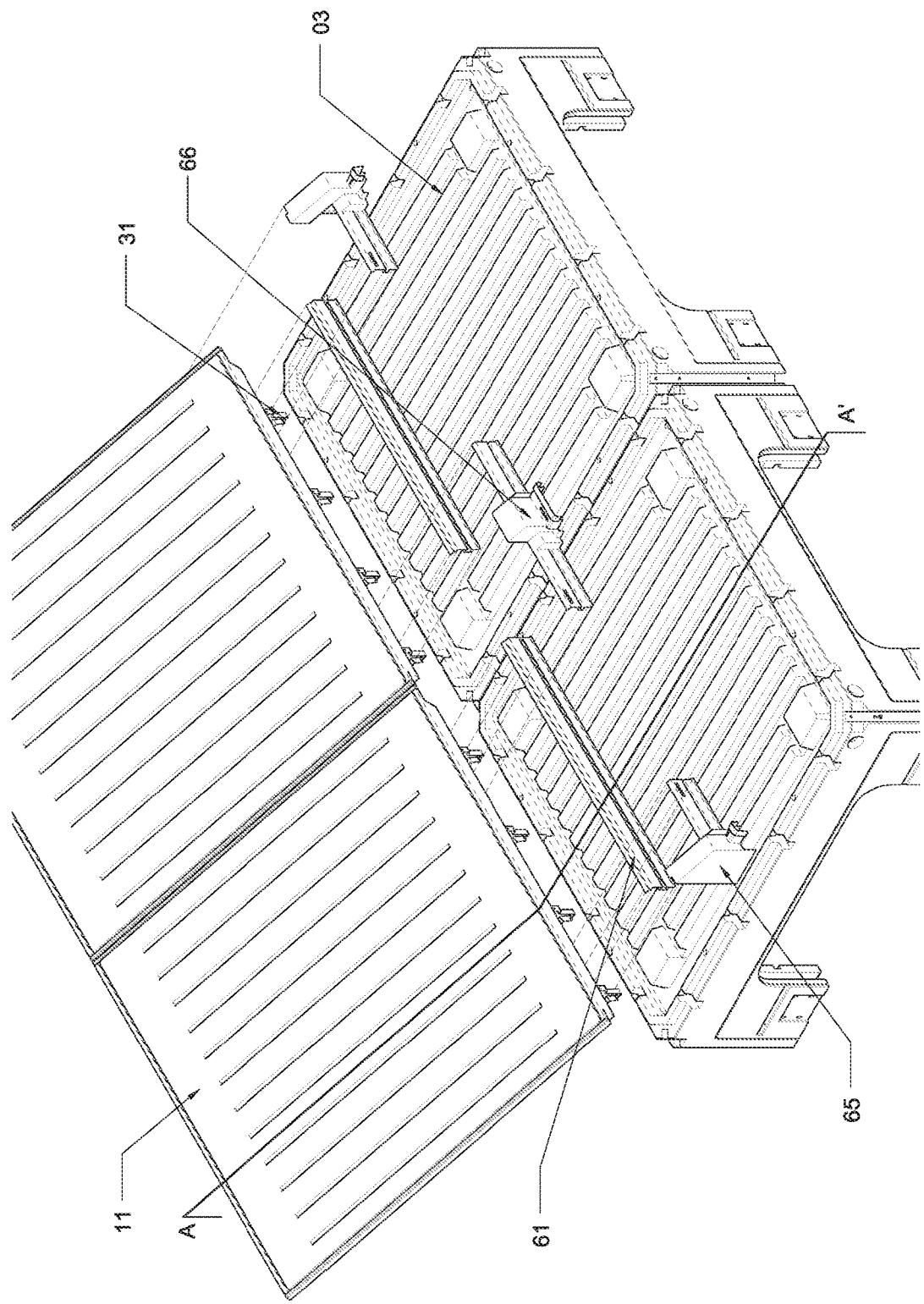
FIG. 31 illustrates the configuration of the sloped roof flashing, slope roof L caps, and slope roof T cap, according to an embodiment of the present invention.

FIG. 31 illustrates the configuration of the sloped roof flashing 61, slope roof L caps 65, and slope roof T cap 66 located on top of a module roof 3, according to an embodiment of the present invention. The configuration of the sloped roof flashing 61, slope roof L caps 65, and slope roof T cap 66 are for waterproofing when the sloped roof flat 11 and the modular roof 3 are fastened with the sloped roof strap 31.

Figure 32:
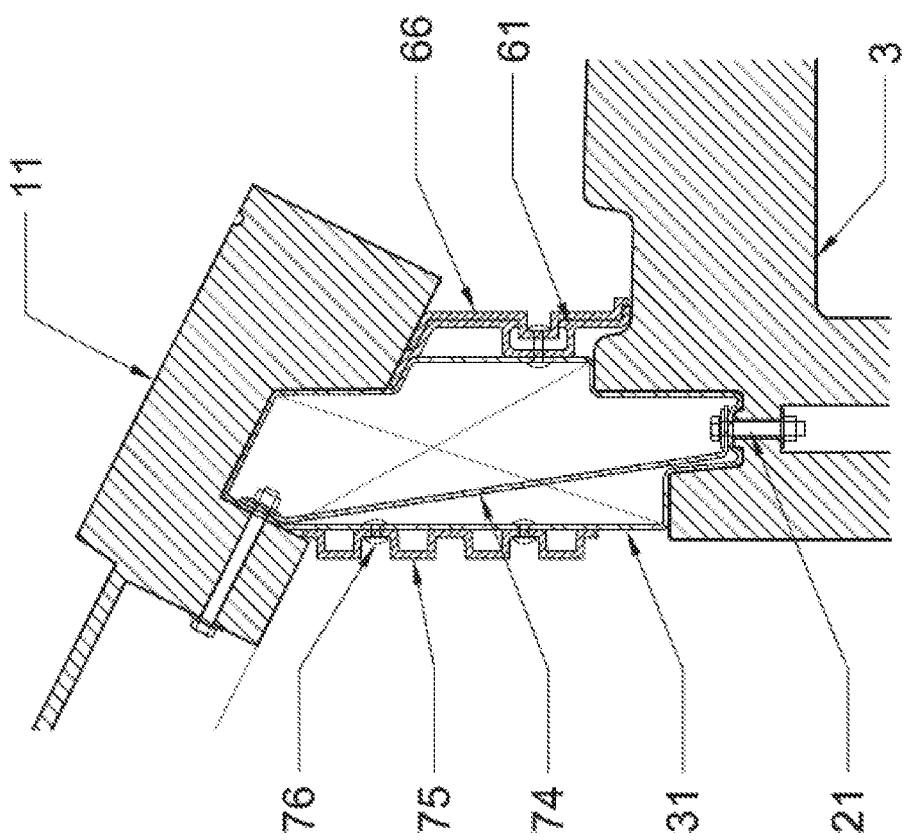
FIG. 32 illustrates a sectional view along line A-A' in FIG. 31, according to an embodiment of the present invention.

FIG. 32 illustrates a sectional view along line A-A' in FIG. 31, according to an embodiment of the present invention. FIG. 32 illustrates the roof flat 11 and a flat module roof 3 connected to each with the sloped roof strap 31. The sloped roof strap 31 is secured using bolts and washers 21. The sloped roof flashing 61 and the slope roof T cap 66 is for waterproofing the rivets 76. The interior facia 75 serves an interior finish covering the steel structure. The direct strap 74 is a structural steel used for additional reinforcement of the sloped roof strap 31 if the land cube module 90 are built in areas with strong earthquakes.

Figure 33:
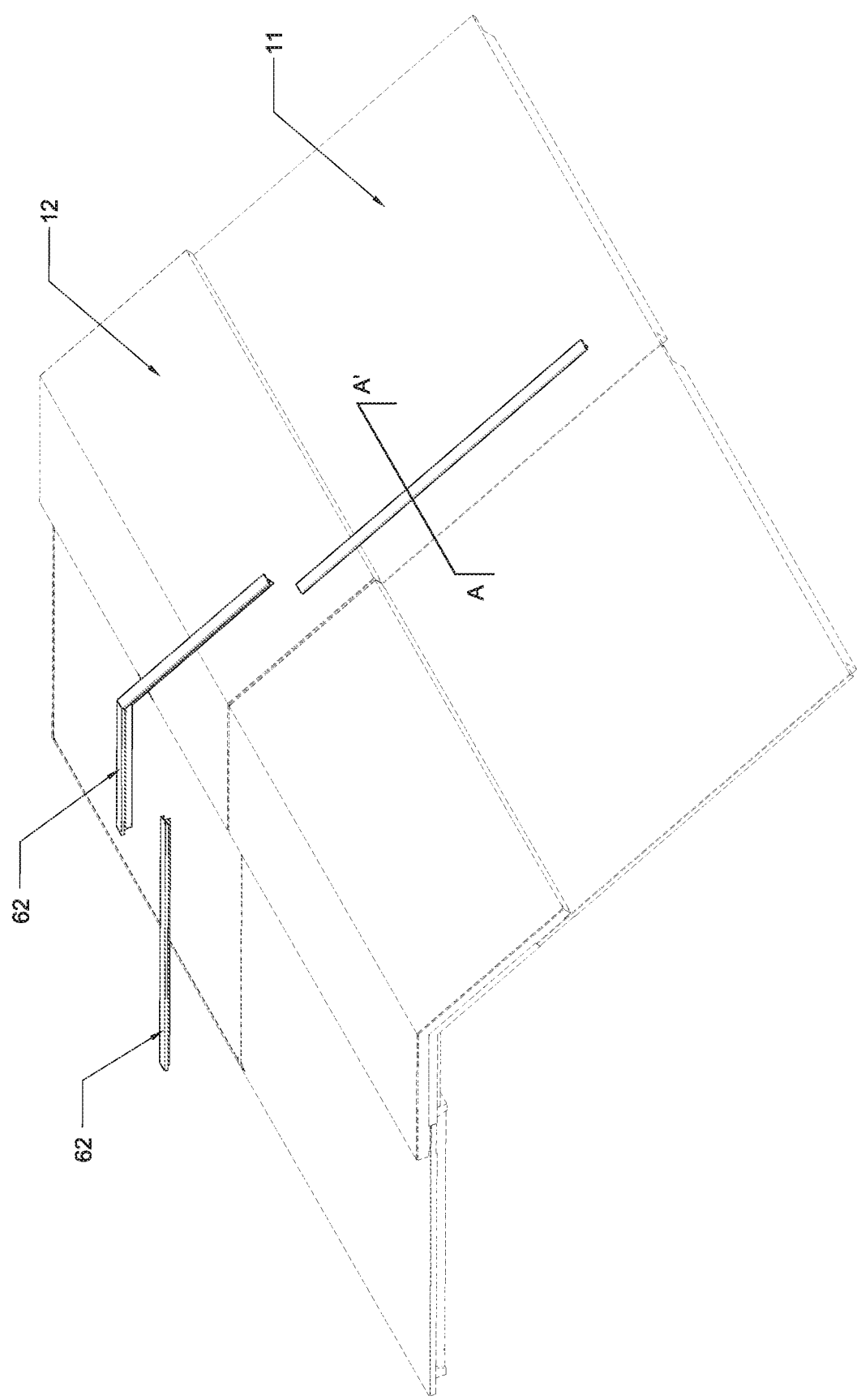
FIG. 33 illustrates a perspective view of the installation of roof T, according to an embodiment of the present invention.
Figure 34:
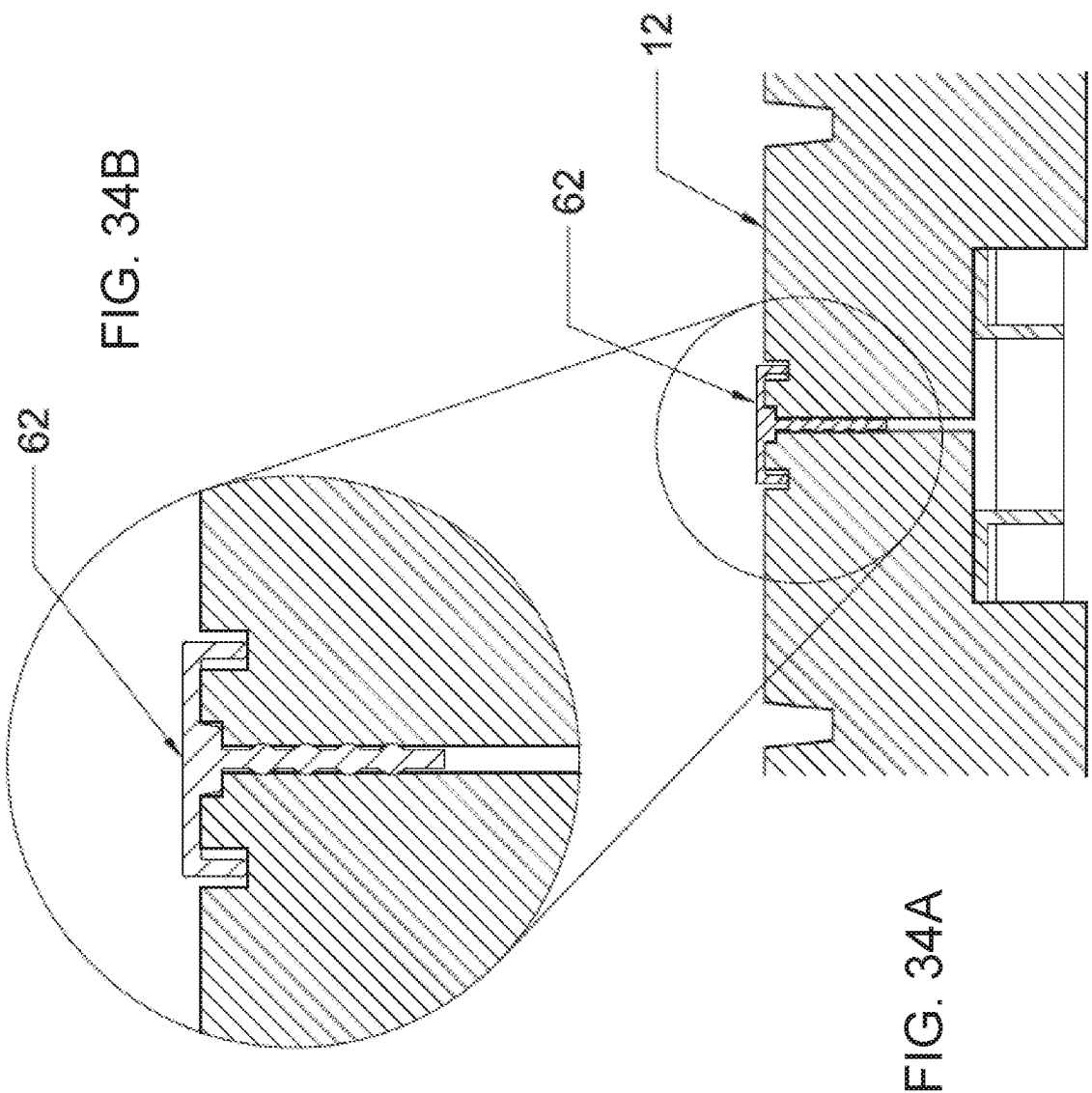
FIG. 34A illustrates a sectional view along line A-A' in FIG. 33, according to an embodiment of the present invention.
FIG. 34B illustrates an enlarged view of FIG. 34A, according to an embodiment of the present invention.

FIG. 33 illustrates a perspective view of the installation of roof T 62, according to an embodiment of the present invention. The plurality of roof T 62 are secured on the roof-ridge 12 and the roof-flat 11. FIG. 34A illustrates a sectional view along line A-A' in FIG. 33, according to an embodiment of the present invention. The roof T 62 is inserted tightly into the groove between the roof ridges 12 for waterproofing. There are concave and convex portions on the vertical stem of the roof T 62 which assist in tightly fitting the roof T 62. FIG. 34B illustrates an enlarged view of FIG. 34A showing the roof T 62.

Figure 35:
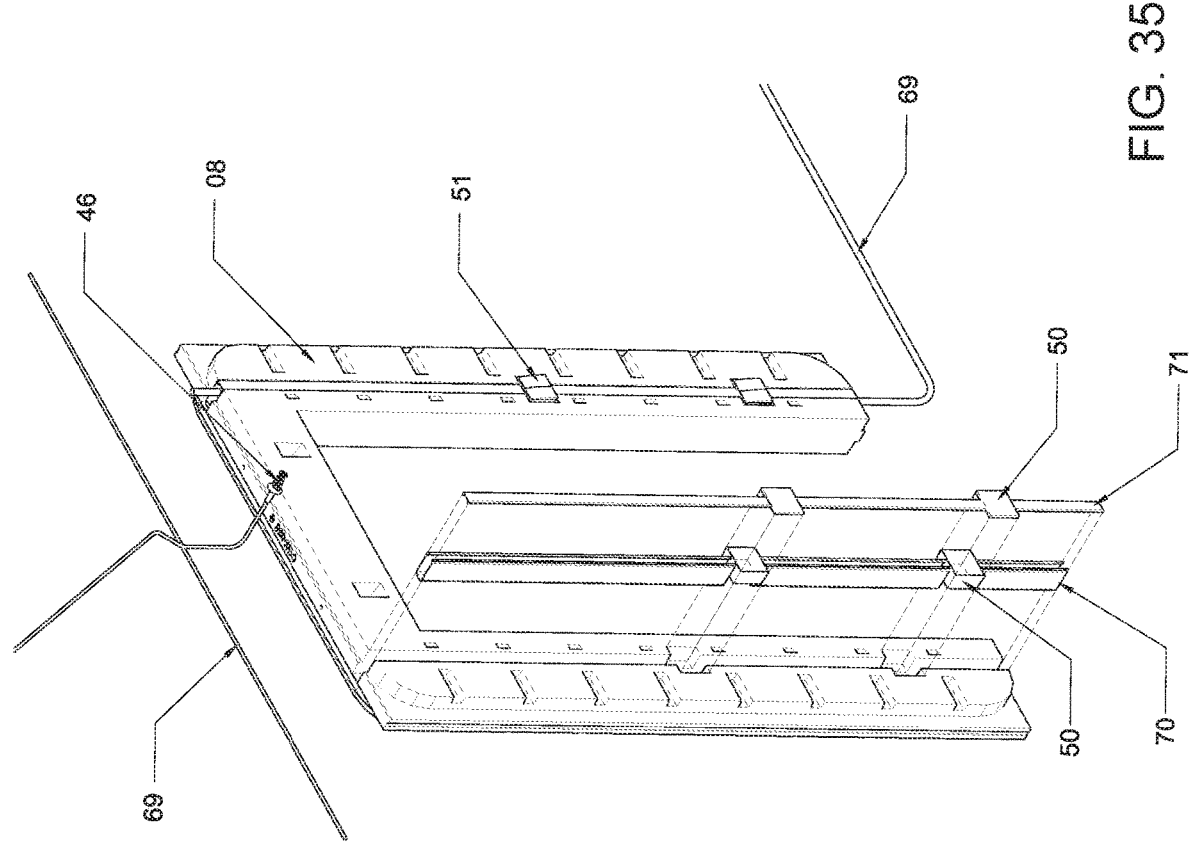
FIG. 35 illustrates the electric piping from the crawl space, according to an embodiment of the present invention.

FIG. 35 illustrates the pipe 69 coming from the crawl space, according to an embodiment of the present invention. The pipe 69 can be an electric pipe or a water pipe. The wiring channel 70 and junction box 50 are assembled in the slot of the bulkhead door 8. The wiring channel 70 is capped with the wiring channel cap 71. The electric pipe 69 can run through the wiring channel 70 and because the wiring channel 70 is connected to the bulkhead door 8, the electric pipe 69 can also run through the bulkhead door 8. The pipe 69, such as a sprinkler pipe, is connected to the bulkhead door 8 or inner regions of the module so that the pipe 69 can release water through the fire sprinkler 46. There is an electric switch 51 and a wiring channel cap 71 to protect the wire in the wiring channel 70.

Figure 36:
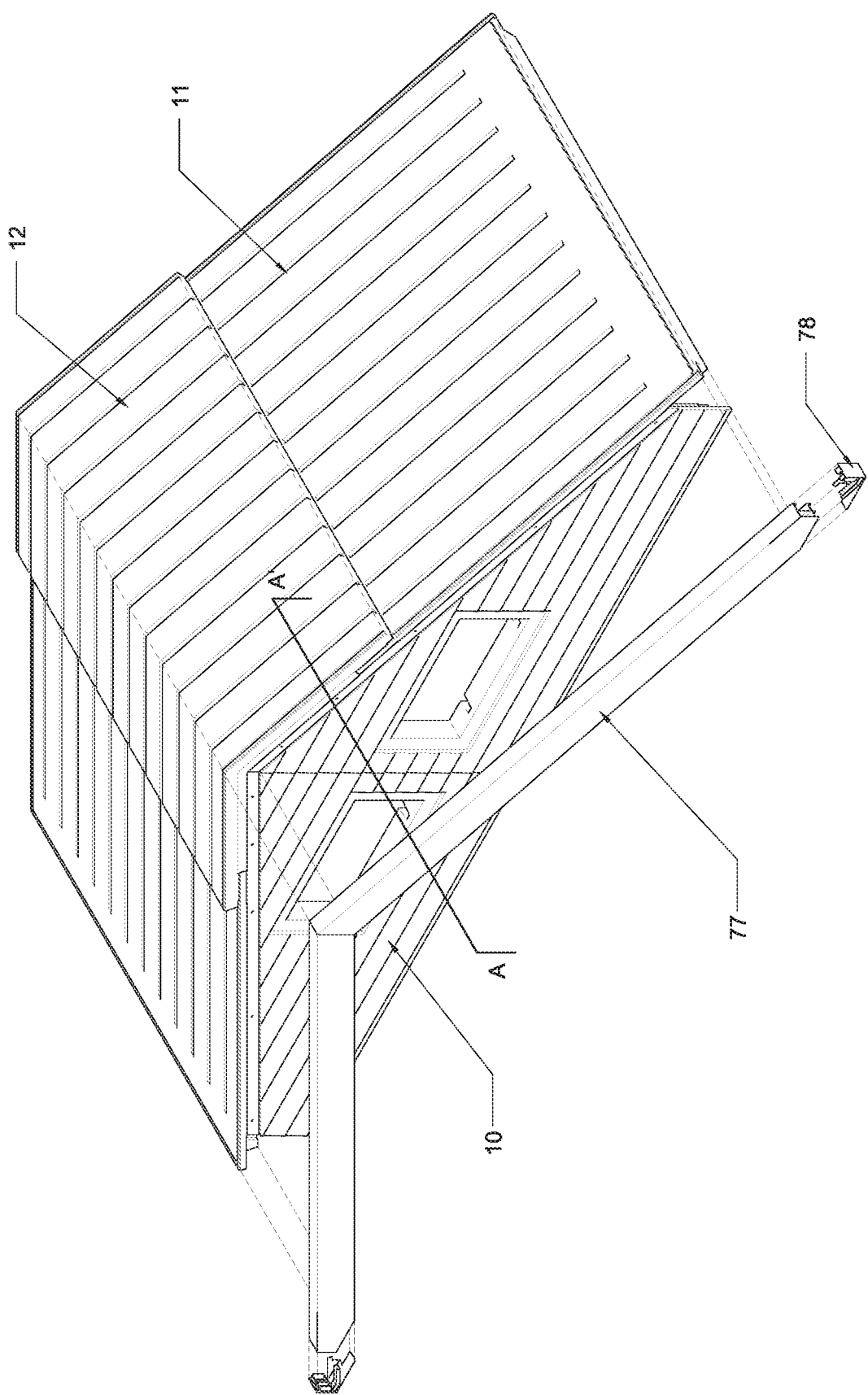
FIG. 36 illustrates the roof edge trim and the roof edge trim end caps, according to an embodiment of the present invention.
Figure 37:
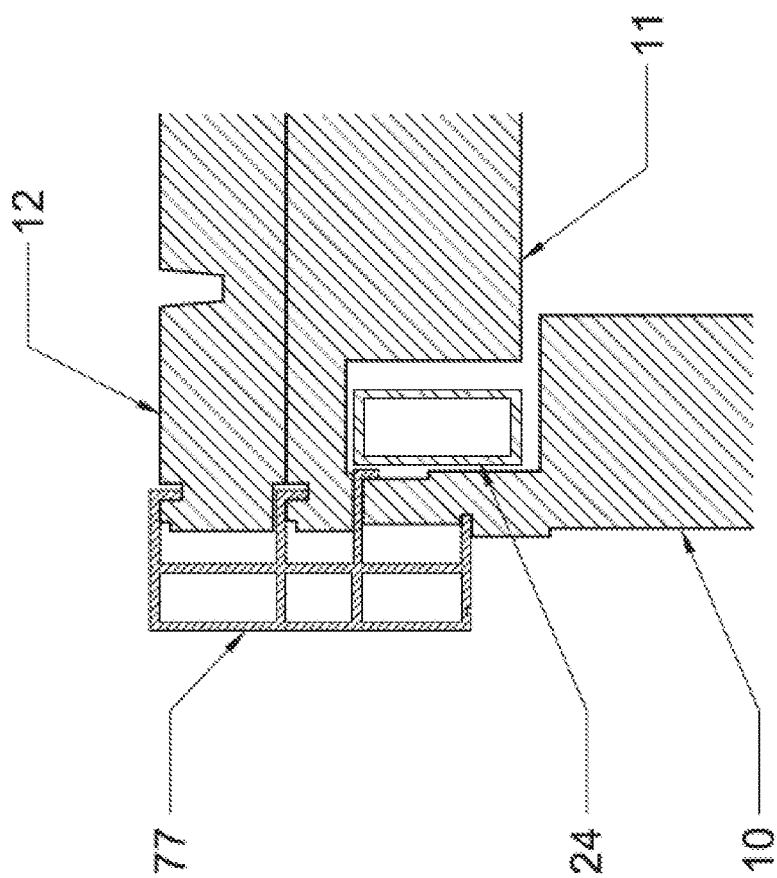
FIG. 37 illustrates a sectional view along line A-A' in FIG. 36, according to an embodiment of the present invention.

FIG. 36 illustrates the roof edge trim 77 and the roof edge trim end caps 78, according to an embodiment of the present invention. The roof edge trim 77 and the roof edge trim end caps 78 are assembled for waterproofing the front or back of the roof flat 11 and the roof ridge 12. The roof edge trim end cap 78 is secured with PVC bond for connection with the roof edge trim 77. FIG. 37 illustrates a sectional view along line A-A' in FIG. 36, according to an embodiment of the present invention. FIG. 37 illustrates the roof ridge 12 and triangle panel 10 connected by sliding the roof edge trim 77 into the slots of the triangle panel 10, roof ridge 12, and roof flat 11.

Figure 38:
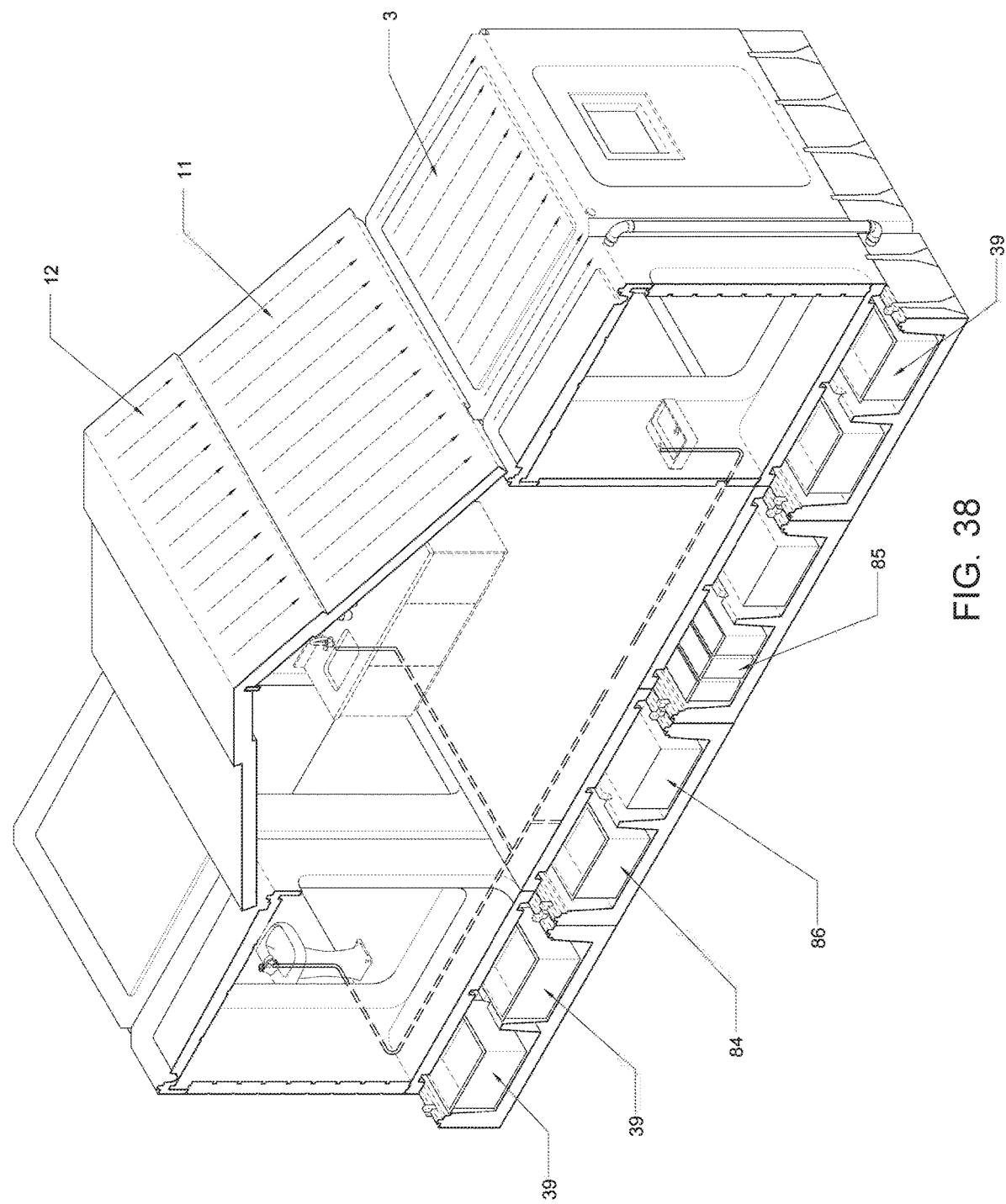
FIG. 38 illustrates a method of collecting rainwater from the module roof, according to an embodiment of the present invention.

FIG. 38 illustrates a method of collecting rainwater from the module roof 3, according to an embodiment of the present invention. FIG. 38 shows the rainwater collects from the roof ridge 12, the roof flat 11 and module roof 3 for off-grid energy independence. Rainwater is collected into the rainwater storage tanks 39 and drinking water is supplied from the rain water tanks 39 and water pump 86 as water is sent through the water treatment system, which uses rainwater capturing. After the rain water is captured using the modules, the water treatment system produces drinking water through carbon filter, Micro-filter, reverse osmosis pump, and reverse osmosis membrane. 85. The treated water is stored in the treated water tank 84.

Figure 39:
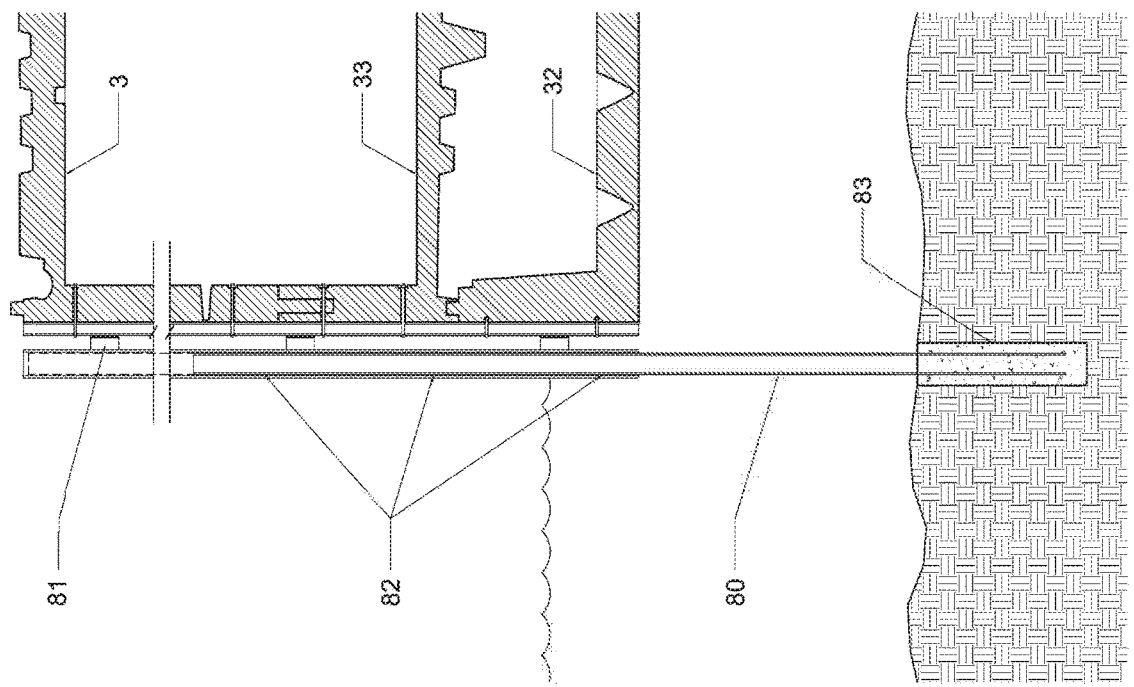
FIG. 39 illustrates a sectional view of the sliding pile mooring system, according to an embodiment of the present invention.
Figure 41A:
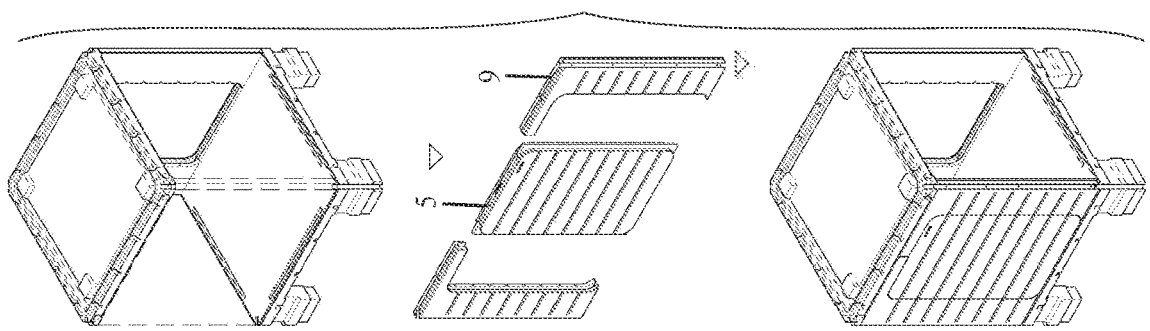
FIGS. 41A-41D illustrates the main system bulkhead insert walls interchangeable with various bulkhead subsystems, according to an embodiment of the present invention.
Figure 41B:
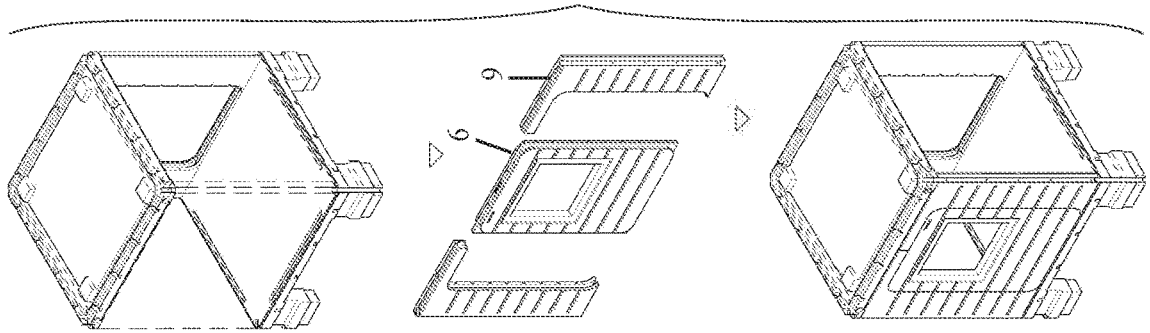
Figure 41C:
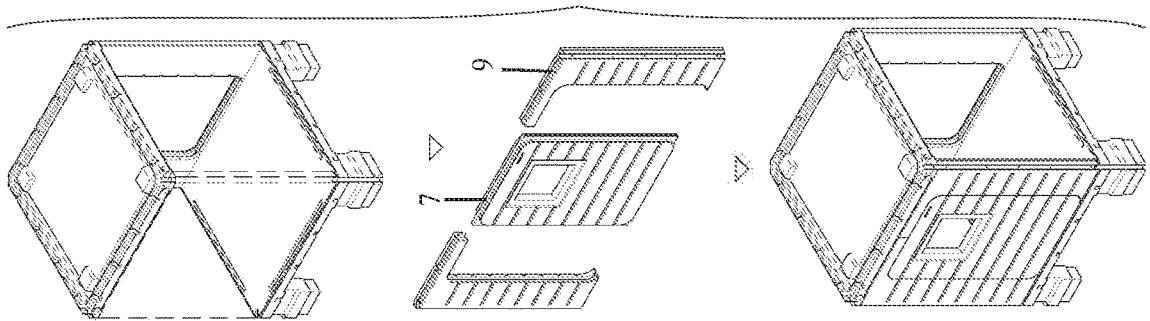
Figure 41D:
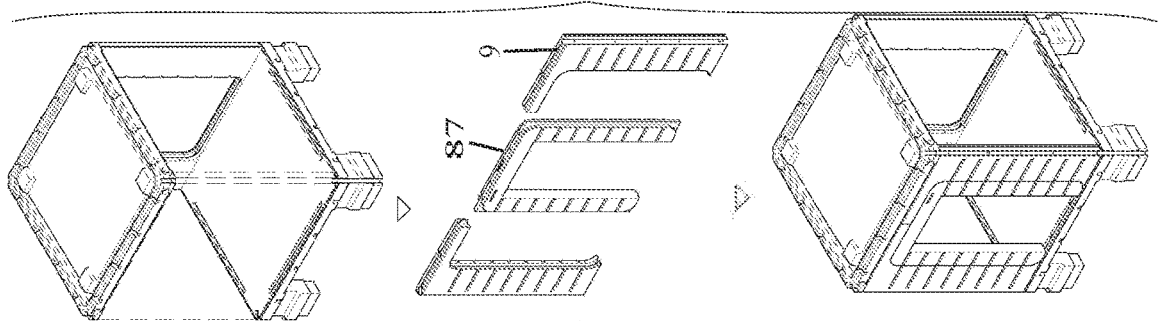

FIG. 39 illustrates a sectional view of the sliding pile mooring system, according to an embodiment of the present invention. The sliding pile mooring system (SPMS) comprises the pier sleeve gusset 81, PTFE pipe liner 82, steel pipe pier 80 and concrete pile footing 83. The pier sleeve gusset 81 is located between the steel pipe pier 80 and module, specifically between the module roof 3, column 4, and hull module 32. The pier sleeve gusset 81 provides structure that connects the vertical connector 15. The PTFE pipe liner 82 allows easy slippage for pipes. FIG. 39 illustrates the sliding pile mooring system used in application where the flooding water levels are predictable and shallow to allow a concrete pile to be driven into the riverbed which provides lateral stability and vertical movement of the modules. The SPMS provides stable floatation to the modules. The steel pipe pier 80 is anchored into the concrete pile footing 83 on a river bed, then the steel pipe pier 80 slips inside the steel pipe pier sleeve 79. The water module can move up and down with the water level. The pier sleeve gusset 81 is a structural member that connects to the vertical connector 15.

Figure 40A:
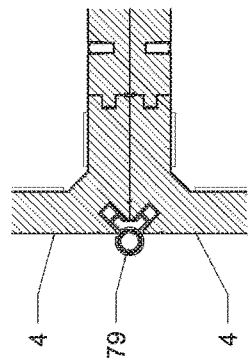
FIGS. 40A-40C illustrates a top view of the sliding pile mooring system shown in FIG. 39, according to an embodiment of the present invention.
Figure 40B:
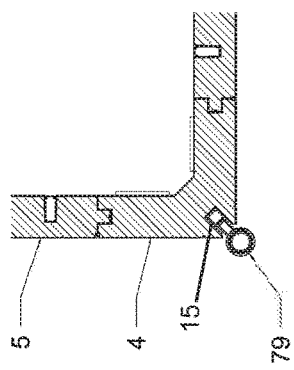
Figure 40C:
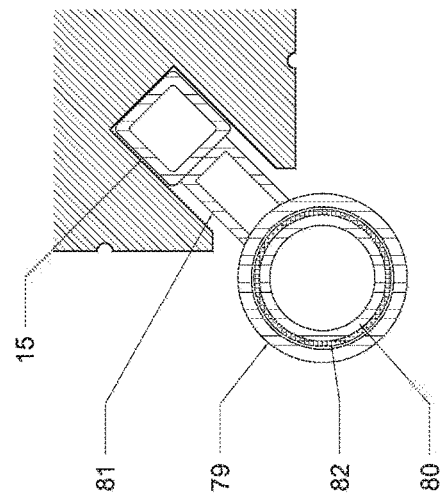

FIGS. 40A-40C illustrates a top view of the sliding pile mooring system shown in FIG. 39, according to an embodiment of the present invention. The sliding pile mooring system can be found at a corner of one water cube module 100 or water triangle module 102 or it can be found connecting two adjacent water cube modules 100 or two adjacent water triangle module 102. The steel pipe pier sleeve 79 is welded to the structural steel corner vertical connectors 15 providing maximum vertical displacement of up to about 3.5 meters to about 4 meters. PTFE pipe liners 82 are used to provide maintenance for free smooth slippage between pipes. The steel pipe pier sleeve 79, PTFE pipe liner 82 and steel pipe pier 80 are concentric. The pier sleeve gusset 81 is located between the steel pipe pier sleeve 79 and vertical connector 15.

FIGS. 41A-41D illustrate the main system bulkhead insert walls interchangeable with various bulkhead subsystems, according to an embodiment of the present invention. These figures show the Interchangeable Parts System (IPS) of the cube module 90 to minimize and simplify the assembly system. The IPS simplifies the assembly system because the end wall frame 9 is used in conjunction with repeating sub system to create variety of wall, roof and floor types. For example, FIGS. 41A-41D illustrate the main side wall of the land cube module 90 comprising the end wall frame 9, which then are interchangeable with various bulkhead subsystem such as the bulkhead wall 5, bulkhead large window 6, bulkhead small window 7, and bulkhead plumbing wall 87 to create an entire side wall of the cube modular system.

Figure 42D:
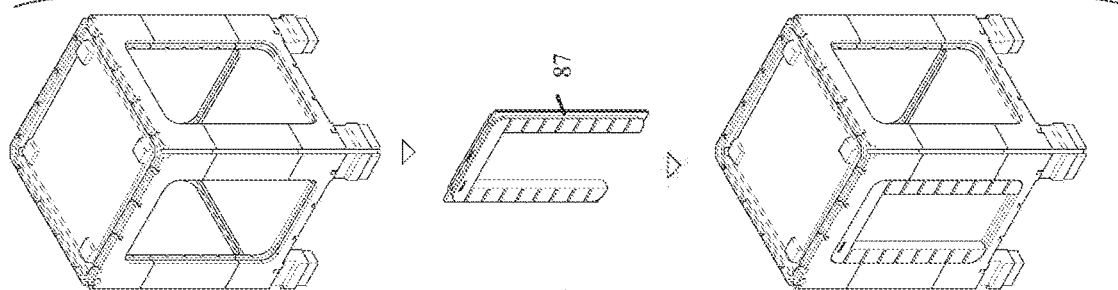
FIGS. 42A-42D illustrates the main solid bulkhead wall used to create various types of subsystems, according to an embodiment of the present invention.
Figure 42C:
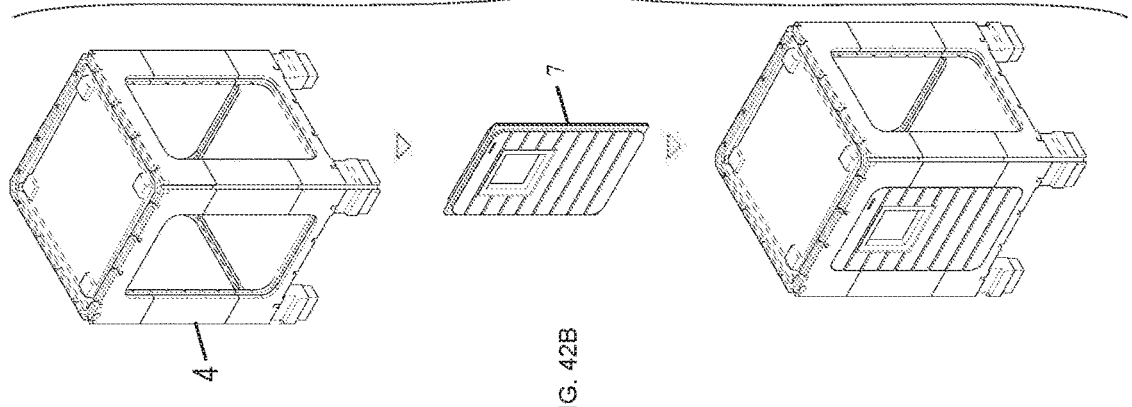
Figure 42B:
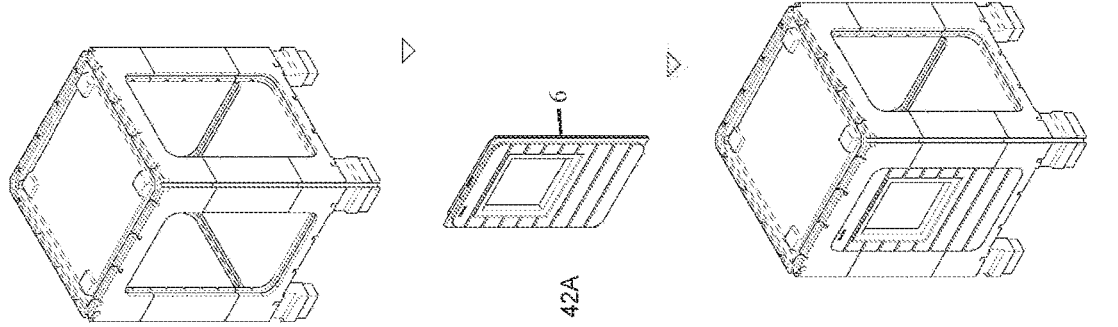
Figure 42A:
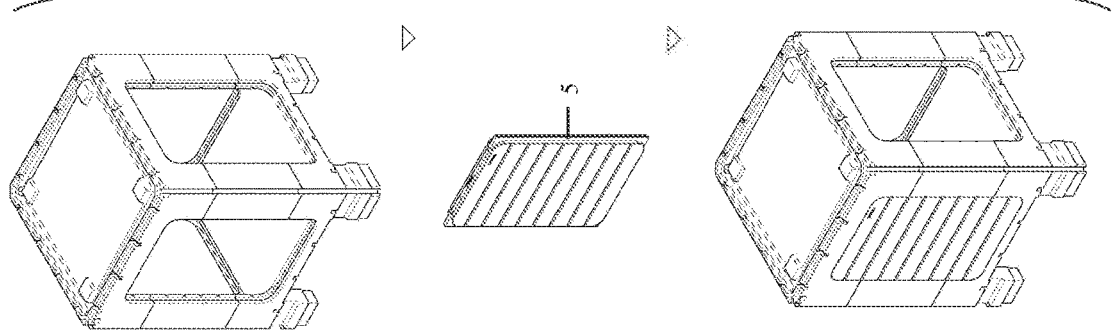

FIGS. 42A-42D illustrates the main solid bulkhead wall 5 used to create various types of subsystems, according to an embodiment of the present invention. These figures illustrate how the Interchangeable Parts System (IPS) of the land cube module 90 minimizes and simplifies the assembly system. The same main parts comprising the module roof 3, column 4, and module land floor 1 are used in conjunction with repeating sub-systems to create a variety of walls, roofs and floor types. For example, in FIG. 42A, the bulkhead wall 5 is used to create a full bulkhead wall 5. In another example, in FIG. 42B, the bulkhead large window 6 is used to create a bulkhead large window 6, whereas for FIG. 42C, the bulkhead small window 7 is used to create a smaller window than the bulkhead large window 6. In FIG. 42D, the bulkhead plumbing wall 87 is used to create an open door concept.

FIGS. 43A-43D illustrates the IPS and the interchangeable bottoms that can be assembled, according to an embodiment of the present invention. As shown in FIG. 43A, the module land floor 1 can be used to connect to the columns 4 to create a land cube module 90. On the other hand, the module water floor 33 in combination with the hull module 32 can create a bottom for the water cube module 100. As illustrated in FIG. 43C, the module land deck 2 can be used to connect with a module roof 3 having no connection with columns 4. This is another embodiment of the land cube module 90 that does not comprise the module land floor 1. FIG. 43D illustrates another embodiment of the water cube module 100 comprising the module water deck 34 and hull module 32.

FIG. 44A-44C illustrates the IPS of the land cube module 90, according to an embodiment of the present invention. The IPS comprises the interchangeable roof that can be assembled with the columns or with a solid module frame. FIG. 44A illustrates an embodiment of the land cube module 90 using the IPS to create a land cube module 90 using columns 4 and a module roof 3. FIG. 44B illustrates the land triangle module 92 having a triangle panel 10, roof ridge 12 and flat roof 11. FIG. 44C illustrates a land cube module 92 with end wall frames 9 and module roof 3. The bulkhead panels that are related to the roof comprise the triangle panel 10, roof ridge 12, and flat roof 11, one or more of which are also interchangeable and may be designated as another set or different set of interchangeable bulkhead panels as a group.

Cube module 90, 100 and the triangle module 92, 102 can be made from high density polyethylene (HDPE) which is eco-friendly because they are made from post-consumer products and are recyclable at the end of its useful life.

The high density polyethylene (HDPE) filled with high density polyurethane (HDPU) foam must comply with standards such as ASTM as discussed below. Testing was also completed on the high density polyurethane foam and other components of the embodiments. ASTM D792-13, ASTM D638-14, ASTM D790-17, and ASTM D1238-13 are tested under the standard specification of ASTM D4976. ASTM D4976-Standard Specification for Polyethylene Plastics Molding and Extrusion Materials; this specification provides the standard requirements for polyethylene plastic molding and extrusion materials. The specimens comply with the following requirements: flow rate; density; tensile stress at yield; nominal strain at break; secant flexural modulus; environmental stress-crack resistance; slow crack growth resistance; thermal stress crack resistance; permittivity; dissipation factor; volume resistivity; water immersion stability; flammability; and weatherability.

ASTM D792-13: Standard Test Methods for Density and Specific Gravity (Relative Density) of Plastics by Displacement; this test method describes the determination of the specific gravity (relative density) and density of solid plastics in forms such as sheets, rods, tubes, or molded items. This test method provides more guidelines on sample weight and dimensions. The values are stated in SI units.

ASTM D638-14: Standard Test Method for Tensile Properties of Plastics; this test method covers the determination of the tensile properties of unreinforced and reinforced plastics in the form of standard dumbbell-shaped test specimens when tested under defined conditions of pretreatment, temperature, humidity, and testing machine speed. This test method is applicable for testing materials of any thickness up to 14 mm (0.55 in.).

ASTM D790-17: Standard Test Methods for Flexural Properties of Unreinforced and Reinforced Plastics and Electrical Insulating Materials; this test method is used to determine the flexural properties of unreinforced and reinforced plastics, including high modulus composites and electrical insulating materials utilizing a three-point loading system to apply a load to a simply supported beam.

ASTM D1238-13: Standard Test Method for Melt Flow Rates of Thermoplastics by Extrusion Plastometer; this test method covers the determination of the rate of extrusion of molten thermoplastic resins using an extrusion plastometer. After pre-heating, resin is extruded through a die with a length and orifice diameter under prescribed conditions of temperature, load, and piston position in the barrel. The ASTM D1238-13 tests are all tested under the standard specifications of ASTM D4976.

ASTM D732-17: Standard Test Method for Shear Strength of Plastics by Punch Tool; this test method covers the procedure for determining the shear strength of plastics in the form of sheets, plates, and molded shapes in thicknesses from 1.27 to 12.7 mm (0.050 to 0.500 in.).

ASTM C518-17: Standard Test Method for Steady-State Thermal Transmission Properties by Means of the Heat Flow Apparatus; this test method covers the measurement of steady state thermal transmission through flat slab specimens using a heat flow meter apparatus. The method has been used at ambient conditions of 10 to 40° C. with thicknesses up to approximately 250 mm, and with plate temperatures from −195° C. to 540° C. at 25-mm thickness.

ASTM E72-15: Standard Test Methods of Conducting Strength Tests of Panels for Building Construction; the test methods cover the following procedures for determining the structural properties of segments of wall, floor, and roof constructions.

ASTM D695-15: Standard Test Method for Compressive Properties of Rigid Plastics; this test method covers the determination of the mechanical properties of unreinforced and reinforced rigid plastics, including high-modulus composites, when loaded in compression at relatively low uniform rates of straining or loading. Test specimens of standard shape are employed. This procedure is applicable for a composite modulus up to and including 41,370 MPa (6,000,000 psi).

ASTM E108-16: Standard Test Methods for Fire Test of Roof Coverings, Class C; this fire-test-response standard covers the measurement of the relative fire characteristics of roof coverings exposed to simulated fire sources originating outside the building. It is applicable to roof coverings intended for installation on either combustible or noncombustible roof decks when applied as intended for use. Class C tests are applicable to roof coverings that are effective against light fire exposure, afford a light degree of fire protection to the roof deck, do not slip from position, and are not expected to present a flying brand hazard. The roof passed the "Class C" test, which can be tested according to ASTM E108-16.

For the high density polyethylene (HDPE), ASTM D570-98(2010): Standard Test Method for Water Absorption of Plastics was done; this test method covers the determination of the relative rate of absorption of water by plastics when immersed. This test method can be applied to plastics, including cast, hot-molded, and cold-molded resinous products, and both homogeneous and laminated plastics in rod and tube form and in sheets 0.13 mm [0.005 in.] or greater in thickness.

ASTM D6341-16: Standard Test Method for Determination of the Linear Coefficient of Thermal Expansion of Plastic Lumber and Plastic Lumber Shapes Between −30 and 140° F. (−34.4 and 60° C.); this test method covers the determination of the coefficient of linear thermal expansion for plastic lumber and plastic lumber shapes. The determination is made by taking measurements with a caliper at three discrete temperatures. At the test temperatures and under the stresses imposed, the plastic lumber shall have a negligible creep or elastic strain rate, or both, insofar as these properties would significantly affect the accuracy of the measurements.

ASTM D2990-17: Standard Test Methods for Tensile, Compressive, and Flexural Creep and Creep-Rupture of Plastics; these test methods cover the determination of tensile and compressive creep and creep-rupture of plastics. In these test methods three-point loading is used for measurement of creep in flexure. However, four-point loading is an option. For measurements of creep-rupture, tension is the preferred stress mode because for some ductile plastics, rupture does not occur in flexure or compression.

ASTM E2322-03(2015): Standard Test Method for Conducting Transverse and Concentrated Load Tests on Panels used in Floor and Roof Construction; this test method serves to evaluate the performance of floors and roofs panels subjected to (1) Uniform loading, and (2) Concentrated static loading, which represent conditions sustained in the actual performance of the element.

For the in-plane shear: loaded wall and unloaded wall, ASTM E2126-11: Standard Test Methods for Cyclic (Reversed) Load Test for Shear Resistance of Vertical Elements of the Lateral Force Resisting Systems for Buildings was done; these test methods cover the evaluation of the shear stiffness, shear strength, and ductility of the vertical elements of lateral force resisting systems, including applicable shear connections and hold-down connections, under quasi-static cyclic (reversed) load conditions.

As a result of meeting the minimum standard for Accelerated Weathering ASTM G154, the standard for ASTM D1435-13 was also met. ASTM D1435-13: Standard Practice for Outdoor Weathering of Plastics; this is to cover procedures for the exposure of plastic materials to weather. ASTM D638: Tensile Strength at break was performed and met the minimum standard after performing test ASTM G154: Accelerated Weathering.

ASTM G154-12a: Standard Practice for Operating Fluorescent Ultraviolet (UV) Lamp Apparatus for Exposure of Nonmetallic Materials; this practice covers the basic principles and operating procedures for using fluorescent UV light, and water apparatus intended to reproduce the weathering effects that occur when materials are exposed to sunlight (either direct or through window glass) and moisture as rain or dew in actual usage. Test specimens are exposed to fluorescent UV light under controlled environmental conditions.

The minimum standard for ASTM D7989-15: Standard Practice for Demonstrating Equivalent In-Plane Lateral Seismic Performance to Wood-Frame Shear Walls Sheathed with Wood Structural Panels was met; this practice establishes a method for alternative shear wall systems to compare seismic equivalency parameters (SEP) derived from cyclic in-plane racking tests to performance targets derived from tests of light-frame shear walls constructed with wood structural panel (WSP) sheathing attached to dimension lumber framing using nails. NFPA 286-15: Standard Methods of Fire Tests for Evaluating Contribution of Wall and Ceiling Interior Finish to Room Fire Growth; UL 790-2014, Revised Jul. 29, 2014: Standard for Standard Test Methods for Fire Tests of Roof Coverings. This standard describes a method for determining the contribution of interior finish materials to room fire growth during specified fire exposure conditions. It is intended for the evaluation of the flammability characteristics of wall and ceiling interior finish, other than textile wall coverings, where such materials constitute the exposed interior surfaces of buildings. This test is also known as the "room corner" test. The test requires a setup of a small mock-up of a corner of a room (8'×8'×12') (2 walls, 1 ceiling) made of HDPE and HDPU foam core panel. Gas flow rate provides a heat release of 40 kW+/−1 kW from the burner. The exposure is continued at this rate for 5 minutes+/−10 seconds. Within 10 seconds after the 5-minute initial exposure, the gas flow rate is increased to provide a rate of heat release of 160 kW+/−5 kW. The exposure is continued at this rate for 10 minutes+/−10 seconds. The occurrence of flashover is recorded and the ignition is shut off after about 15 minutes. The heat release is recorded in kW and is a rate of about 40 kW for 5 minutes and then 160 kW for 10 minutes for total of 15 minutes.

ASTM D635-18: Standard Test Method for Rate of Burning and/or Extent and Time of Burning of Plastics in a Horizontal Position; this test method covers a laboratory screening procedure for comparing the relative linear rate of burning or extent and time of burning, or both, of plastics in the form of bars, molded or cut from sheets, plates, or panels, and tested in the horizontal position.

For the bulkhead with windows, joints, and roof panels, ASTM E331-00: Standard Test Method for Water Penetration of Exterior Windows, Skylights, Doors, and Curtain Walls by Uniform Static Air Pressure Difference was performed and met the minimum requirement; this test method addresses water penetration through a manufactured assembly.

ISO/TR 10358-Plastics Pipes and Fittings—Combined Chemical Resistance; this test method established chemical resistance of pipe materials to specified fluids over a range of temperatures. The specimen was submerged in three different chemicals for twenty-four hours.

The following were tested on the high density polyurethane (HDPU) foam and met the minimum standards. Physical Properties of Polyurethane per Acceptance Criteria AC377. Density per ASTM D1622; this test method covers the density of a cellular plastic. Tensile Strength per ASTM D1623; this test method covers the determination of the tensile and tensile adhesion properties of rigid cellular materials in the form of test specimens of standard shape under defined conditions of temperature, humidity, and testing machine speed. ASTM D1621-16—Standard Test Method for Compressive Properties of Rigid Cellular Plastics; this test method describes a procedure for determining the compressive properties of rigid cellular materials, particularly expanded plastics. ASTM D2126-15 Standard Test Method for Response of Rigid Cellular Plastics to Thermal and Humid Aging; this test method covers procedures for the thermal and humid exposure of rigid cellular plastics. Thermal Resistance per ASTM C518; this test method covers the measurement of steady state thermal transmission through flat slab specimens using a heat flow meter apparatus. Surface Burning per ASTM E84; this test method is conducted with the specimen in the ceiling position with the surface to be evaluated exposed face down to the ignition source.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A molded component building assembly system comprising:
    a cube module comprising a plurality of thermoformed high density polyethylene cube module molded components, each cube module molded component filled with high density polyurethane foam, the plurality of cube module molded components comprising:
        a floor having an upper side and a lower side;
        a plurality of columns, each column having a first end and a second end;
        a module roof having a top side and a bottom side;
        a first set of interchangeable bulkhead panels;
            wherein the upper side of the floor is connected to the first ends of the plurality of columns; the bottom side of the module roof is connected to the second ends of the plurality of columns; the first set of interchangeable bulkhead panels connected between the bottom side of the module roof and the upper side of the floor, and the first set of interchangeable bulkhead panels connected laterally to the plurality of columns; and
    a plurality of steel vertical connectors secured in slots located on exterior surfaces of the floor, of the plurality of columns, and of the module roof;
    a triangle module comprising a plurality of thermoformed high density polyethylene triangle module molded components, each triangle module molded component filled with high density polyurethane foam, the plurality of triangle module molded components comprising:
        a triangular roof module,
        a second set of interchangeable bulkhead panels;
        two end wall frames, each end wall frame having a top side, a bottom side;
        a deck having an upper side and a lower side;
            wherein the upper side of the deck is connected to the bottom sides of the two end wall frames and to the second set of interchangeable bulkhead panels; and
            the top sides of the two end wall frames are connected to a different set of interchangeable bulkhead panels; and
    a steel frame connecting the plurality of triangle module molded components by fasteners, the steel frame comprising:
        at least two trusses, each truss having a top, a bottom, an inner facing side and an outer facing side and two vertical connectors extending from the bottom of each truss of the at least two trusses; and
        a beam connecting the at least two trusses at substantially a highest point on the inner facing side;
    wherein the cube module and the triangle module are connected by straps to form a habitable constructed unit;
    wherein each bulkhead panel within the first set of interchangeable bulkhead panels and second set of interchangeable bulkhead panels is interchangeable with each other; and
    wherein the plurality of cube module molded components and the plurality of triangle module molded components are at least sufficient to meet a minimum ASTM standard of one or more of the following: ASTM D695-15, ASTM D638-14, ASTM D732-17, ASTM C518-17, ASTM D4976-12a, ASTM E72-15, ASTM E108-16, ASTM D4819-13, ASTM D570-98, ASTM D6341-16, ASTM D2990-17, ASTM D2990-17, ASTM E2322-03, ASTM E2126-11, ASTM D1435-13, ASTM G154-12a, ASTM D7989-15, NFPA 286-15, and UL 790-2014.

2. The molded component building assembly system of claim 1, wherein each bulkhead panel within the first set and second set of interchangeable bulkhead panels is selected from the group consisting of a bulkhead wall, bulkhead large window, bulkhead small window, bulkhead plumbing wall, bulkhead door, and combinations thereof.

3. The molded component building assembly system of claim 1, wherein the thermoformed high density polyethylene comprises about 30 weight percent of an intumescent flame retardant mixed with a 70 weight percent high density polyethylene resin.

4. The molded component building assembly system of claim 1, wherein the high density polyurethane foam comprises diphenylmethane diisocyanate, 4, 4'-Methylenediphenyl diisocyanate, blowing agent, and a flame retardant.

5. The molded component building assembly system of claim 1, wherein the lower side of the floor comprises four bases located at each corner of the floor.

6. The molded component building assembly system of claim 1, wherein the lower side of the floor comprises a hull.

7. The molded component building assembly system of claim 1, wherein the lower side of the deck comprises four bases located at each corner of the deck.

8. The molded component building assembly system of claim 1, wherein the lower side of the deck comprises a hull.

9. The molded component building assembly system of claim 1, wherein the straps include a sloped roof strap connecting an underside of the triangular roof module to the top side of the module roof.

* * * * *